United States Patent
Fujishima et al.

(10) Patent No.: US 8,675,588 B2
(45) Date of Patent: Mar. 18, 2014

(54) BASE STATION, WIRELESS COMMUNICATION SYSTEM, WIRELESS RESOURCE ALLOCATING METHOD, AND WIRELESS COMMUNICATING METHOD

(75) Inventors: Kenzaburo Fujishima, Kokubunji (JP); Toshiyuki Saito, Fujisawa (JP); Yuta Muto, Yokohama (JP); Kouki Uwano, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 94 days.

(21) Appl. No.: 13/380,721

(22) PCT Filed: Aug. 14, 2009

(86) PCT No.: PCT/JP2009/064347
§ 371 (c)(1),
(2), (4) Date: Feb. 6, 2012

(87) PCT Pub. No.: WO2010/150417
PCT Pub. Date: Dec. 29, 2010

(65) Prior Publication Data
US 2012/0127888 A1 May 24, 2012

(30) Foreign Application Priority Data

Jun. 25, 2009 (JP) .................................. 2009-150459

(51) Int. Cl.
*H04W 4/00* (2009.01)
(52) U.S. Cl.
USPC ........................................ 370/329; 370/341
(58) Field of Classification Search
USPC ......... 370/227, 228, 331, 332, 341, 349, 322, 370/329
See application file for complete search history.

(56) References Cited

U.S. PATENT DOCUMENTS 7,873,338 B2 * 1/2011 Visotsky et al. ........... 455/226.2
7,881,741 B2 * 2/2011 Horiuchi et al. .............. 455/522

(Continued)

FOREIGN PATENT DOCUMENTS

| JP | 2008-48202 | 2/2008 |
| WO | WO 2006/104105 A1 | 10/2006 |
| WO | WO 2006/118125 A1 | 11/2006 |

OTHER PUBLICATIONS

3rd Generation partnership Project; Technical Specification Group Radio Access Network; Further Advancements for E-UTRA Physical Layer Aspects (Release 9), 3GPP TR 36.814 Vo.4.1(Feb. 2009).

(Continued)

*Primary Examiner* — Brenda H Pham
(74) *Attorney, Agent, or Firm* — Antonelli, Terry, Stout & Kraus, LLP.

(57) ABSTRACT

In a wireless communication system, when data communication is performed between a relay device and a terminal (in a second path), the same amount of data is required to be transferred between a base station and the relay device (in a third path). An amount of wireless communication resources required is obtained by adding an amount inversely proportional to a capacity of each of the second and third wireless transmission-paths. Therefore, the amount inversely proportional to the capacity of the third path is consumed in excess. Based on a channel quality of a first wireless channel between the base station and the terminal, a channel quality of a second wireless channel between the terminal and the relay station, and a channel quality of a third wireless channel between the base station and the relay station, it is determined whether data communication between the base station and the terminal is relayed.

12 Claims, 39 Drawing Sheets

(56) References Cited

U.S. PATENT DOCUMENTS

| | | | |
|---|---|---|---|
| 8,199,721 B2* | 6/2012 | Jung et al. | 370/332 |
| 2008/0045147 A1 | 2/2008 | Okuda | |
| 2009/0047898 A1 | 2/2009 | Imamura et al. | |
| 2009/0092072 A1 | 4/2009 | Imamura et al. | |
| 2010/0177672 A1* | 7/2010 | Dayal et al. | 370/311 |
| 2010/0177717 A1* | 7/2010 | Sung et al. | 370/329 |

OTHER PUBLICATIONS $3^{rd}$ Generation partnership Project; Technical Specification Group Radio Access Network; Evolved Universal Terrestrial Radio Access (E-UTRA) Physical Channels and Modulation (Release 8), 3GPP TR 36.211 V8.4.0 (Sep. 2008).

$3^{rd}$ Generation partnership Project; Technical Specification Group Radio Access Network; Evolved Universal Terrestrial Radio Access (E-UTRA); Multiplexing and channel coding (Release 8), 3GPP TS 36.212 V8.4.0 (Sep. 2008).

$3^{rd}$ Generation partnership Project; Technical Specification Group Radio Access Network; Evolved Universal Terrestrial Radio Access (E-UTRA); Physical layer procedures (Release 8) 3GPP TS 36.213 V8.4.0 (Sep. 2008).

Further consideration on L2 transparent relay, 3GPP TSG-RAN WG1 #56bis, Seoul, Korea, Mar. 23-27, 2009.

* cited by examiner

FIG. 8A

| FIELD NAME | VALUE |
|---|---|
| TERMINAL ID | 1234 |
| CQI (FIRST WIRELESS CHANNEL) | 11 |
| CQI (SECOND WIRELESS CHANNEL) | 8 |

FIG. 8B

| FIELD NAME | VALUE |
|---|---|
| RELAY DEVICE ID | 5678 |
| CQI (THIRD WIRELESS CHANNEL) | 15 |

FIG. 8C

| FIELD NAME | VALUE |
|---|---|
| TERMINAL ID | 5678 |
| RELAY DEVICE ID | 1234 |
| CQI (SECOND WIRELESS CHANNEL) | 13 |
| RELAY DEVICE ID | 2345 |
| CQI (SECOND WIRELESS CHANNEL) | 9 |

FIG. 9

| FIELD NAME | VALUE |
|---|---|
| RELAY DEVICE ID | 1234 |
| RESOURCE ALLOCATION BITMAP | 000011000000 |
| MCS | 12 |
| RELAY FLAG | 1 |

FIG. 10

| FIELD NAME | VALUE |
|---|---|
| RELAY DEVICE ID | 5678 |
| RELAY FLAG | 111111111111000000000000 |

FIG. 12A

|  | $C_A(k)$ | $C_D(k)$ | $C_B$ | $F(k)$ | GROUP | RELAY FLAG |
|---|---|---|---|---|---|---|
| TERMINAL 1 | 1 | 1 |  | - 0.2 | 1 | 0 |
| TERMINAL 2 | 1 | 5 | 5 | - 1.0 | 1 | 0 |
| TERMINAL 3 | 5 | 1 |  | + 3.0 | 1 | 0 |

FIG. 12B

|  | $C_A(k)$ | $C_D(k)$ | $C_B$ | $F(k)$ | GROUP | RELAY FLAG |
|---|---|---|---|---|---|---|
| TERMINAL 1 | 1 | 1 |  | - 0.2 | 1 | 0 |
| TERMINAL 2 | 1 | 5 | 5 | - 1.0 | 1 | 0 |
| TERMINAL 3 | 5 | 1 |  | + 3.0 | 2 | 1 |

| CQI Index | Modulation | Coding rate x 1024 | Efficiency |
|---|---|---|---|
| 0 | Out of Range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 33

| FIELD NAME | VALUE |
|---|---|
| RELAY DEVICE ID | 1234 |
| CQI (FIRST WIRELESS CHANNEL) | 11 |
| TERMINAL ID | 5678 |
| CQI (SECOND WIRELESS CHANNEL) | 12 |
| TERMINAL ID | 9012 |
| CQI (SECOND WIRELESS CHANNEL) | 8 |

BASE STATION, WIRELESS COMMUNICATION SYSTEM, WIRELESS RESOURCE ALLOCATING METHOD, AND WIRELESS COMMUNICATING METHOD

TECHNICAL FIELD

The present invention relates to a wireless communication system having a base station, a terminal, and a relay device and, in particular, to a communication resource allocation technology for data communications between base stations and terminals.

BACKGROUND ART

In a mobile wireless communication system, fixed stations (base stations) are arranged with a moving range of a mobile station (a terminal) being assumed. Specifically, by placing a plurality of base stations, areas (cells) in each of which the relevant base station can communicate with terminals are made overlap one another, and the base stations are arranged so that a terminal can communicate with any base station anywhere in the assumed range. In practice, however, restrictions in position of arrangement of the base stations and an area (a skip zone) where the terminal cannot communicate with any base station due to the influence of a shielding such as a building arise. To reduce the skip zone, a relay device that relays wireless communication between the base stations and the terminals is inserted. This relay device is a relay device of an Amplify & Forward type (an AF type), having a function of amplifying and transmitting a received signal.

While the relay device of the AF type has a simplified device structure because no baseband signal process is performed, noise is amplified at a receiving end, and therefore a Signal to Noise Ratio (SNR) of the relayed signal is not higher than an SNR at the the data bit sequence, thereby allowing noise components to be eliminated in the stage of transmission by the relay device. With this, the SNR at a transmitting end of the relay device can be made higher than the SNR at the receiving end.

For IMT-Advanced, 3GPP (3rd Generation Partnership Project), which is a standardization entity for mobile communication, has been pushing forward the standardization of LTE-Advanced (hereinafter abbreviated as LTE-A), which is a standard succeeding LTE (Long Term Evolution). In LTE-A, in order to improve use efficiency of cell average frequencies and use efficiency of cell edge frequencies, an introduction of a relay device of the DF type has been studied.

In 3GPP, the relay device is defined as a node having a wireless backhaul line with a donor base station ([Non-Patent Document 1]). According to Non-Patent Document 1, as a wireless backhaul line, two types, Inband backhaul and Outband backhaul, have been studied. The former ensures backhaul-line-dedicated wireless communication resources by using part of wireless communication resources for use in data communication, and the latter ensures backhaul-line-dedicated wireless communication resources separately from the wireless communication resources for use in data communication. In the latter, it is easier to manage the wireless communication resources. As an extreme example, however, if there is no need to use a backhaul line at all, the wireless communication resources allocated as those dedicated to the backhaul line cannot be diverted for data communication use, and therefore the latter has a property in which frequency use efficiency tends to decrease.

Moreover, when a relay device is introduced, a plurality of routes arise, including a route by which the base station and the terminal directly communicate with each other and a route by which they communicate via the relay device. Here, a routing technology of deciding which route is used for actual communication is disclosed in, for example, Patent Document 1. Furthermore, a routing technology when a plurality of relay devices are present between the base station and the terminal is disclosed in Patent Document 2.

Still further, in 3GPP, as a method of using a relay device, Cooperative Relay is suggested in Non-Patent Document 5. In this method, a data signal transmitted by the base station is decoded and retained by the relay device and, when NAK indicating that a terminal has failed to receive the signal is fed back to the base station, the relay device intercepts this feedback. When the base station transmits a retransmission packet, the relay device also transmits the retransmission packet based on the retaining result. This method is known as a technology capable of reducing the number of times of retransmission of Hybrid ARQ.

PRIOR ART DOCUMENTS

Patent Documents

Patent Document 1: Japanese Patent Application Laid-Open Publication No. 2008-048202
Patent Document 2: WO2006/104105

Non-Patent Documents

Non-Patent Document 1: 3GPP, "Further advancements for E-UTRA Physical layer aspects", TR36.814, v1.0.0, 2009/02
Non-Patent Document 2: 3GPP, "Physical Channel and Modulation (Release 8)", TS36.211, v8.4.0, 2008/09
Non-Patent Document 3: 3GPP, "Multiplexing and channel coding (Release 8)", TS36.212, v8.4.0, 2008/09
Non-Patent Document 4: 3GPP, "Physical layer procedures (Release 8)", TS36.213, v8.4.0, 2008/09
Non-Patent Document 5: Vodafone, "Further considerations on L2 transparent relay", R1-091403, 3GPP TSG-RAN WG1, 2008/06

DISCLOSURE OF THE INVENTION

Problems to be Solved by the Invention

A wireless communication system where a relay device is introduced is shown in FIG. 1A. When a relay device 103 is introduced to a wireless communication system where a base station 101 and a terminal 102 perform data communication, in addition to a wireless communication channel (a first wireless channel) 104 between the base station and the terminal, a wireless communication channel (a second wireless channel) 105 between the relay device and the terminal and a wireless communication channel (a third wireless channel) 106 between the base station and the relay device occur. That is, as wireless communication routes between the base station and the terminal, two routes occur, that is, a first route using the first wireless channel 104 and a second route using the second wireless channel 105 and the third wireless channel 106.

An example of division of wireless communication resources in the wireless communication system where a relay device is introduced is shown in FIG. 1B. Resources are divided into a wireless communication resource 107 allocated to the first wireless channel 104, a wireless communication resource 108 allocated to the second wireless channel 105, and a wireless communication resource 109 allocated to the third wireless channel 106.

Patent Document 1 discloses a technology of controlling whether to use communication via a relay device in consideration of communication quality of the first wireless channel and communication quality of the second wireless channel, but not in consideration of communication quality of the third wireless channel. That is, if communication via the second wireless channel is selected, a large amount of wireless communication resources may be used in the third wireless channel and, as a result, the amount of wireless communication resources to be consumed is larger than that in the case of communication via the first wireless channel.

Patent Document 2 discloses a technology of comparing communication quality of the second wireless channel and communication quality of the third wireless channel and if the communication quality of the third wireless channel is sufficiently large compared with the communication quality of the second wireless channel, performing relay communication. However, since a comparison with communication quality of the first wireless channel is not made, a larger amount of wireless communication resources may be resultantly consumed by relay communication than that in the case of communication via the first wireless channel.

It can be said in both of these two Patent Documents in common that, since a comparison between a total amount of wireless communication resources to be consumed on the second route where relay communication is performed and the amount of wireless communication resources to be consumed on the first route is not made, the possibility of occurrence of a system loss due to introduction of a relay device is not considered.

Moreover, Cooperative Relay suggested in Non-Patent Document 5 is a method, as shown in FIG. 19, in which a data signal transmitted by the base station is decoded and retained by the relay device and, when NAK indicating that a terminal has failed to receive the signal is fed back to the base station, the relay device intercepts this feedback. When the base station transmits retransmission data, the relay device also transmits the retransmission data based on the retaining result. In this method, even if the communication quality of the second wireless channel is higher than the communication quality of the first wireless channel, the first wireless channel is used without exception in data transmission for the first time, thereby being disadvantageously incapable of sufficiently utilizing the high communication quality of the second wireless channel.

Means for Solving the Problems

To solve at least one of the problems described above, in an embodiment of the present invention, a wireless communication system is configured to compare communication qualities of three channels, that is, a channel between a base station and a terminal, a channel between the base station and a relay device, and a channel between the relay device and the terminal to select a channel for data communication between the terminal and the base station.

Also, in another embodiment, a wireless resource allocating method of allocation for data communication between a terminal and a base station is configured to compare a first communication quality of a channel between the terminal and the base station, a second communication quality of a channel between the terminal and a relay device capable of relaying the data communication between the terminal and the base station, and a third communication quality of a channel between the base station and the relay device and allocate, regarding the data communication, a wireless resource to a channel via the relay device or a channel not via the relay device according to the comparison result.

Effects of the Invention

In a wireless communication system having a relay device, use efficiency of wireless communication resources can be increased.

BRIEF DESCRIPTIONS OF THE DRAWINGS

FIG. 8A is a diagram showing an example of a format of downlink channel quality from the terminal to the base station according to the present embodiment;

FIG. 8B is a diagram showing an example of a format of downlink channel quality from the relay device to the base station according to the present embodiment;

FIG. 8C is a diagram showing an example of a format of uplink channel quality from the relay device to the base station according to the present embodiment;

FIG. 9 is a diagram showing a first embodiment of notification information about a relay necessity/unnecessity determination result according to the present embodiment;

FIG. 10 is a diagram showing a second embodiment of the notification information about the relay necessity/unnecessity determination result according to the present embodiment;

FIG. 12A is a diagram showing an example of a state management table for each terminal in relay necessity/unnecessity determination;

FIG. 12B is a diagram showing an example of the state management table for each terminal in relay necessity/unnecessity determination;

FIG. 33 is a diagram showing an example of a feedback format from the terminal in the wireless communication system in which a plurality of relay devices are present for one base station;

BEST MODE FOR CARRYING OUT THE INVENTION

Figure 1A:
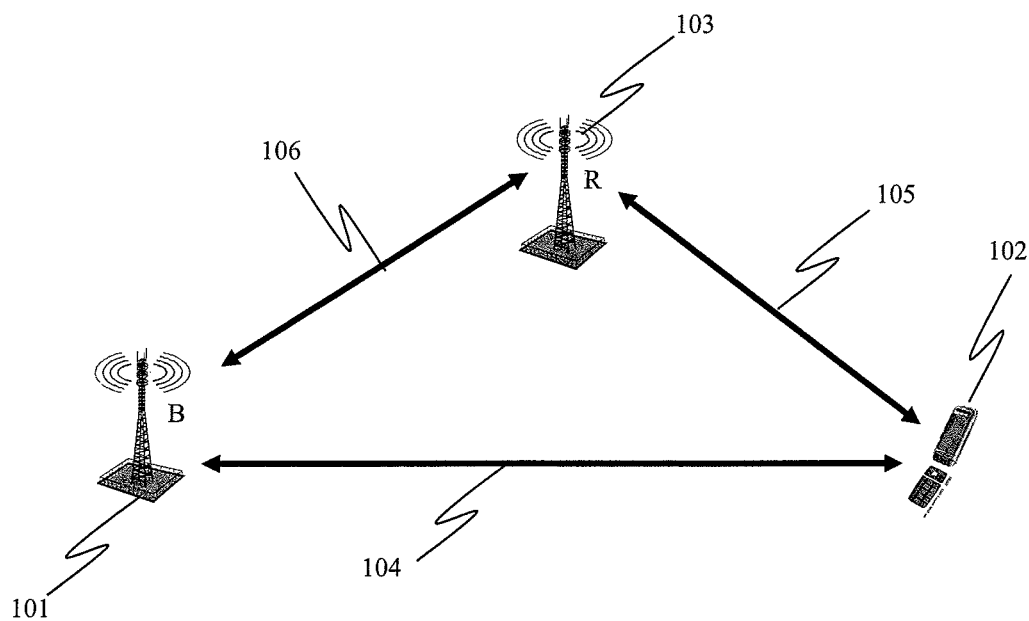
FIG. 1A is a diagram showing a wireless communication system where a relay device is introduced.

First, a preferred aim and problem in embodiments of an embodiment for carrying out the present invention are described. In the present embodiment, when Inband Backhaul described in the background art is used, wireless communication resources for transmission and reception by the base station are shared between the first wireless channel 104 and the third wireless channel 106. That is, if relay communication is heavily used to perform a large amount of data communication via the second wireless channel 105, the same amount of data communication is also performed in proportion thereto in the third wireless channel 106 and, as a result, wireless communication resources to be allocated to the first wireless channel 104 are decreased.

In this case, not only the wireless communication resources to be allocated to the first wireless channel 104 are decreased but, when certain data is transmitted between the base station and the terminal, the amount of frequency resources to be occupied in the case of transmission via the first route and in the case of transmission via the second route generally differs according to the communication quality of the channel. With this phenomenon, introduction of a relay device may invite a decrease in use efficiency of frequencies. Specifically, when the amount of frequency resources to be occupied in the second route in order to transmit certain data is larger than the amount of frequency resources to be occupied in the first route, the amount of frequency resources for use in this data transmission increases due to the introduction of the relay device. Therefore, use efficiency of frequency rather decreases.

Here, the wireless communication resources occupied in the first route are inversely proportional to the communication quality of the first wireless channel. The wireless communication resources occupied in the second route are a sum of wireless communication resources to be consumed in an inversely proportional manner to the communication quality of the second wireless channel and wireless communication resources to be consumed in an inversely proportional manner to the communication quality of the third wireless channel.

In the following, a problem is described with reference to equations. Capacities indicative of communication qualities of the first wireless channel 104, the second wireless channel 105, and the third wireless channel 106 are represented as $C_D$, $C_A$, and $C_B$ (in units of [bit/s/Hz]), respectively. On the other hand, ratios of wireless resources occupied by these wireless channels are taken as $P_D$, $P_A$, and $P_B$, respectively. An average capacity C effective over the entire system can be represented by the following equation.

$$C = P_A C_A + P_D C_D \quad \text{[Equation 1]}$$

Note in this equation that the third wireless channel 106 is strictly a backhaul line for data communication in the second wireless channel 105, and is merely an overhead for data communication in the second wireless channel 105.

Next, since the first wireless channel 104, the second wireless channel 105, and the third wireless channel 106 share the wireless communication resources, the following limiting condition can be introduced.

$$P_A + P_B + P_D \leq 1 \quad \text{[Equation 2]}$$

Furthermore, because of relay communication, the amount of data to be transmitted in the second wireless channel 105 and the amount of data to be transmitted in the third wireless channel 106 are equal to each other, and the following limiting condition can be introduced.

$$P_B C_B = P_A C_A \quad \text{[Equation 3]}$$

From Equation 2 and Equation 3, the following relation can be obtained.

$$P_D \leq 1 - \left(\frac{C_A}{C_B} + 1\right) P_A \quad \text{[Equation 4]}$$

When Equation 4 is substituted into Equation 1, the following equation is obtained.

$$C \leq \left\{1 - \left(\frac{C_A}{C_B} + 1\right) P_A\right\} C_D + P_A C_A \quad \text{[Equation 5]}$$

In this equation, when $P_A=0$ is assumed, only the capacity $C_D$ of the first wireless channel 104 is left. That is, this is an average capacity over the entire system when no relay device is introduced. Here, if $P_A>0$ as a result of introduction of a relay device, the first term on the right side decreases and the second term on the right side increases. That is, in a situation in which a system loss and a system gain are present in a mixed manner due to the introduction of a relay device, whether the system loss is larger or the system gain is larger depends on an interrelation among the capacities $C_D$, $C_A$, and $C_B$ of the first wireless channel 104, the second wireless channel 105, and the third wireless channel 106, respectively. A necessary condition for increasing the system gain as the increase of $P_A$, that is, for increasing the system gain by introducing a relay device, is represented by the following equation.

$$P_A \left(\frac{C_A}{C_B} + 1\right) C_D \leq P_A C_A \quad \text{[Equation 6]}$$

When the above equation is transformed, the following equation can be obtained.

$$C_D \leq \frac{C_A C_B}{C_A + C_B} \quad \text{[Equation 7]}$$

This Equation 7 is a necessary condition for the interrelation among the capacities $C_D$, $C_A$, and $C_B$ in order to increase the system gain by introducing a relay device. Here, the system gain by introducing a relay device is derived as follows from Equation 5.

$$P_A \left\{\overline{C_A} - \left(\frac{\overline{C_A}}{\overline{C_B}} + 1\right)\overline{C_D}\right\} \quad \text{[Equation 8]}$$

However, from $P_A + P_B \leq 1$ (the equation sign holds where $P_D=0$), which is derived from Equation 2, and Equation 3, the following limiting condition is derived.

$$P_A \leq \frac{C_B}{C_B + C_A} \quad \text{[Equation 9]}$$

Figure 2:
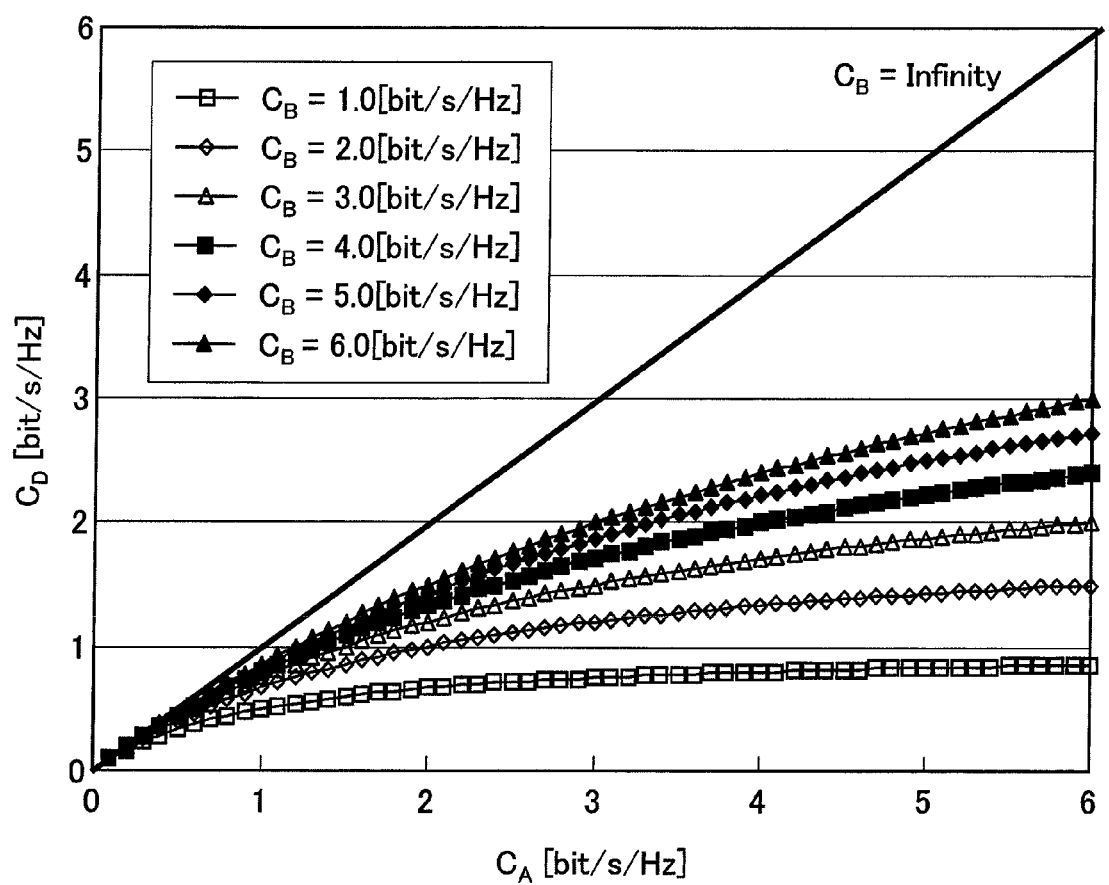
FIG. 2 is a graph showing a boundary indicating whether a system gain can be obtained by introducing a relay device.

FIG. 2 shows a graph in which lines are drawn so that the equation sign holds in Equation 7. With the horizontal axis representing the capacity $C_A$ of the second wireless channel 105, the vertical axis representing the capacity $C_D$ of the first wireless channel 104, and the capacity $C_B$ of the third wireless channel 106 being taken as a parameter, a plurality of lines are drawn. From Equation 7, a region below each of these lines is a region where a system gain can be obtained by introducing a relay device, and a region above each of these lines is a region where a system loss occurs by introducing a relay device.

From FIG. 2, qualitative conditions for increasing the system gain are derived as follows:

(1) The capacity $C_A$ of the second wireless channel 105 is sufficiently large compared with the capacity $C_D$ of the first wireless channel 104; and (2) The condition (1) is eased more as the capacity $C_B$ of the third wireless channel 106 is larger.

An extreme case is described. As the capacity $C_B$ of the third wireless channel 106 asymptotically approaches infinity, $C_B/(C_A+C_B)$ of Equation 7 asymptotically approaches 1 and a boundary line between the system gain and the system loss asymptotically approaches a straight line of $C_D=C_A$. It seems to be thought in Patent Document 1 that this straight line is taken as a boundary line. In practice, however, as shown in Equation 3, data transmission in the third wireless channel 106 is also required by the amount of data to be transmitted in the second wireless channel 105, and wireless communication resources inversely proportional to the capacity of the third wireless channel 106 are consumed in excess. This excessive consumption of the wireless communication resources in the third wireless channel 106 is a cause of keeping the boundary line between the system gain and the system loss away from the straight line of $C_D=C_A$.

From the above, it has been evident that introduction of a relay device may not allow a system gain to be obtained but may rather cause a system loss in some cases. This is a problem to be solved by the present embodiment.

More specifically, the problem can be solved by a wireless communication system that compares a loss and a gain in performance due to introduction of the relay device that are calculated from the first wireless channel quality, the second wireless channel quality, and the third wireless channel quality and, based on the comparison result, makes a relay necessity/unnecessity determination for data communication between the base station and the terminal.

Furthermore, since the interrelation among the capacities of the respective wireless channels changes between downlink communication for performing communication in a direction from the base station to the terminal and uplink communication for performing communication in a direction from the terminal to the base station, the problem can be solved in both of the downlink communication and the uplink communication by a wireless communication system that makes a relay necessity/unnecessity determination for data communication between the base station and the terminal for each of the downlink communication and the uplink communication.

Also, by collecting the determination results as to the relay necessity/unnecessity determination at the relay device and controlling whether the relay device relays data communication based on the determination result or discards received data without relay, data to be communicated in the first wireless channel is discarded and only data to be communicated in the second wireless channel and the third wireless channel can be selectively relayed.

By the base station collecting the first wireless channel quality, the second wireless channel quality, and the third wireless channel quality and making the relay necessity/unnecessity determination, the base station can issue a relay necessity/unnecessity determination result based on the wireless channel qualities of three types. Collecting the first wireless channel quality, the second wireless channel quality, and the third wireless channel quality by the base station can be achieved by the terminal or the base station estimating the first wireless channel quality, by the terminal or the relay device estimating the second wireless channel quality, and by the base station or the relay device estimating the third wireless channel quality, and wirelessly feeding back the results estimated by the terminal and the relay device to the base station.

Furthermore, to measure two of the first wireless channel quality, the second wireless channel quality, and the third wireless channel quality, either one of the base station and the terminal transmits a reference signal, and the remaining two types of devices including the relay device each receive the reference signal to estimate the quality of each different wireless channel, thereby allowing reduction in overhead of the reference signals for estimating various wireless channel qualities.

In addition to the above, a reference signal transmitted by the relay device is overlapped with a reference signal transmitted by the base station in downlink communication, and a reference signal transmitted by the relay device is overlapped with a reference signal transmitted by the terminal in uplink communication, thereby allowing further reduction in overhead of the reference signals.

Figure 3:
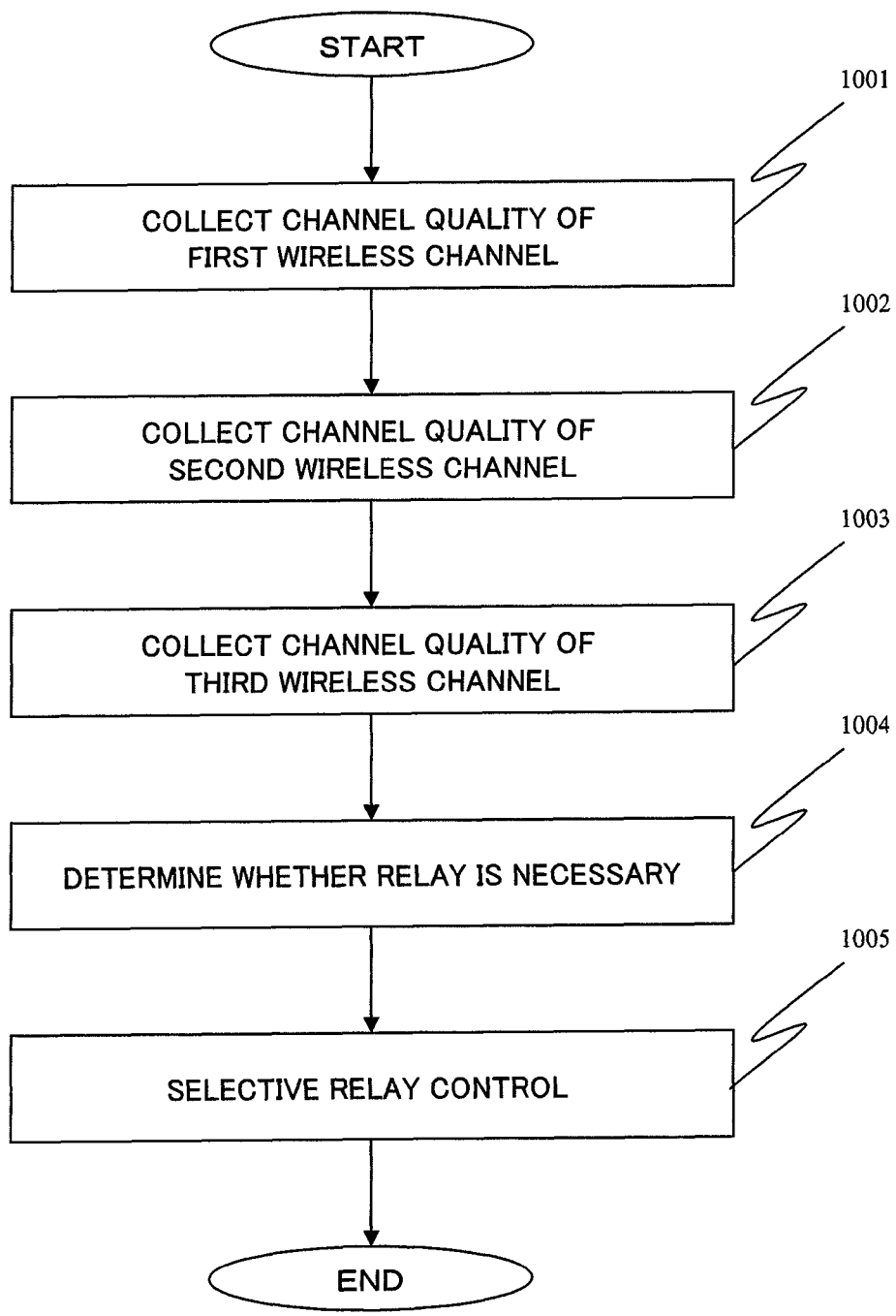
FIG. 3 is a chart showing a flow of operation of an entire system for achieving an embodiment.

Embodiments of an embodiment for carrying out the present invention are shown below. FIG. 3 shows a flow of operation of an entire system in the present embodiment.

First, at step 1001, communication quality of a first wireless channel between the base station and each terminal is collected. At step 1002, communication quality of a second wireless channel between a relay device and each terminal is collected. At step 1003, communication quality of a third wireless channel between the base station and the relay device is collected. The order and time interval from step 1001 to step 1003 can be any, but all of step 1001 to step 1003 are required to be finished by step 1004. Here, the base station is assumed to be as a main body that collects various communication qualities and the base station, the terminal, and the relay device are assumed to be as main body that measures communication quality. More detailed embodiment will be described further below.

At step 1004, a relay necessity/unnecessity determination is made for each terminal from the communication quality of the first wireless channel, the communication quality of the second wireless channel, and the communication quality of the third wireless channel collected at step 1001 to step 1003.

At step 1005, based on the relay necessity/unnecessity determination result for each terminal, which is an output at step 1004, control is performed so that a wireless signal of a terminal which should be relayed is relayed and a wireless signal of a terminal which should not be relayed is not relayed.

Figure 4:
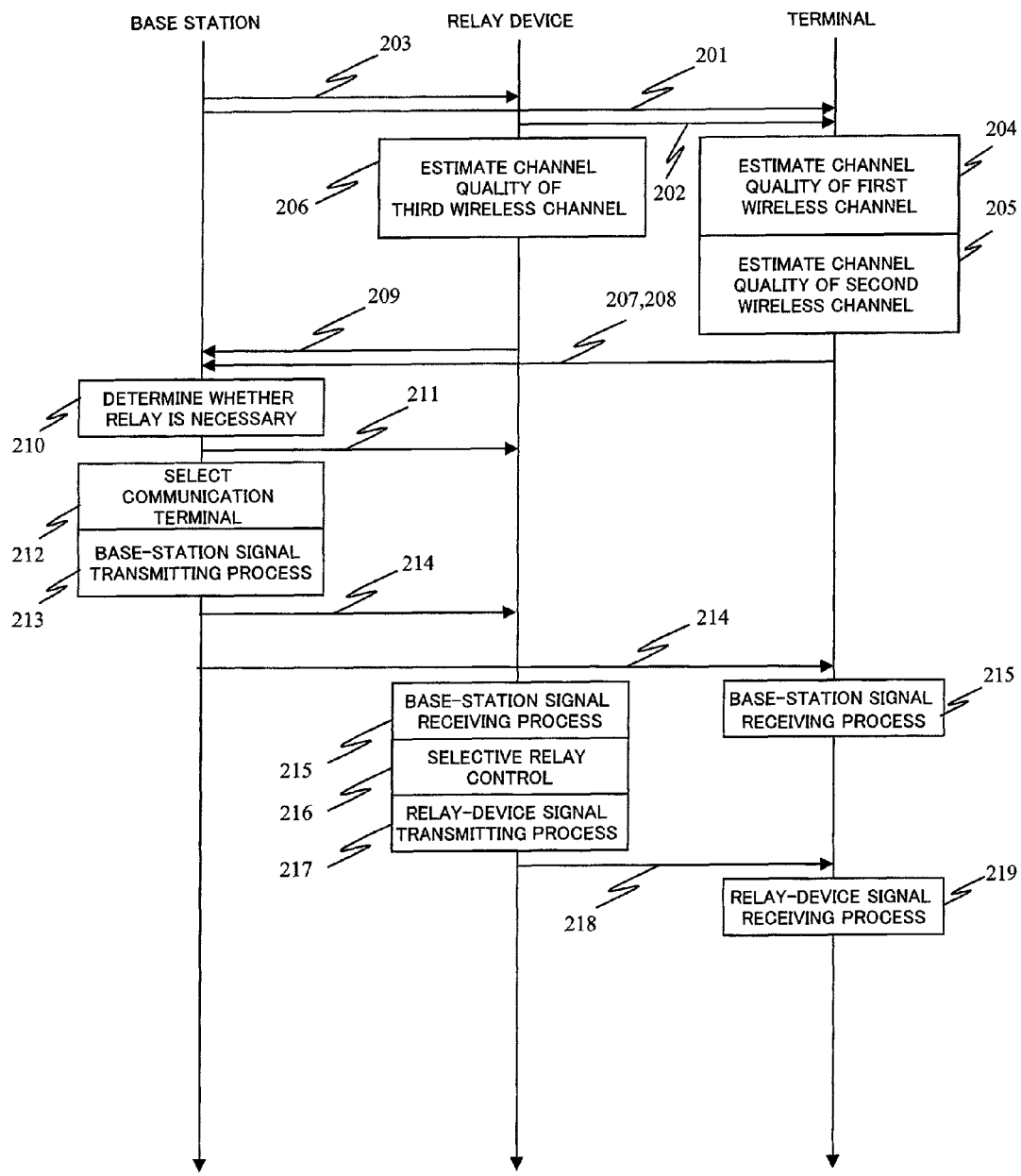
FIG. 4 is a chart showing a first embodiment of a downlink operation flow for achieving the present embodiment.

FIG. 4 shows a first embodiment of a downlink communication operation flow at a base station 101, a relay device 103, and a terminal 102 in the wireless communication system.

First, the base station 101 transmits to the terminal 102 a reference signal 201 for estimating channel quality of the first wireless channel (between the base station and the terminal) and to the relay device 103 a reference signal 203 for estimating channel quality of the third wireless channel (between the base station and the relay device). The relay device 103 transmits a reference signal 202 for estimating channel quality of the second wireless channel (between the relay device and the terminal).

The terminal 102 receives the reference signal 201, and performs a channel quality estimation 204 of the first wireless channel using the reference signal 201. The terminal 102 receives the reference signal 202, and performs a channel quality estimation 205 of the second wireless channel using the reference signal 202. The relay device 103 receives the reference signal 203, and performs a channel quality estimation 206 of the third wireless channel by using the reference signal 203.

The terminal 102 wirelessly feeds back the estimation result of the channel quality obtained from the channel quality estimation 204 or 206 to the base station 101 with a MAC (Medium Access Control) layer (Layer 2). Here, what is fed back is a channel quality estimation result 207 of the first wireless channel and a channel quality estimation result 208 of the second wireless channel.

Similarly, the relay device 103 wirelessly feeds back a channel quality estimation result 209 of the third wireless channel obtained from the channel quality estimation 206 to the base station with the MAC layer.

The base station 101 receives via a wireless network from the terminal 102 the channel quality estimation result 207 of the first wireless channel and the channel quality estimation result 208 of the second wireless channel. The base station 101 receives from the relay device 103 the channel quality estimation result 209 of the third wireless channel via the wireless network.

By using the channel quality estimation result 207 of the first wireless channel, the channel quality estimation result 208 of the second wireless channel, and the channel quality estimation result 209 of the third wireless channel wirelessly fed back from the terminal 102 and the relay device 103, the base station 101 determines whether to perform relay communication with the relay device 103 for each terminal 102 (210). A relay necessity/unnecessity determination result 211 is transferred to the relay device 103 via the wireless network with the MAC layer or an RRC (Radio Resource Control) layer (Layer 3).

By using the channel quality estimation result 207 of the first wireless channel, the channel quality estimation result 208 of the second wireless channel, and the channel quality estimation result 209 of the third wireless channel wirelessly fed back from the terminal 102 and the relay device 103, the base station 101 decides which terminal to communicate with (212). This corresponds to a so-called packet scheduler.

After selecting a communication counterpart terminal at 212, the base station 101 generates a transfer data sequence to that terminal, and generates a control packet indicating a wireless communication resource allocated to that terminal. Then, into an area (a cell) covered by the base station 101, the generated data sequence and control packet are transmitted to the wireless network (213).

The relay device 103 and the terminal 102 receive a base station transmission signal 214 including the data sequence and control packet broadcasted at 213. The relay device 103 and the terminal 102 each performs a receiving process 215 on the base station signal. In the receiving process on the base station signal, a baseband signal process is performed to extract a bit sequence of the data sequence and a bit sequence of the control packet. The relay necessity/unnecessity determination result 211 may be embedded in the control packet and extracted at the relay device 103.

The relay device 103 again codes the bit sequence of the data sequence and the bit sequence of the control packet extracted in the base station signal receiving process 215 and transmits anew the coded sequences from the relay device (217). Here, based on the relay necessity/unnecessity determination result 211 received from the base station 101, when relay is not performed, the data sequence and the bit sequence of the control packet are discarded in the relay device 103, and recoding and retransmission are not performed.

A retransmission signal 218 from the relay device 103 is received at the terminal 102, where a baseband signal process is performed similarly to the base station signal receiving process 215 (219), thereby extracting the bit sequence of the data sequence and the bit sequence of the control packet.

Figure 22:
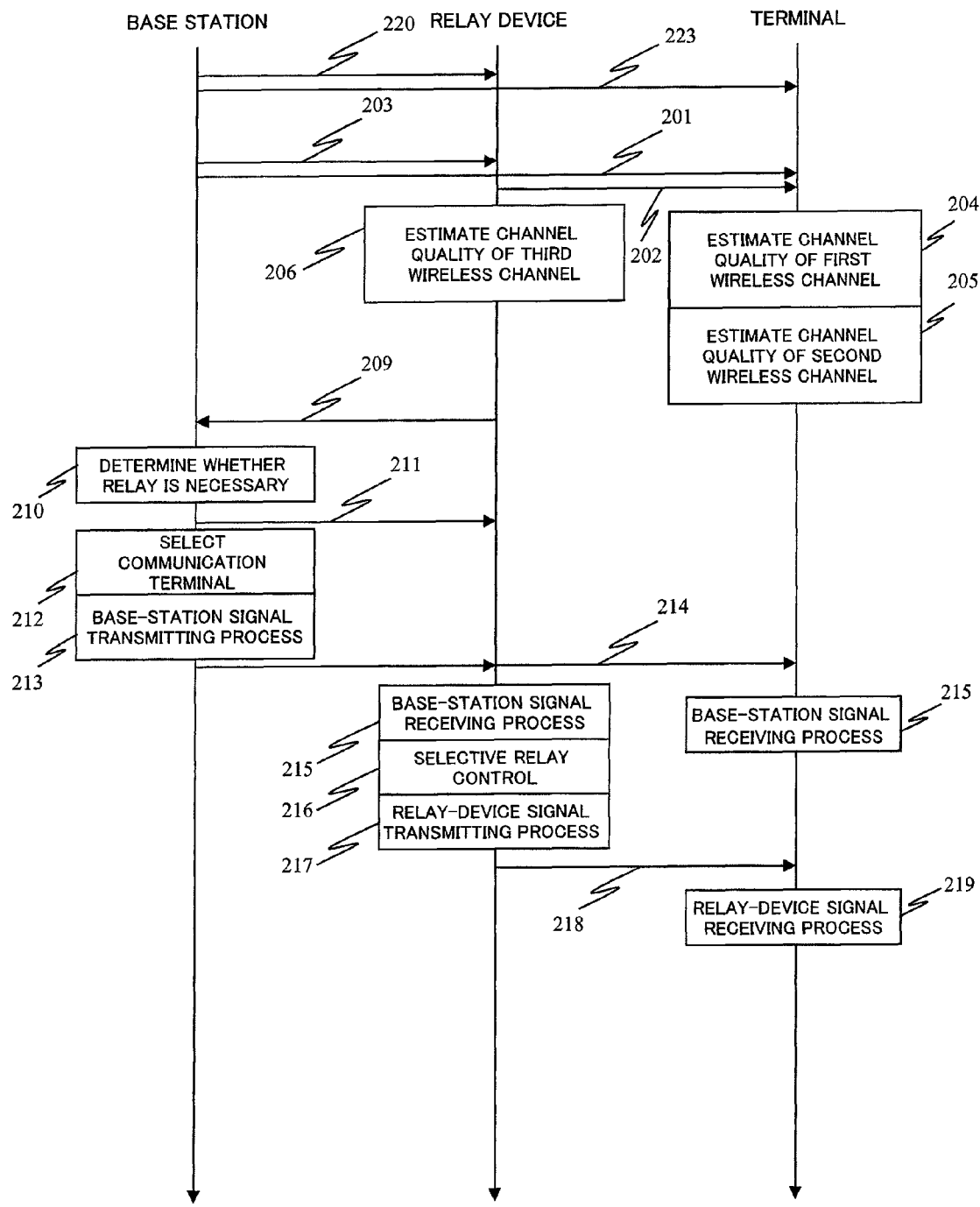
FIG. 22 is a chart showing a modification example of the downlink operation flow.
Figure 23:
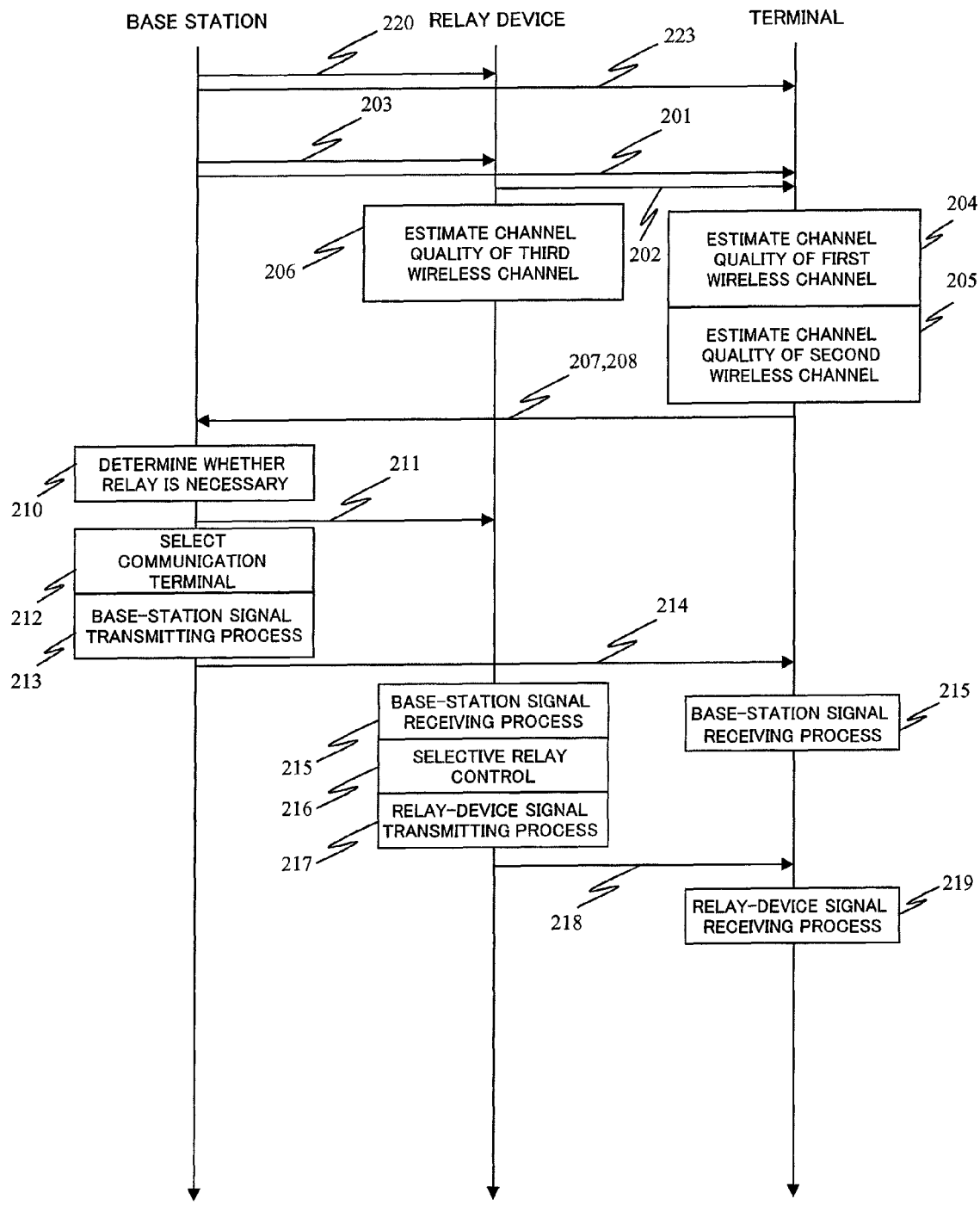
FIG. 23 is a chart showing a modification example of the downlink operation flow.

FIGS. 22 and 23 show modification examples of a downlink communication operation flow.

In FIG. 22, before the process of FIG. 4, at the start of the operation flow, a command 220 for the relay device 103 to start feedback of the wireless channel quality is transmitted from the base station 101 to the relay device 103. Also, a command 223 for the terminal 102 to stop feedback of the wireless channel quality is transmitted from the base station 101 to the terminal 102. On the other hand, accordingly, the process of feeding back the channel quality estimation result 207 of the first wireless channel and the channel quality estimation result 208 of the second wireless channel from the terminal 102 to the base station 101 in FIG. 4 is not performed. Here, in the relay necessity/unnecessity determination 210 of the base station 101, regarding the channel quality estimation result 207 of the first wireless channel and the channel quality estimation result 208 of the second wireless channel to be fed back from the terminal 102, the results previously collected are referred to. If the base station 101 is immediately after startup and does not have any previously collected results, it may be determined that relay is not necessary for the communication target terminal 102. The other operations are similar to those in FIG. 4.

FIG. 23 is a second modification example of the downlink communication operation flow. A difference from FIG. 4 is that a command 221 for the relay device to stop feedback of the wireless channel quality is transmitted from the base station 101 to the relay device 103. A command 222 for the terminal 102 to start feedback of the wireless channel quality is transmitted to the terminal 102 from the base station 101.

On the other hand, the process of feeding back the channel quality estimation result 209 of the third wireless channel from the relay device 103 to the base station 101 in FIG. 4 is not performed in FIG. 23. In this case, in the relay necessity/unnecessity determination 210 by the base station 101, regarding the channel quality estimation result 209 of the third wireless channel to be fed back from the relay device 103, the results previously collected are referred to. If the base station 101 is immediately after startup and does not have any previously collected results, it is determined that relay is not necessary for the communication target terminal 102. The other operations are similar to those in FIG. 4.

In the manner described above, the base station 101 controls start and stop of feedback of channel quality at the terminal 102 and the relay device 103 to the base station 101.

Figure 5:
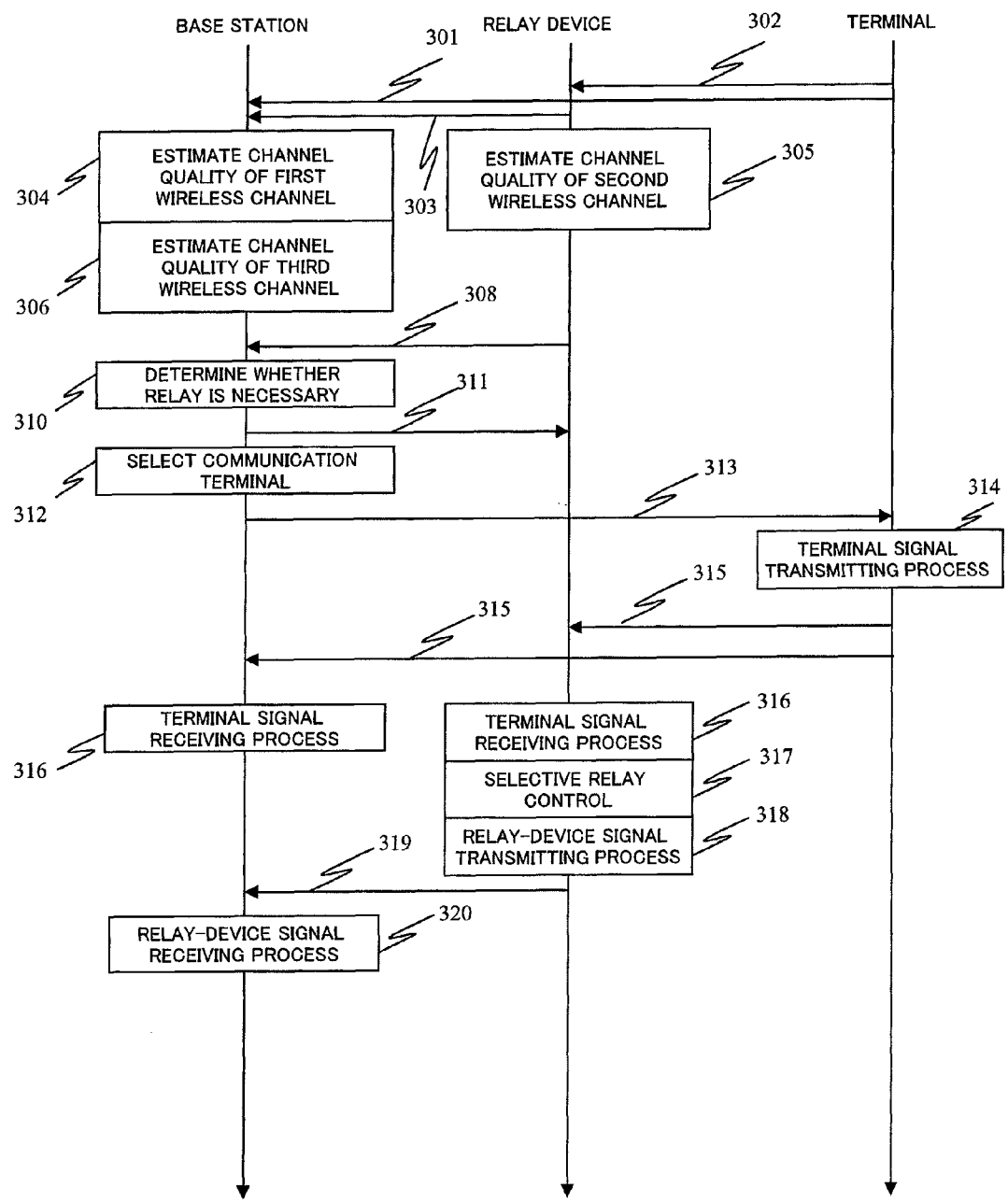
FIG. 5 is a chart showing a first embodiment of an uplink operation flow for achieving the present embodiment.

FIG. 5 shows a first embodiment of an uplink operation flow.

The terminal 102 transmits to the base station 101 a reference signal 301 for estimating channel quality of the first wireless channel and transmits to the relay device 103 a reference signal 302 for estimating channel quality of the second wireless channel.

The relay device 103 transmits to the base station 101 a reference signal 303 for estimating communication quality of the third wireless channel. The relay device 103 receives the reference signal 302 from the terminal 102, and uses the reference signal 302 to perform a channel quality estimation 305 of the second wireless channel. The relay device 103 wirelessly feeds back a channel quality estimation result 308 of the second wireless channel to the base station 101 with the MAC layer.

The base station 101 receives the reference signal 301, and uses the reference signal 301 to perform a channel quality estimation 304 of the first wireless channel. Also, the base station 101 receives the reference signal 303, and uses the reference signal 303 to perform a channel quality estimation 306 of the third wireless channel. Furthermore, the base station 101 receives a second wireless channel quality estimation result 308 fed back from the relay device 103 via the wireless network.

Then, by using the channel quality of the first wireless channel and the channel quality of the third wireless channel estimated at 304 and 306 and the channel quality estimation result 308 of the second wireless channel, the base station 101 performs a relay necessity/unnecessity determining process (310) for determining whether to perform relay communication with the relay device 103 for each terminal 102. A relay necessity/unnecessity determination result 311 is wirelessly transferred to the relay device 103 with the MAC layer or the RRC layer.

Furthermore, based on the channel quality of the first wireless channel, the channel quality of the second wireless channel, and the channel quality of the third wireless channel, the base station 101 selects the terminal 102 for which uplink communication is allowed (312), and transmits information about allocation to the allowed terminal 102 to the terminal 102 with the MAC layer (313).

The terminal 102 refers to the allocation information 313 transmitted from the base station 101 to confirm that a wireless communication resource for uplink communication is allocated to the terminal, and then generates a data sequence and a control packet to transmit an uplink signal (314).

An uplink wireless signal 315 transmitted by the terminal 102 is received by each of the base station 101 and the relay device 103, where a receiving process (316) on the terminal transmission signal is performed.

The relay device 103 again codes the bit sequence of the data sequence and the bit sequence of the control packet extracted at the terminal signal receiving process 316 and transmits anew the coded sequences from the relay device (318). Here, based on the relay necessity/unnecessity determination result 311 received from the base station 101, when relay is not performed, the data sequence and the bit sequence of the control packet are discarded in the relay device 103, and recoding and retransmission are not performed.

A retransmission signal 319 from the relay device 103 is received at the base station 101, where a baseband signal process is performed similarly to the terminal signal receiving process 316 (320) thereby extracting the bit sequence of the data sequence and the bit sequence of the control packet.

By performing the above-described processes in FIG. 4 and FIG. 5 in parallel, relay necessity/unnecessity determinations as to uplink communication and downlink communication and selective relay control may be performed simultaneously in parallel. Specifically, in a TDD (Time Domain Duplex) wireless communication system, these processes in FIGS. 4 and 5 are alternately performed in a time-division manner. In an FDD (Frequency Domain Duplex) wireless communication system, frequency division multiplexing is performed on a wireless section, and the processes in the base station, the relay device, and the terminal are performed in a time-division manner or in parallel.

Figure 24:
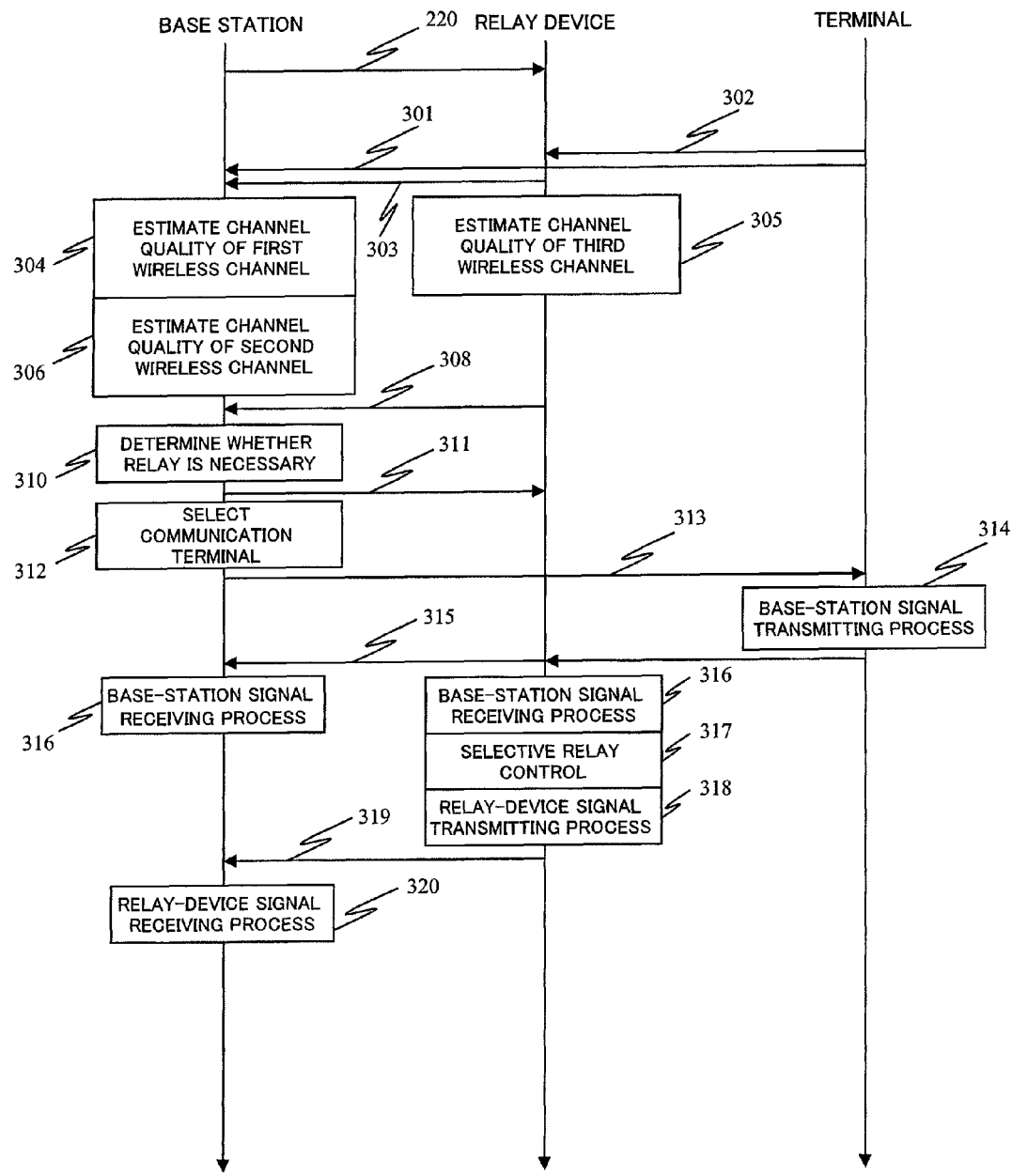
FIG. 24 is a chart showing a modification example of the uplink operation flow.
Figure 25:
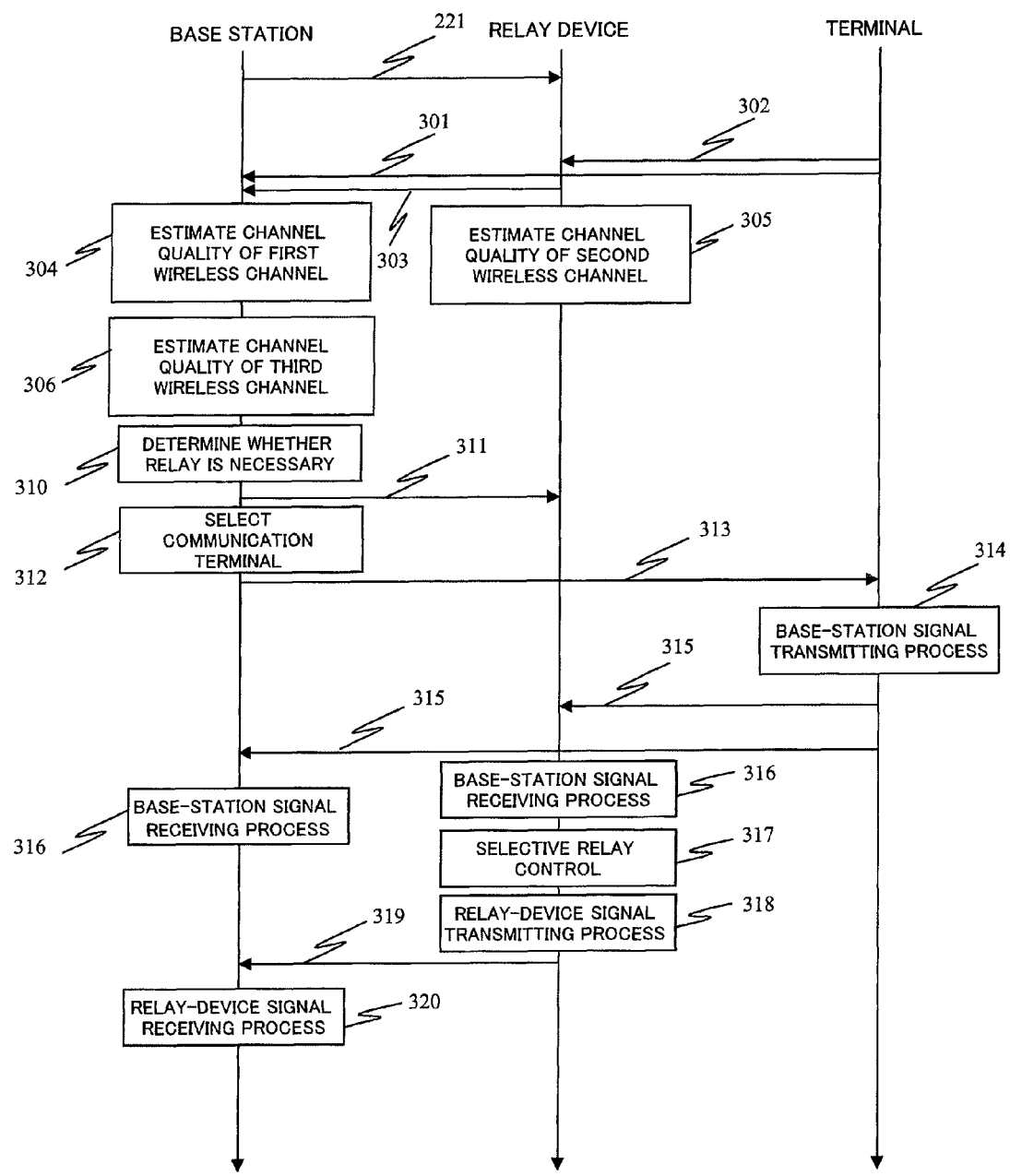
FIG. 25 is a chart showing a modification example of the uplink operation flow.

FIGS. 24 and 25 show modification examples of the uplink communication operation flow of FIG. 5.

In FIG. 24, at the start of the operation flow, the command 220 for the relay device 103 to start feedback of the wireless channel quality is transmitted from the base station 101 to the relay device 103. Upon reception of this command 220, the relay device returns the channel quality estimation result 308 of the uplink second wireless channel. The other operations are identical to those of FIG. 5.

FIG. 25 shows a second modification example of the uplink communication operation flow.

A difference from FIG. 5 is that, at the start of the operation flow, a command 221 for the relay device 103 to stop feedback of the wireless channel quality is transmitted from the base station 101 to the relay device 103. On the other hand, a process of notification of the channel quality estimation result 308 of the uplink second wireless channel in FIG. 4 is not necessary.

Upon reception of this command 221, the relay device 103 stops transmission of the channel quality estimation result 308 of the uplink second wireless channel to the base station. Here, in the relay necessity/unnecessity determination 310 of the base station 101, regarding the channel quality estimation result 308 of the uplink second wireless channel fed back from the relay device 103, the results previously collected are referred to. If the base station 101 is immediately after startup and does not have any previously collected results, it is determined that relay is not necessary for the communication target terminal 102. The other operations are similar to those in FIG. 5.

When the state is such that the feedback of the wireless channel quality from the relay device 103 in the modification example of FIG. 25 is stopped, the relay device 103 in FIG. 24 starts feedback with reception of the command 220 being taken as a trigger. Therefore, the modification examples of FIGS. 25 and 24 may be performed as being switched from each other. In the manner described above, the base station 101 controls start and stop of feedback of the channel quality at the terminal 102 and the relay device 103 to the base station 101.

In the wireless communication system in FIGS. 22 to 25 described above, control is performed in which a time frame in which the results estimated by the relay device are fed back and a time frame in which results estimated by the terminal are fed back are shifted from each other so that the relay device and the terminal do not simultaneously perform feedback in the same time frame.

Figure 26:
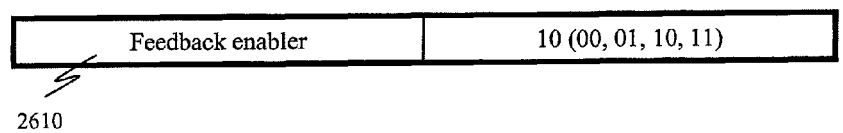
FIG. 26 is a diagram showing an example of a feedback enable command.

Also, the time frame in which the results estimated by the relay device are fed back and the time frame in which the results estimated by the terminal are fed back are presented by the base station. The command for starting and stopping feedback shown from FIGS. 22 to 25 is broadcasted by the base station as being included in a control signal to the relay device and terminal under control. FIG. 26 shows an example of a command to be broadcasted to the relay device and the terminal, that is, a format 2610 of a feedback enabler is shown.

Its information amount is two bits. The first bit serves as an indicator indicating whether the channel quality information estimated by the terminal is to be fed back to the base station. The second bit serves as an indicator indicating whether the channel quality information estimated by the relay device is to be fed back to the base station. Feedback-disabled is indicated when any indicator indicates 0, and feedback-enabled is indicated when any indicator indicates 1. When the two bits have a value of 00, this state is such that any feedback is disabled. When the two bits have a value of 01 or 10, the state is such that feedback of the relay device or the terminal is enabled. When the two bits have a value of 11, the state is such that feedback of both the relay device and the terminal is enabled.

The case where the first bit of the two bits is 0 corresponds to the command 223, the case where the first bit is 1 corresponds to the command 222, the case where the second bit is 0 corresponds to the command 221, and the case where the second bit is 1 corresponds to the command 220. Two-bit transmission corresponds to the case where two of these commands are simultaneously broadcasted.

FIGS. 6A to 6D show embodiments regarding a method of transmitting various reference signals. Here, although downlink communication is described as an example, these embodiments can be applied to uplink communication.

Figure 6A:
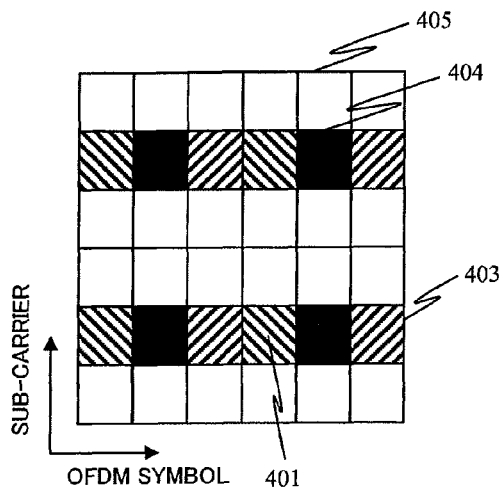
FIG. 6A is a diagram showing a first embodiment of a method of transmitting a reference signal symbol from a base station in the present embodiment.

FIG. 6A shows a first example of a method of transmitting a reference signal (more specifically, a reference signal symbol sequence) from the base station 101 in the present embodiment. Diagonally shaded symbols denoted as 401 each represent a reference signal symbol for channel quality estimation of the first wireless channel to be transmitted from the base station to the terminal. Inverted diagonally shaded symbols denoted as 403 each represent a reference signal symbol for channel quality estimation of the third wireless channel to be transmitted from the base station to the relay device. Solidly shaded symbols 404 each represent a null symbol. White symbols 405 each represent a data symbol. In FIG. 6A, the reference signal symbols 401 for channel quality estimation of the first wireless channel and the reference signal symbols 403 for channel quality estimation of the third wireless channel are arranged not in the same time and frequency so that they can be identified on a reception side (the terminal and the relay device).

The terminal 102 compares the reference signal symbol 401 for channel quality estimation of the first wireless channel received from the base station 101 and the reference signal symbol retained in the terminal itself to estimate a propagation path gain received by the symbol 401. The relay device compares the reference signal symbol for channel quality estimation of the third wireless channel received from the base station and the reference signal symbol retained in the relay device itself to estimate a propagation path gain received by the symbol 403.

Note that in the case of uplink communication, 401 in FIG. 6A corresponds to the reference signal symbol for channel quality estimation of the first wireless channel, and 403 corresponds to the reference signal symbol for channel quality estimation of the second wireless channel. 404 and 405 are similar to those of downlink communication.

Figure 6B:
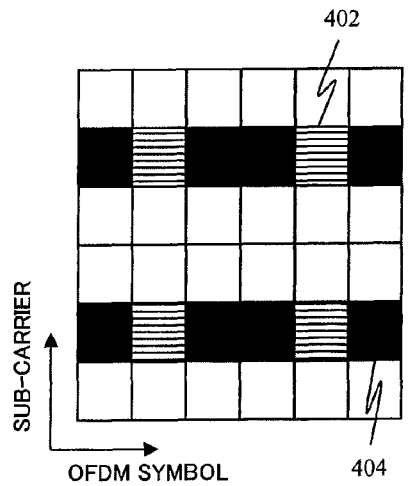
FIG. 6B is a diagram showing an embodiment of a method of transmitting a reference signal symbol from a relay device in the present embodiment.

FIG. 6B shows an example of the method of transmitting the reference signal symbol from the relay device 103 in the present embodiment. 402 denotes a reference signal symbol for quality estimation of the second wireless channel to be transmitted by the relay device 103 to the terminal 102. At locations where the symbols allocated to 401 and 403 in FIG. 6A, null symbols 404 are arranged to be shifted in time and frequency so as not to interfere with reference signal symbols to be transmitted by the base station. The terminal 102 estimates a propagation path gain received by the symbol 402 by comparing the reference signal symbol 402 for channel quality estimation of the second wireless channel received from the relay device 103 and the reference signal symbol retained in the terminal itself. In the case of uplink communication, 402 corresponds to a reference signal symbol sequence for quality estimation of the third wireless channel to be transmitted by the relay device to the base station.

Figure 6C:
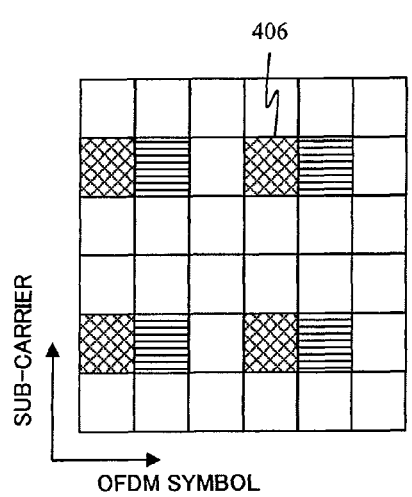
FIG. 6C is a diagram showing a second embodiment of the method of transmitting a reference signal symbol from the base station in the present embodiment.

FIG. 6C shows a second example of the method of transmitting a reference signal symbol from the base station in the present embodiment. Symbols 406 are symbols defined as reference signal symbols playing two roles of 401 and 403. As such, by merging reference signal symbols playing two roles into one type, the number of reference signal symbols and overhead of reference signal symbols viewed from the entire system can be reduced, thereby increasing system's frequency use efficiency. 406 is handled as a reference signal symbol for channel quality estimation of the third wireless channel when received at the relay device 103, and is handled as a reference signal symbol for channel quality estimation of the first wireless channel when received at the terminal 102.

Note that, in the uplink communication, 406 is transmitted by the terminal. 406 is handled as a reference signal symbol for channel quality estimation of the second wireless channel when received at the relay device 103, and is handled as a reference signal symbol for channel quality estimation of the first wireless channel when received at the base station 101.

Figure 6D:
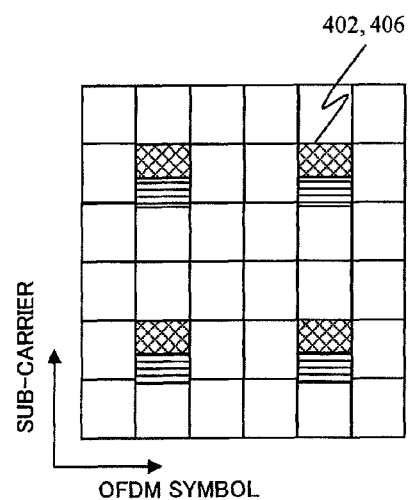
FIG. 6D is a diagram showing an embodiment of overlap transmission of a reference signal symbol from the base station and a reference signal symbol from the relay device in the present embodiment.

FIG. 6D shows an embodiment of overlap transmission of a reference signal symbol from the base station and a reference signal symbol from the relay device. The reference signal symbol 406 transmitted from the base station and the reference signal symbol 402 transmitted from the relay device overlap at the same time (OFDM symbol) and the same frequency (sub-carrier). In this reference signal symbol transmitting method, compared with the example of FIG. 6C, the number of reference signal symbols and overhead of reference signal symbols viewed from the entire system can be further reduced, resulting in an increase in the system's frequency use efficiency.

In the example of FIG. 6D, the reference signal symbol sequences overlap at four points. If channel responses are assumed to be the same at these four points, by using, for example, Walsh sequences, as reference signal symbol sequences, reference signal symbols of two types can be discriminated from each other on a reception side, thereby estimating a channel response and communication quality for each reference signal symbol. Furthermore, the reference signal symbol 406 transmitted by the base station is observed by the relay device and terminal separately as in the example of FIG. 6C, communication qualities of the third wireless channel and the first wireless channel can be estimated.

Figure 7:
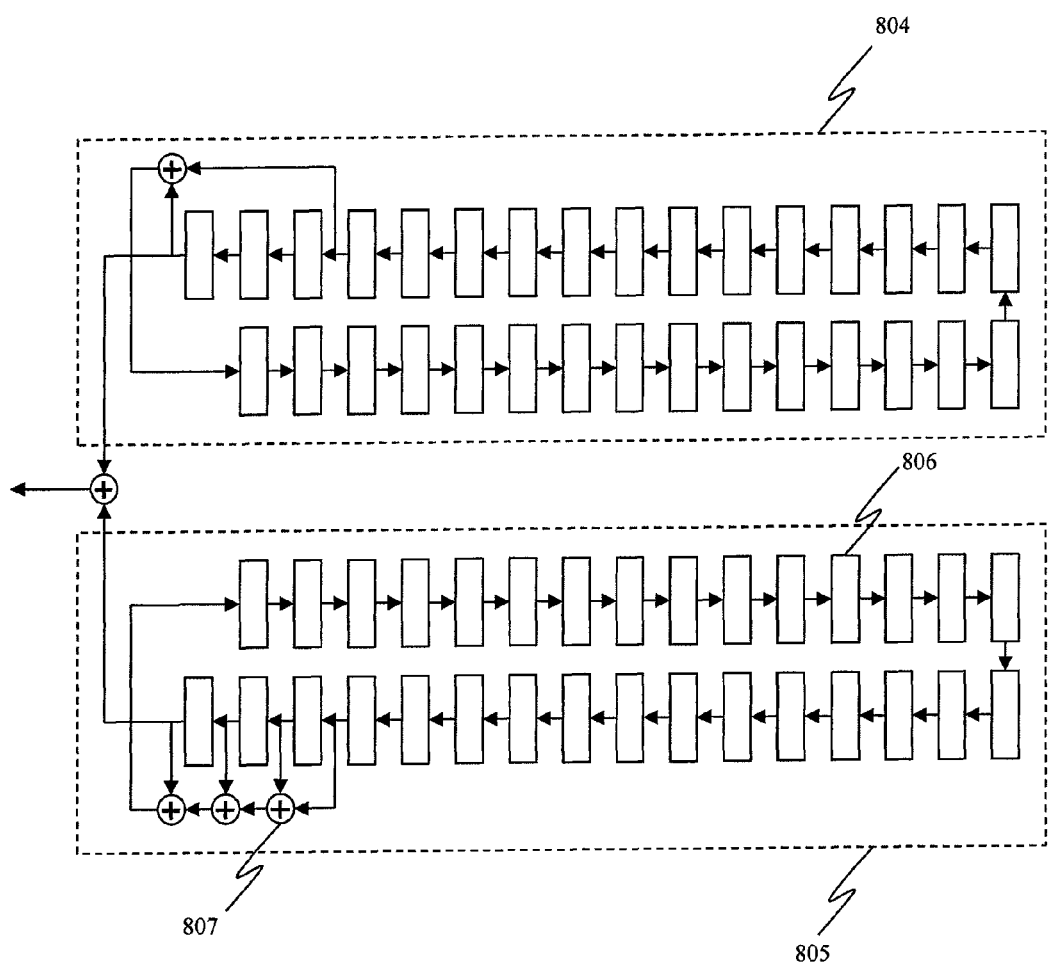
FIG. 7 is a diagram showing an embodiment of a reference signal symbol sequence generating method in the present embodiment.

FIG. 7 shows an example of a reference signal symbol sequence generating method.

Here, description is made along the method described in Non-Patent Document 2. Reference signal symbol sequence are mapped in a QPSK constellation based on bit sequences of 0 and 1 obtained by using a linear feedback shift register. Here, even-numbered bit sequences are arranged to I components, and odd-numbered bit sequences are arranged to Q components. In the case of 0, a relevant I component or Q component is mapped as positive (1/sqrt(2), where sqrt(x) represents the square root of x); and, in the case of 1, a relevant I component or Q component is mapped as negative (−1/sqrt(2))).

When a linear feedback shift register is used, the contents in the shift register are required to be initialized. According to Non-Patent Document 2, initial values are set depending on four points, that is, a slot number (a slot is configured of six or seven OFDM symbols; twenty slots are called one frame, and the slot number indicates a slot number in one frame; therefore, a codomain is 0 to 19), an OFDM symbol number in which a reference signal symbol in a slot is to be inserted, a cell-specific identification number (a cell ID), and a Cyclic Prefix mode (in Non-Patent Document 2, there are Normal mode and Extend mode, and the number of OFDM symbols varied as 7 and 6, respectively, and therefore a differentiation is made therebetween; and the mode has a value not varied during system operation). That is, initialization is made for each OFDM symbols with the highest update frequency. These values are values shared by the base station, the relay device, and the terminal.

Note in Non-Patent Document 2 that, as shown in FIG. 7, a result obtained by combining two M-sequence generation shift registers 804 and 805 is taken as a bit sequence source for generating a reference signal symbol sequence. In 804, a leftmost register 806 is set at 1 every time an OFDM symbol is changed, and all of the other registers are set at 0 as an initial value. In the M-sequence shift register 805, an initial value depending on the above four points is subjected to binary display, and each bit value is stored in each register 806.

After the value of 0 or 1 is set in each register as an initial value, the contents of the register are shifted in a direction indicated by arrows to generate an output bit sequence (a bit sequence serving as a reference signal symbol sequence source). 807 is an exclusive OR.

FIGS. 8A to 8C show examples of feedback formats of various wireless channel qualities to the base station indicating the results of channel quality estimations of the wireless channels. While these are described as examples of feedback with the MAC layer, similar information can be fed back with the RRC layer as long as they are defined on a wireless communication protocol with the base station.

FIG. 8A shows an example of a feedback format of various wireless channel qualities from the terminal 102 to the base station 101 in downlink communication. FIG. 8A corresponds to 207 and 208 in FIG. 4. Information to be fed back from each terminal to the base station is a terminal ID 820 for the base station to specify from which terminal the feedback comes and a CQI 830 of the first wireless channel and a CQI 840 of the second wireless channel measured by the terminal.

For example, in the case of LTE, a feedback field of PUCCH (Physical Uplink Control Channel; refer to Non-Patent Document 2) can be extended or the feedback format can be added.

FIG. 8B shows an example of a feedback format of various wireless channel qualities from the relay device to the base station in downlink communication. FIG. 8B corresponds to 209 of FIG. 4. Information to be fed back by each relay device to the base station is a relay device ID 850 for the base station to specify from which relay device the feedback comes and a CQI 860 of the third wireless channel measured by the relay device. For example, in the case of LTE, the feedback field of PUCCH can be extended or the feedback format can be added. A channel dedicated to a backhaul line between the base station and the relay device, for example, R-PUCCH (Relay-Physical Uplink Control Channel), may be newly defined.

FIG. 8C is an example of a feedback format of various wireless channel qualities from the relay device to the base station in uplink communication. FIG. 8C corresponds to 301, 303, and 308 of FIG. 5. What is fed back by each relay device to the base station is the relay device ID for the base station to specify from which relay device the feedback comes, a terminal ID 820 of the second wireless channel measured by the relay device, and a CQI 840 for each terminal ID. An achieving method is similar to that of FIG. 8B.

FIG. 20A to FIG. 20D show examples of timings of feeding back various wireless channel qualities to the base station, the qualities indicating the channel quality estimation results of the wireless transmission path.

Figure 20A:
FIG. 20A is a diagram showing an example of a timing of channel quality feedback to the base station in a wireless communication system without a relay device.

FIG. 20A is a timing chart in a wireless communication system without a relay device. One box represents one sub-frame. Black boxes each represent a sub-frame 901 for feedback of communication quality of a downlink first wireless channel from the terminal. An interval for feedback is set to be Np sub-frames. What is to be fed back is the information shown in FIG. 8A excluding the CQI (the second wireless channel).

Figure 20B:
FIG. 20B is a diagram showing a first example of a timing of channel quality feedback to the base station in a wireless communication system with a relay device.

FIG. 20B shows a first example of a timing chart in a wireless communication system with a relay device. 901 denotes a sub-frame for feedback of communication quality of the downlink first wireless channel and the downlink second wireless channel from the terminal. The feedback details are similar to those of FIG. 8A. 902 denotes a sub-frame for feedback of communication quality of a downlink third wireless channel and an uplink second wireless channel from the relay device. The feedback details are as shown in FIGS. 8B and 8C.

As compared with FIG. 20A, the number of times of feedback of wireless channel quality is not changed in the entire system. However, since feedback opportunities are shared between the terminal and the relay device, a feedback period of each communication quality is doubled compared with that of FIG. 20A. That is, while the amount of feedback is kept at a former level, the feedback period is doubled compared with the former one. With the feedback period being extended, the amount of change in communication quality of a wireless propagation path in that period is generally increased due to fading or the like. Therefore, accuracy of feedback information tends to decrease and, as a result, transmission capability (capacity) of the wireless channel cannot be fully utilized. On the other hand, since the number of times of feedback is suppressed, wireless communication resources to be consumed can be saved in proportion to the number of times of feedback, and therefore the transmission capability of the wireless channel can be increased by that amount.

Figure 20C:
FIG. 20C is a diagram showing a second example of the timing of channel quality feedback to the base station in the wireless communication system with a relay device.

FIG. 20C illustrates a second example of the timing chart in the wireless communication system with a relay device. 901 and 902 are similar to those of FIG. 20B.

As compared with FIG. 20A, the number of times of feedback of wireless channel quality is doubled, and the number of times of feedback by the terminal and the number of times of feedback by the relay device are respectively similar to those in FIG. 20A. Since feedbacks at the same frequency as that of FIG. 20A are performed, the degree of utilization of the wireless transmission capability depending on the feedback period is equivalent to that of FIG. 20A. However, since the number of times of feedback is doubled, the wireless communication resources can be more excessively consumed in proportion to the number of times of feedback compared with FIG. 20A, thereby accordingly lowering the transmission capability of the wireless channel.

Figure 20D:
FIG. 20D is a diagram showing a third example of the timing of channel quality feedback to the base station in the wireless communication system with a relay device.

FIG. 20D shows a third example of the timing chart in the wireless communication system with a relay device. 901 and 902 are similar to those of FIG. 20B.

Although the total amount of feedback is equal to that of FIG. 20A, the feedback period from the terminal and the feedback period from the relay device are inconstant. At a portion where the feedback period is extended, as shown also in the example of FIG. 20B, accuracy of the feedback information tends to be lowered. However, in the case of the relay device not moving, the amount of change in communication quality of the third wireless channel between the base station and the relay device is thought to be small with respect to time. Therefore, by providing slightly more feedback opportunities to a terminal having a larger amount of change in communication quality with respect to time, a decrease in accuracy of the feedback information shown in the example of FIG. 20B is less prone to occur and, advantageously, it becomes easier to utilize the transmission capability of the wireless channel. However, it is required for the base station to report the start or stop of feedback to the relay device and the terminal. This reporting method has been described in the embodiments of FIGS. 22 to 26.

FIG. 9 shows an example of a format of the relay necessity/unnecessity determination result of which the relay device is notified by the base station. This format is an example in the MAC layer.

FIG. 9 shows a control signal indicating a method of transmitting a downlink data channel corresponding to DCI (Downlink Control Information; refer to Non-Patent Document 3) of LTE. This control signal is transmitted together with a data signal from the base station, and is received by each of the terminal and the relay device. A first field is a terminal ID 910, which is a destination terminal ID of this control signal and a data signal associated with the control signal. A second field 920 is a bit flag indicating a position of a wireless communication resource allocated to that terminal, showing that a partial resource indicated by "1" is allocated to the terminal. For example, when the system frequency is divided into twelve, in the example of FIG. 9, "1" is set at fifth and sixth bits from left, and therefore this indicates that fifth and sixth divisional frequencies are allocated to the terminal. A third field 930 is a MCS (Modulation & Coding Scheme), which is an indicator uniquely indicating a modulation scheme and a coding rate. A fourth field 940 is a flag indicating a relay necessity/unnecessity determination result. This flag is a relay necessity/unnecessity determination flag indicating whether the control signal and the data signal associated with the control signal are to be relayed. In the example of FIG. 9, when relay is determined as necessary as a result of the relay necessity/unnecessity determination by the base station 101, the relay flag 940 has a value of 1. When relay is determined as unnecessary, the relay flag has a value of 0. When the relay device detects "1" in the flag value, the control signal and the associated data signal are relayed. In the case of "0", the control signal and the data signal are discarded in the relay device.

FIG. 10 shows an example of the relay necessity/unnecessity determination result of which the relay device is notified by the base station. FIG. 10 shows an example of the format in the RRC layer.

A first field 1010 is a destination relay device ID to be notified of the relay necessity/unnecessity determination result. A second field 1020 is a relay flag bitmap indicating a terminal ID for which relay is to be performed by the relay device. In the example of this diagram, "1" (relay is to be performed) is set at twelve bits on a left side, and "0" (relay is not to be performed) is set at twelve bits on a right side. By creating a rule between the base station and the relay device such that bits are associated with terminals ID 0, 1, 2, . . . from the left side, it can be found from the results that relay is performed by the relay device for those with terminal IDs of 0 to 11, and relay is not performed at the terminal devices with terminal IDs of 12 to 23. Which control signal and data signal, which have been actually arriving at the relay device, are to be relayed is decided by analyzing the contents of the reference signal accompanying the data signal shown in FIG. 9 and matching with relay necessity/unnecessity determination result for each terminal ID based on the bit flags, thereby achieving a selective relay process.

Figure 21:
FIG. 21 is a diagram showing an example of a conversion table from wireless channel quality (CQI) to capacity.

FIG. 21 shows an example of a table for converting a CQI (Channel Quality Indicator) to a wireless channel capacity described in Non-Patent Document 4.

Figure 11:
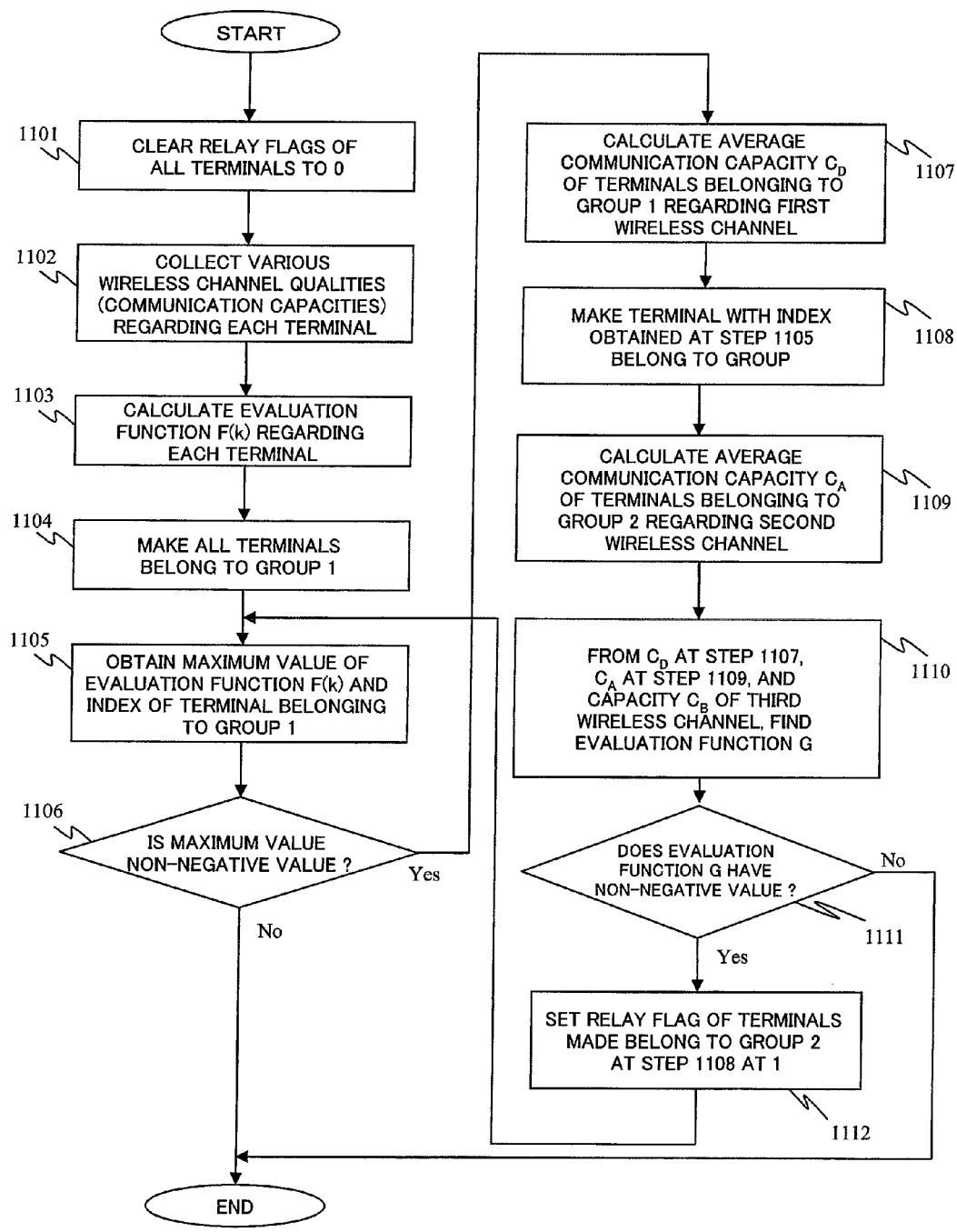
FIG. 11 is a diagram showing an embodiment of relay necessity/unnecessity determination according to the present embodiment.

A first column 2110 counted from left indicates a CQI index. 2110 denotes an example of a four-bit CQI, and includes sixteen indexes in total. A second column 2120 counted from left indicates a modulation scheme for use in each CQI index. A third column 2130 counted from left indicates a ratio of systematic bits (organized bits), which are of an original bit string, when the number of all bits to be generated including parity bits is 1024 upon generating code words from the bit string. That is, x/1024 represents a coding rate. A fourth column 2140 from left indicates a frequency use efficiency [bit/s/Hz] when retransmission does not occur, that is, a capacity. Conversion from a CQI (wireless channel quality) to a capacity to be performed at step 1102 of FIG. 11 is performed according to the table as shown in FIG. 21. Note that Out of Range when the CQI index is 0 represents a state in which data communication cannot be performed when the terminal or the relay device feeds back the CQI.

FIG. 11 shows an embodiment of a relay necessity/unnecessity determining process at the base station 101. A common algorithm is used between uplink communication and downlink communication. The process corresponds to details of processes at 1004 of FIG. 3, 210 of FIGS. 4, and 310 of FIG. 5.

At step 1101, relay flags regarding all terminals belonging to the base station are set at 0. At step 1102, communication qualities of the first wireless channel and the second wireless channel regarding each terminal and communication quality of the third wireless channel regarding the relay device are collected according to the procedure shown in FIG. 4 and FIG. 5, and the conversion table is used for conversion from a CQI to a capacity. At step 1103, an evaluation function regarding each terminal k is calculated. An evaluation function F(k) is represented by the following equation.

$$F(k) = \frac{C_A(k)}{C_D(k)} - \frac{C_A(k)}{C_B} - 1 \qquad [\text{Equation 10}]$$

Here, $C_A(k)$ is a capacity indicating communication quality of the second wireless channel regarding a terminal k, $C_D(k)$ is a capacity indicating communication quality of the first wireless channel regarding the terminal k, and $C_B$ is a capacity indicating communication quality of the third wireless channel.

At step 1104, all terminals are once made belong to a group 1. The group 1 represents a group of terminals using the first wireless channel. After that, the terminals are sequentially made temporarily belong to a group 2 (a group of terminals using the second wireless channel), and whether a system capacity gain can be obtained by moving from the group 1 to the group 2 is evaluated.

At step 1105, from among the terminals belonging to the group 1, an index of a terminal having a maximum value of the evaluation function F (k) and an evaluation function maximum value are obtained. At step 1106, it is determined whether this evaluation function maximum value is non-negative or negative. When the value is negative as a result of determination, it is determined that the system capacity is decreased if more terminals are allocated to the second wireless channel, and thus the relay necessity/unnecessity determining process ends. On the other hand, when the value is not negative (when the value is non-negative), the procedure goes to step 1107.

At step 1107, an average capacity $C_D$ regarding the first wireless channel of the terminals belonging to the group 1 before the terminals index-specified at step 1105 moves to the group 2 is calculated. At step 1108, the terminal index-specified at step 1105 is moved to group 2. At step 1109, an average capacity $C_A$ regarding the second wireless channel of the terminals belonging to the group 2 is calculated.

At step 1110, an evaluation function G is found from $C_D$ at step 1107, $C_A$ at step 1109, and the capacity $C_B$ of the third wireless channel. The evaluation function G is represented by the following equation.

$$G = \frac{C_A}{C_D} - \frac{C_A}{C_B} - 1 \qquad [\text{Equation 11}]$$

At step 1111, whether the evaluation function G is non-negative or negative is determined. When the function is negative, it is determined that a system capacity gain cannot be obtained, and relay necessity/unnecessity determination ends. On the other hand, when the function is non-negative, the relay flag of the terminal moved to group 2 at step 1108 is set at "1". To determine whether to move the next terminal to the group 2 under the condition in which the terminal has been moved to the group 2, the procedure returns to step 1105.

FIGS. 12A and 12B show examples of a state management table for each terminal in relay necessity/unnecessity determination in FIG. 11.

The example of FIG. 12A shows a state in which step 1104 of FIG. 11 has been completed. When step 1105 is applied to this example, a maximum evaluation function value +3.0 is obtained for the terminal 3. Since this maximum evaluation function value is non-negative, $C_D$=(1+5+1)/3≈2.3 is calculated at step 1107. The terminal 3 is moved to the group 2 at step 1108, and $C_A$=5 is obtained at step 1109. At step 1110, by using these $C_A$, and $C_B$=5, the evaluation function G is calculated. G=(5/2.3)−(5/5)−1≈0.17. Therefore, since the evaluation function G is non-negative, 1 is set at a relay flag of the terminal 3. The state at this moment is shown in FIG. 12B. While the procedure returns to step 1105 in this state, except for the terminal 3 that moved to the group 2, the evaluation function value is less than 0 at maximum, and therefore the relay necessity/unnecessity determining process ends. In the flowchart of FIG. 11 described above, the base station compares a communication performance loss and a communication performance gain in a case of using a relay device that are calculated from the first wireless channel quality, the second wireless channel quality, and the third wireless channel quality, and makes a relay necessity/unnecessity determination based on the comparison result.

With reference to FIGS. 13 to 17, the structures of the base station, the relay device, and the terminal included in the wireless communication system are described.

Figure 13:
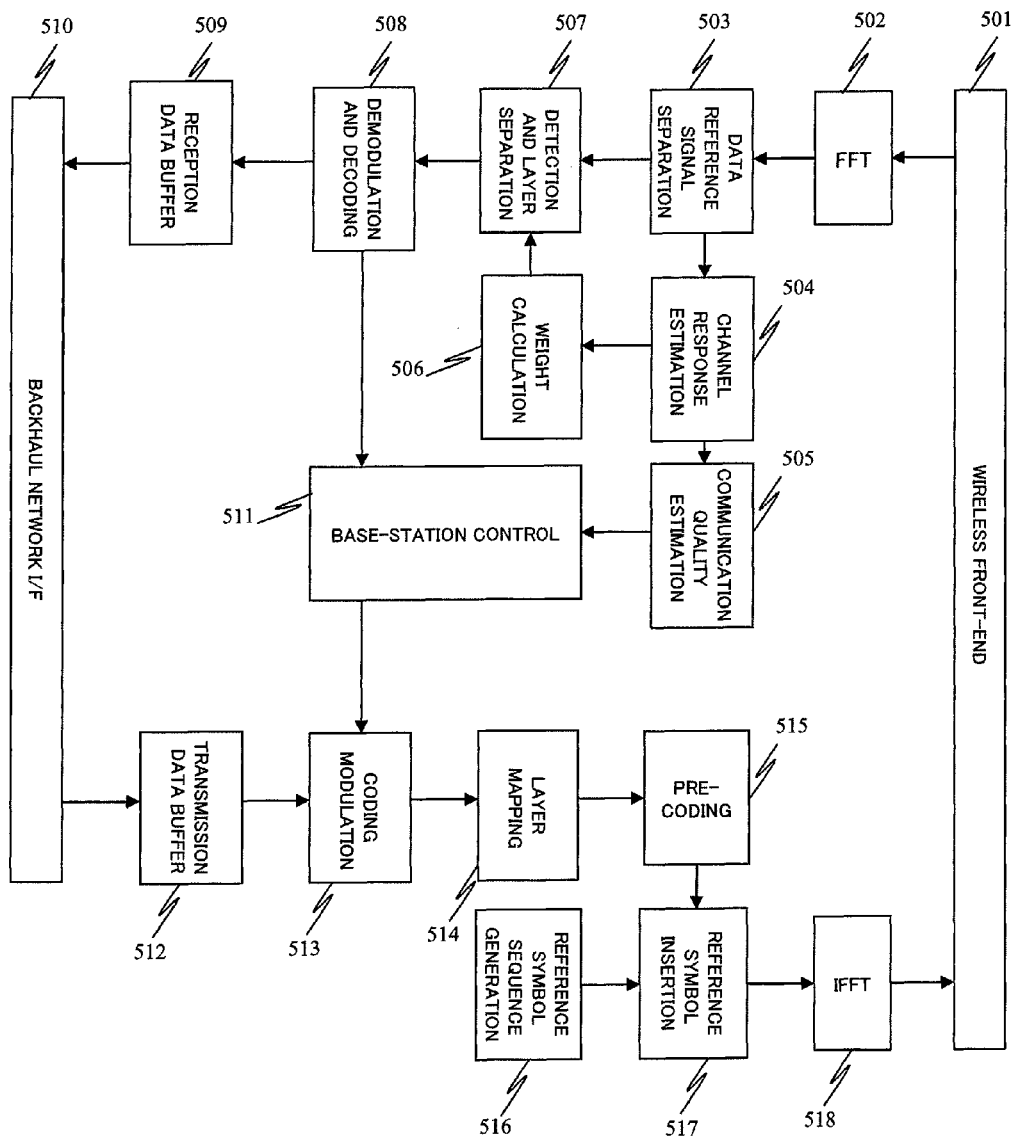
FIG. 13 is a diagram showing an example of structure of the base station.

FIG. 13 shows an example of structure of the base station.

A wireless front-end 501 is configured of an antenna, a duplexer, a power amplifier, a low-noise amplifier, an up-converter, a down converter, an analog-digital conversion, and digital-analog conversion. The wireless front-end 501 performs transmission and reception of a wireless frequency signal. An uplink reception baseband signal is subjected to an FFT process at 502, and separation into a data symbol and a reference signal symbol is performed at 503.

For the reference signal symbol obtained by separation at 503, a propagation-path response-estimating unit 504 performs response estimation of an uplink first wireless channel and an uplink third wireless channel. A known reference signal symbol is used on both of transmission and reception sides (the terminal and the base station, and the relay device and the base station) for estimation of a channel response. When the reference signal symbol is not changed with time, the propagation-path response-estimating unit 504 causes a fixed and known reference signal symbol sequence to be retained in a memory (for example, a memory 2730 of FIG. 27). When the reference signal symbol is changed with time, the channel response estimating unit 504 generates a reference signal symbol sequence according to a reference signal symbol sequence rule shared between the transmission side and the reception side.

Figure 18:
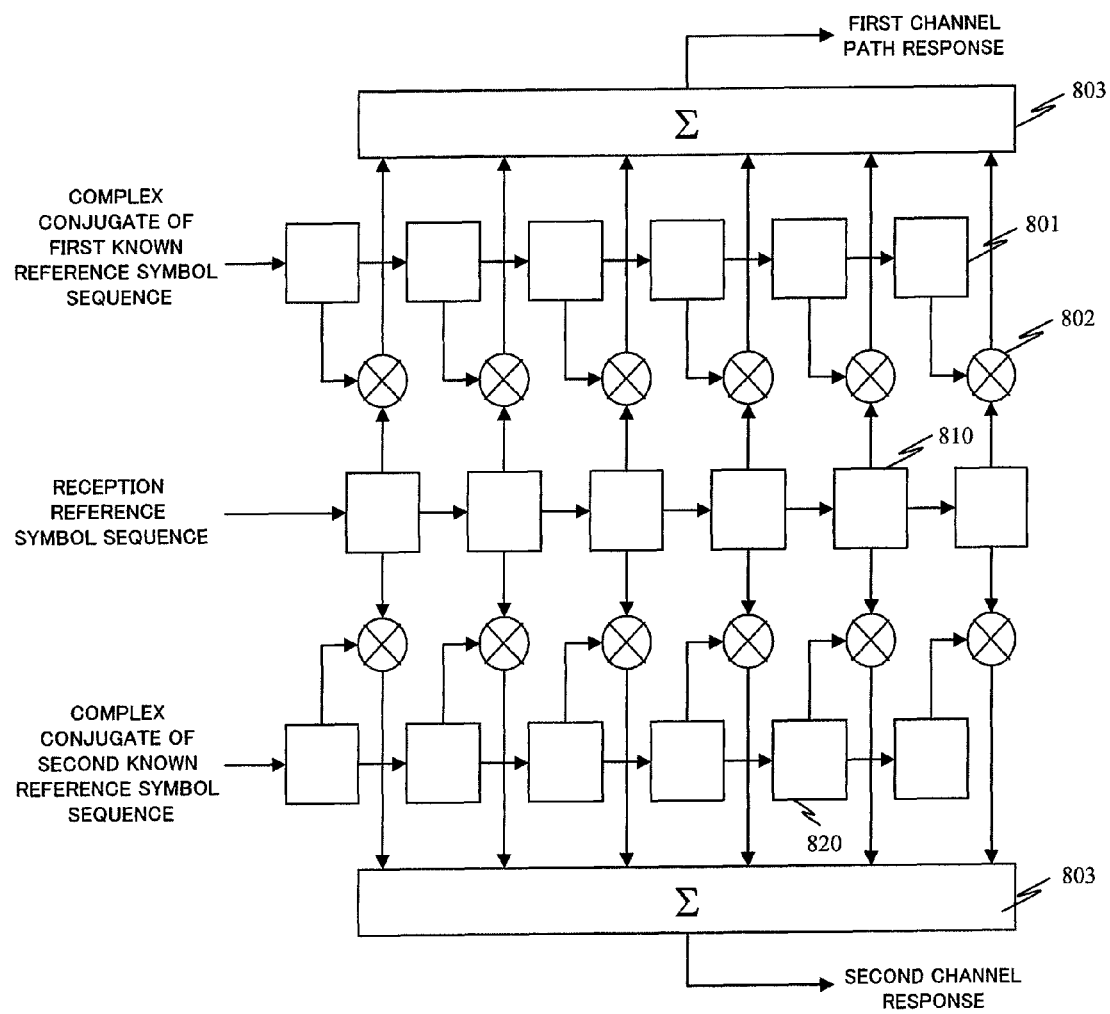
FIG. 18 is a diagram showing an embodiment of a device achieving channel response estimation of a plurality of wireless channels by using a plurality of reference signals overlapping at the same time and frequency.
Figure 19:
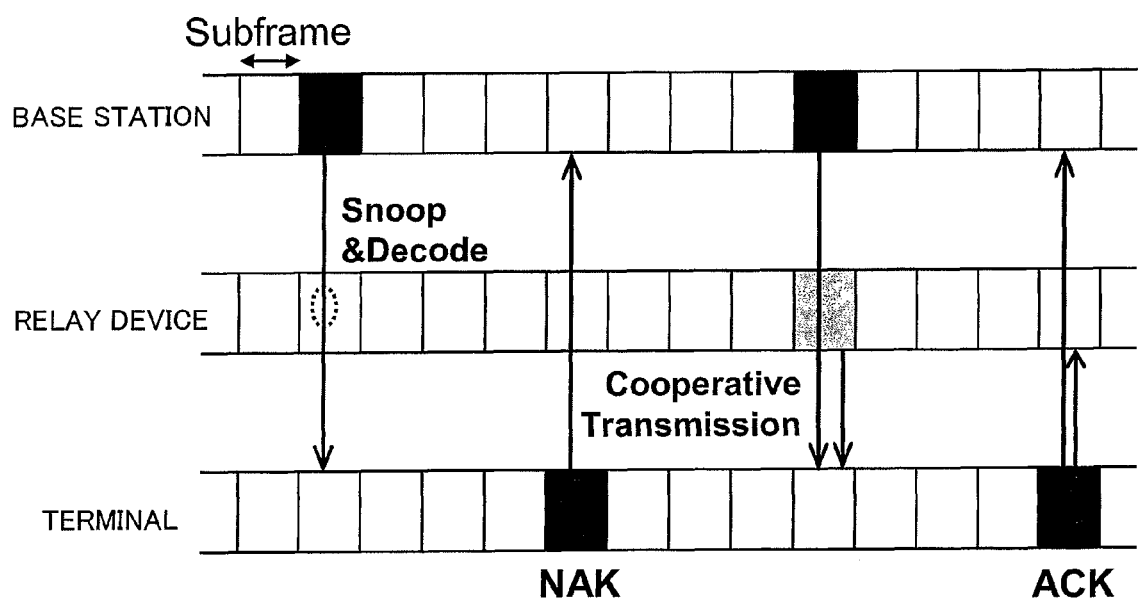
FIG. 19 is a diagram showing an example of a cooperative communication timing between the base station and the relay device.

Also, when a plurality of reference signal symbol sequences with a low cross-correlation are multiplexed at the same time frequency, that is, when the terminal and the relay device multiplex different reference signal symbol sequences at the same time frequency, as depicted in FIG. 18, the received reference signal symbol sequences are crammed into an intermediate-stage register 810 sequentially from a right side. Similarly, a known first reference signal symbol sequence complex-conjugated is crammed into an upper-stage register 801 sequentially from a right side. A known second reference signal symbol sequence complex-conjugated is crammed into a lower-stage shift register 820 sequentially from a right side.

In that state, as shown in the drawing, adders 803 and multipliers 802 perform multiplication and addition, and therefore a channel response for the first reference signal symbol and a channel response for the second reference signal symbol can be extracted. Here, the received reference signal symbol sequence is inputted from 503, and the known first reference signal symbol and second reference signal symbol are from a memory for recording a fixed pattern in 504 or, according to a reference signal symbol sequence rule shared between the transmission side and the reception side in 504, the result generated, for example, as in the embodiment of FIG. 7, is inputted.

A communication quality estimating process unit 505 estimates communication quality based on the propagation path estimation result of 504. Corresponding to 304 and 306 of FIG. 11, the communication quality estimating process unit 505 estimates communication quality of each of an uplink first wireless channel and an uplink third wireless channel. In an example of a most simple method of estimating communication quality, noise power and interference power are assumed to have a fixed value, the square of the propagation path estimation result estimated at 504 is taken as a desired signal electric power, a value obtained by driving the desired signal electric power by the fixed value is handled as a SINR (Signal to Interference plus Noise Ratio), and this is converted to the Shannon capacity. However, if the assumption deviates from actualities, communication quality estimation is erroneous, and therefore performing outer loop control is considered. For example, the control is as follows. Data communication is repeated with a certain fixed value being assumed, and when a packet error rate of a data sequence is larger than a threshold (for example, it is set at 1% or 0.1%), a sum of actual noise power and interference power is thought to be larger than the fixed value. Therefore, the fixed value is increased. When the packet error rate of the data sequence is smaller than the threshold, the sum of actual noise power and interference power is thought to be smaller than the fixed value. Therefore, the fixed value is decreased.

And, the communication quality estimating unit 505 estimates the uplink first wireless channel and third wireless channel, and inputs the estimated qualities to a base-station control block 511.

506 denotes calculation of a reception weight by using the propagation path estimation result of 504. An aim of the reception weight is to separate a plurality of received spatial layers and perform phase correction of each spatial layer. Known examples of an algorithm for reception weight calculation include ZF (Zero Forcing) and MMSE (Minimum Mean Square Error).

At 507, a data symbol vector of each of the plurality of spatial layers obtained by separation at 503 is multiplied by a received weight matrix calculated at 506, thereby performing separation of the spatial layers and phase correction of each spatial layer.

At 508, data symbols obtained by spatial layer separation at 507 are consolidated per a code word unit to find a log-likelihood ratio for each bit, thereby performing Turbo decoding or Viterbi decoding. Among the decoded results, a data portion is stored in a reception data buffer 509, and control information is inputted to the base-station control block 511. As control information in the present invention, downlink first wireless channel quality and second wireless channel quality fed back by the terminal and downlink third wireless channel quality and uplink second wireless channel quality fed back by the relay device are inputted via this route to the base-station control block 511. Note that a distinction between data and control information complies with a wireless I/F protocol issued by a standardization organization which the wireless communication system conforms to.

A backhaul network I/F 510 is an I/F for a backhaul network in wired connection with a node upper than the base station, for example, an access gateway. The backhaul network I/F 510 transfers the contents of the reception data buffer 507 to an upper node, and stores data transferred from an upper node in a transmission data buffer 512.

Based on the communication quality estimation result obtained at 505 and the feedback information from the relay device and the terminal obtained at 508, a base-station control block 511 performs uplink packet scheduling and downlink packet scheduling, and makes a relay necessity/unnecessity determination corresponding to the flowchart of FIG. 11. As an algorithm for packet scheduling, proportional fairness has been known. When proportional fairness is applied to the present embodiment, an instantaneous transfer rate is calculated for a terminal requiring relay based on the communication quality of the second wireless channel and for a terminal not requiring relay based on the communication quality of the first wireless channel. The packet scheduling result, the relay necessity/unnecessity determination result according to the present embodiment, and the feedback enabler 2610 for the relay device and the terminal depicted in FIG. 26 are inputted as a downlink control signal to a coding and modulating process unit 513. The feedback enabler is used to adjust the amount of feedback from the relay device and the terminal. Also, according to the downlink packet scheduling result, the coding and modulation 513 is instructed to take a data sequence in from the transmission data buffer 512.

A coding and modulating process unit 513 performs coding and modulation on a data sequence from the transmission data buffer 512 and a control information sequence from the base-station control block 511. As coding, for example, a convolution coder with an original coding rate of 1/3 is used. In modulation, two bits of coded outputs are bounded for mapping on a QPSK constellation, four bits are bounded for mapping on a 16 QAM constellation, and six bits are bounded for mapping on a 64 QAM constellation. The number of bits to be bounded is according to the downlink scheduling result obtained from 511 and the protocol specification.

Layer mapping 514 is a process of mapping a modulation symbol sequence outputted from 513 forming a code word on a plurality of spaces, where a series of bit sequences outputted in coding in 513 is called code word. Each modulation symbol is arranged in a specific OFDM symbol, a sub-carrier, and a spatial layer. Since an arrangement rule is stipulated by a protocol, an arrangement destination is specified by referring to a memory (for example, a memory 2830 of FIG. 28) storing certain arrangement positions according to the stipulations or by a logic circuit in which an arrangement rule is made into an algorithm. According to the arrangement described above, the OFDM symbol, the sub-carrier, and the spatial layer where a reference signal symbol is to be stored become blank symbols. A blank symbol is a symbol having an I component and a Q component both being 0.

A pre-coding process unit 515 is a process of handling a layer mapping output at 514 for a plurality of spatial layers as a vector and performing multiplication with a pre-coding matrix being taken as a transmission weight matrix. The pre-coding process unit 515 performs this process on all OFDM symbols and sub-carriers.

516 denotes a block of generating a downlink reference signal symbol sequence. As a reference signal symbol sequence, an M sequence with a low cross-correlation between reference signal symbol sequences, a PN sequence, a BPSK symbol sequence or a QPSK symbol sequence generated base on a Walsh sequence, or a Zadoff-Chu sequence is preferably used. Since various sequence generation algorithms are widely known, any generation algorithm can be achieved by a logic circuit (for example, FIG. 7) or by previously storing outputs of every sequence to be generated in a memory and performing table lookup.

In a reference symbol inserting process unit 517, a reference signal symbol sequence generated at 516 is inserted in the portion as a blank symbol in the pre-coding output at 515. The reference symbol inserting process unit 517 inserts a reference signal symbol sequence according to the examples shown in FIG. 6A to FIG. 6D. When this inserting process is completed, an IFFT process is performed at 518 for each OFDM symbol, and the result is outputted to the wireless front-end 501.

The portions described above except for 501 and 510 may be achieved by a logic circuit, which is hardware included in the base station, or a processor such as a DSP or an MPU.

Figure 27:
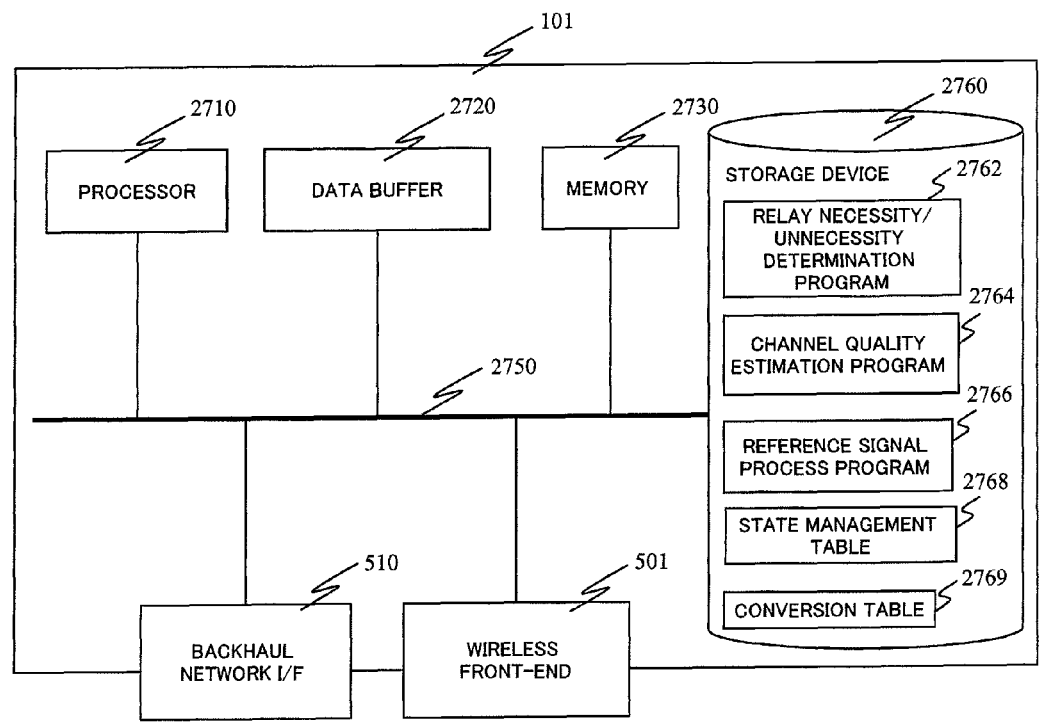
FIG. 27 is a diagram showing an example of device structure of the base station.

FIG. 27 shows an example of device structure of the base station 101. The base station 101 has a processor 2710, a data buffer 2720, and a memory 2730, which are each connected via an internal bus 2750. Furthermore, the base station 101 has a backhaul network I/F 501 and a wireless front-end 501 as a network I/F. The base station has a storage device 2760 for storing a program and a table.

The storage device 2760 has stored therein a relay necessity/unnecessity determination program 2762, a channel quality estimation program 2764, a reference signal process program 2766, a conversion table 2769, and a state management table 2768. Note that some not-illustrated programs corresponding to the processes at the base station disclosed in the present specification are also stored.

In the relay necessity/unnecessity determination program 2762, the process shown in the flowchart of FIG. 11 is defined, which corresponds to the processes to be performed by the base-station control block of FIG. 13.

The channel quality estimation program 2764 corresponds to 304 and 305 in FIG. 5, and also corresponds to the communication quality estimating unit 505 of FIG. 13.

Figure 1B:
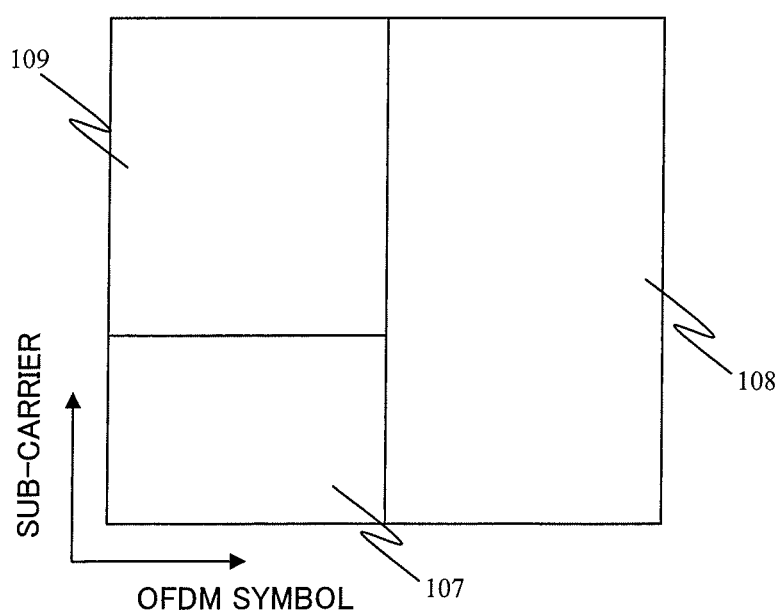
FIG. 1B is a diagram showing wireless communication resource division of the wireless communication system where a relay device is introduced.

The reference signal process program 2766 corresponds to processes to be performed by the reference symbol sequence generating unit 516 and the reference symbol inserting unit 517 of FIG. 1.

The state management table 2768 is a table shown in FIGS. 12A and 12B, where channel quality and relay device necessity/unnecessity are managed for each terminal.

The conversion table 2769 is a conversion table shown in FIG. 21, which is referred to when channel quality is found.

The processor 2710 executes the programs stored in the storage device 2760. Also, the processor 2710 performs a process corresponding to the base-station control block of FIG. 13 and others, refers to the table, and controls wireless communication.

The data buffer 2720 corresponds to 509 and 512 in FIG. 13. In the memory 2730, the programs to be processed by the processor 2710 are expanded, and data required for the process is retained.

As with FIG. 13, the wireless front-end 501 is an interface for performing transmission and reception of a wireless signal with the relay device and the terminal device. As with FIG. 13, the backhaul network I/F is an interface for connection to a network connected between other base stations or to an upper node.

Figure 14:
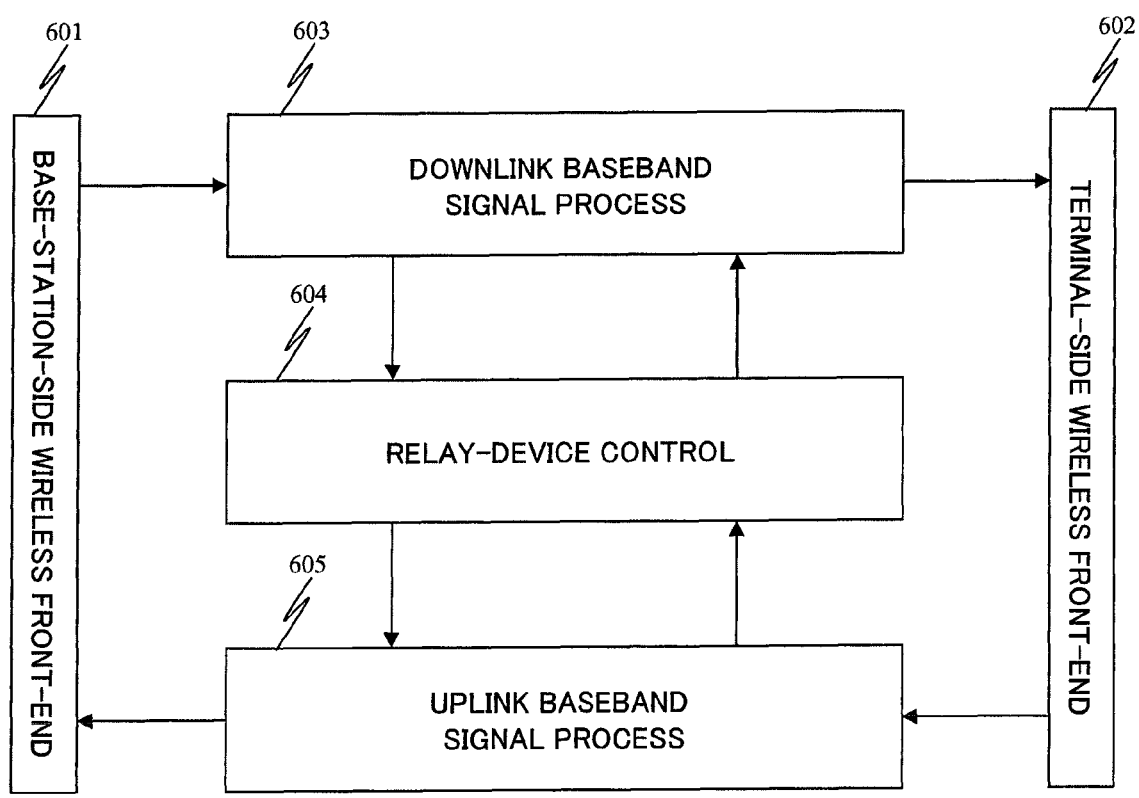
FIG. 14 is a diagram showing an example of structure of the relay device.

FIG. 14 shows an example of structure of the relay device. 601 denotes a wireless front-end on a base station side, and 602 denotes a wireless front-end on a terminal side. Components are identical to those of 501.

A downlink baseband process unit 603 once decodes a downlink baseband signal inputted from 601, and again codes the signal for output to the terminal-side wireless front-end 602. At a stage in the course of the baseband signal process, control information is exchanged with a relay-device control block 604.

An uplink baseband signal process unit 605 once decodes an uplink baseband signal inputted from the terminal-side wireless front-end 602, and again codes the signal for output to the base-station-side front-end 601. At a stage in the course of the baseband signal process, control information is exchanged with the relay-device control block 604.

Between the relay-device control block 604 and the baseband process units 603 and 605, the communication quality information and the relay necessity/unnecessity determination result are exchanged.

Figure 15:
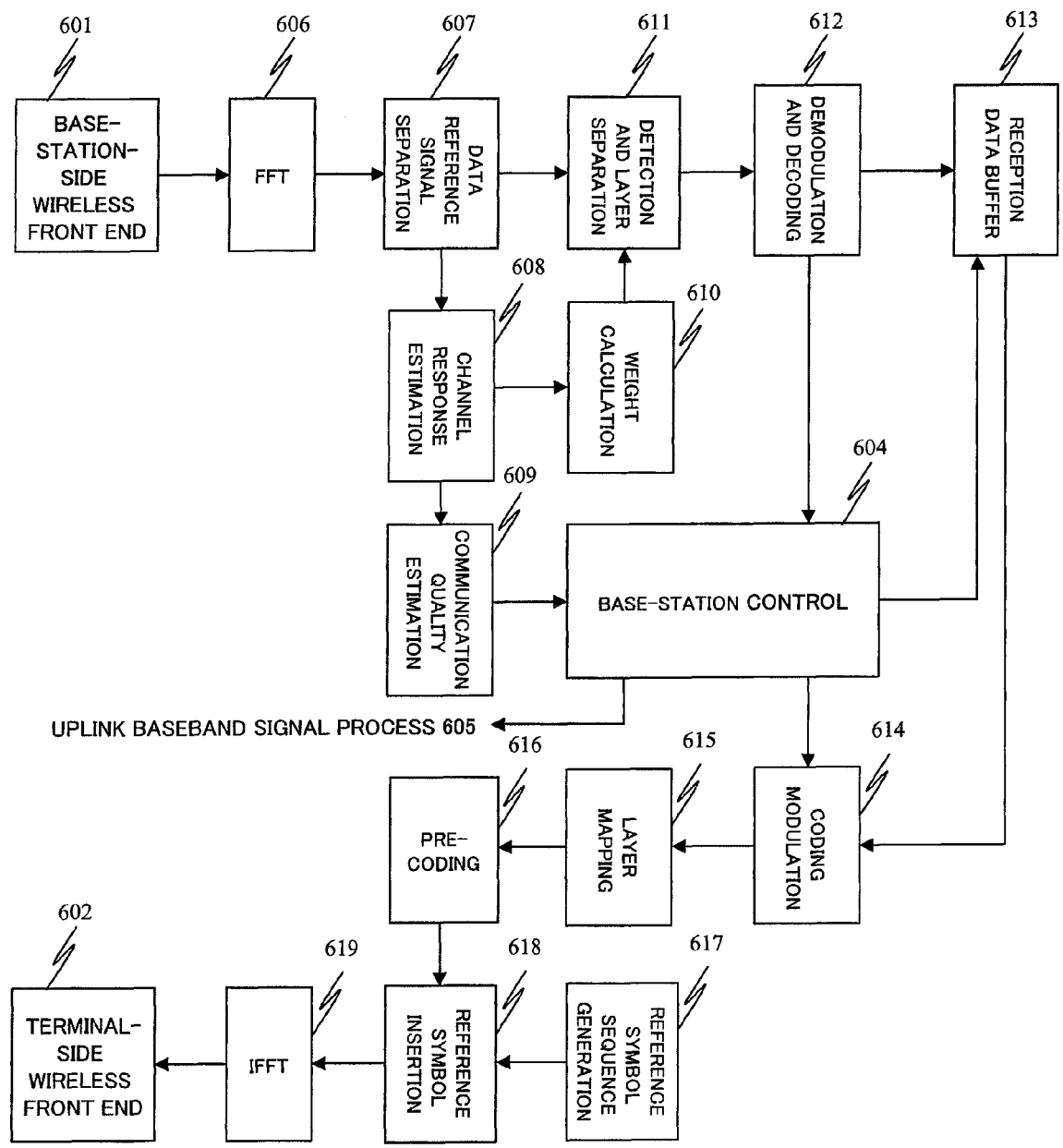
FIG. 15 is a diagram showing an example of functional block structure regarding downlink communication of the relay device.

FIG. 15 shows an example of functional block structure regarding downlink communication in the relay device according to the present embodiment.

A downlink reception baseband signal inputted from the base-station-side wireless front-end 601 is subjected to an FFT process at 606, and a data reference signal separating unit 607 performs separation into a data symbol and a reference signal symbol.

For the reference signal symbol obtained by separation at the data reference signal separating unit 607, response estimation of a downlink third wireless channel is performed at a channel response specifying unit 608. As with 504 in the base station of FIG. 13, a known reference signal symbol is used on both of transmission and reception sides (the base station and the relay device) for estimation of a channel response. When the reference signal symbol is not changed with time, a fixed and known reference signal symbol sequence is retained in a memory. When the reference signal symbol is changed with time, a reference signal symbol sequence is generated according to a reference signal symbol sequence rule shared between the transmission side and the reception side.

A communication quality estimating unit 609 estimates communication quality of a downlink third wireless channel based on the propagation path estimation result of 608. A specific communication quality estimating method is the same as that of 505. The estimation result obtained herein is inputted in the relay-device control block 604. It corresponds to 206 of FIG. 4.

610 and 611 are similar to 506 and 507, respectively.

At 612, data symbols obtained by spatial layer separation at 611 are consolidated in a code word unit to find a log likelihood ratio for each bit, thereby performing Turbo decoding or Viterbi decoding. Among the decoded results, a data portion is stored in a downlink reception data buffer 613, and control information is inputted to the relay-device control block 604. As control information in the present invention, the relay necessity/unnecessity determination result generated by the base station at 511 and the feedback enabler are inputted via this route to the relay-device control block 604. Note that a distinction between data and control information complies with a wireless I/F protocol issued by a standardization organization which the wireless communication system conforms to.

As a process associated with downlink communication, the relay-device control block 604 performs a process of receiving an input of the communication quality of the downlink third wireless channel estimated at the communication quality specification 609 and embedding the communication quality in an uplink control signal and performs a relay control process of receiving an input of the relay necessity/unnecessity determination result generated by the base station and the feedback enabler from 612 and making an instruction according to the relay necessity/unnecessity determination result for coding and others only on a data sequence to be relayed to 614. This block corresponds to 215 and 216, 217 of FIG. 4.

In the relay control process, a distinction between relay execution/inexecution for each terminal found from the relay necessity/unnecessity determination result by using the relay flag bit of the format of FIG. 10 is matched with a destination terminal of control information (having stored therein a coding ratio, a modulation scheme, and frequency resource allocation information for each packet) added uniquely for each downlink data sequence, and control is performed so that only a data sequence addressed to the terminal performing relay is subjected to processes from re-coding onward. On the other hand, in the case of the format of FIG. 9, in the relay control process, a relay flag 940 indicating the relay necessity/unnecessity determination result is embedded in the control information uniquely added for each data sequence. Thus, relay is performed when this flag indicates 1, and relay is not performed when the flag indicates 0. Note that the data sequence for which relay is not performed is cleared from the downlink reception data buffer 613.

A coding and modulating unit 614 performs coding and modulation on the data sequence from the downlink reception data buffer 613 according to the control information unique to the data sequence. In the present embodiment, by way of example, the data sequence to be processed is the one instructed from the relay-device control block 604.

Layer mapping 615 performs a process similar to that of 514. Furthermore, a modulation symbol is arranged on the sub-carrier and the OFDM symbol indicated by the control information unique to the data sequence mentioned above.

A pre-coding unit 616 performs a process of handling a layer mapping output at 615 for a plurality of spatial layers as a vector and performing multiplication with a pre-coding matrix being taken as a transmission weight matrix. The pre-coding process unit 616 performs this process on OFDM symbols and sub-carriers to be transmitted.

A reference symbol sequence generating unit 617 is a block of generating a downlink reference signal symbol sequence. The sequence may be the same as or different from the reference signal symbol sequence generated at 516. However, when the reference signal symbols are overlapped each other on the same OFDM symbol and the sub-carrier as those for the reference signal symbol sequence of the base station, another sequence with a cross-correlation as low as possible is used. A method of generating a reference signal symbol sequence is similar to that of 516.

A reference symbol inserting unit 618 performs a process of inserting the reference signal symbol sequence generated at the reference symbol sequence generating unit 617 in the portion as a blank symbol in the pre-coding output at the pre-coding unit 616. The reference signal symbol sequence is inserted according to the embodiments shown in FIGS. 6A to 6D and FIGS. 7A to 7C. When this inserting process is completed, an IFFT process is performed at 619 for each OFDM symbol, and the result is outputted to the terminal-side wireless front-end 602.

The above-described portion except for 601 and 602 can be achieved by a logic circuit, which is hardware included in the relay device, or a processor such as a DSP or an MPU.

Figure 16:
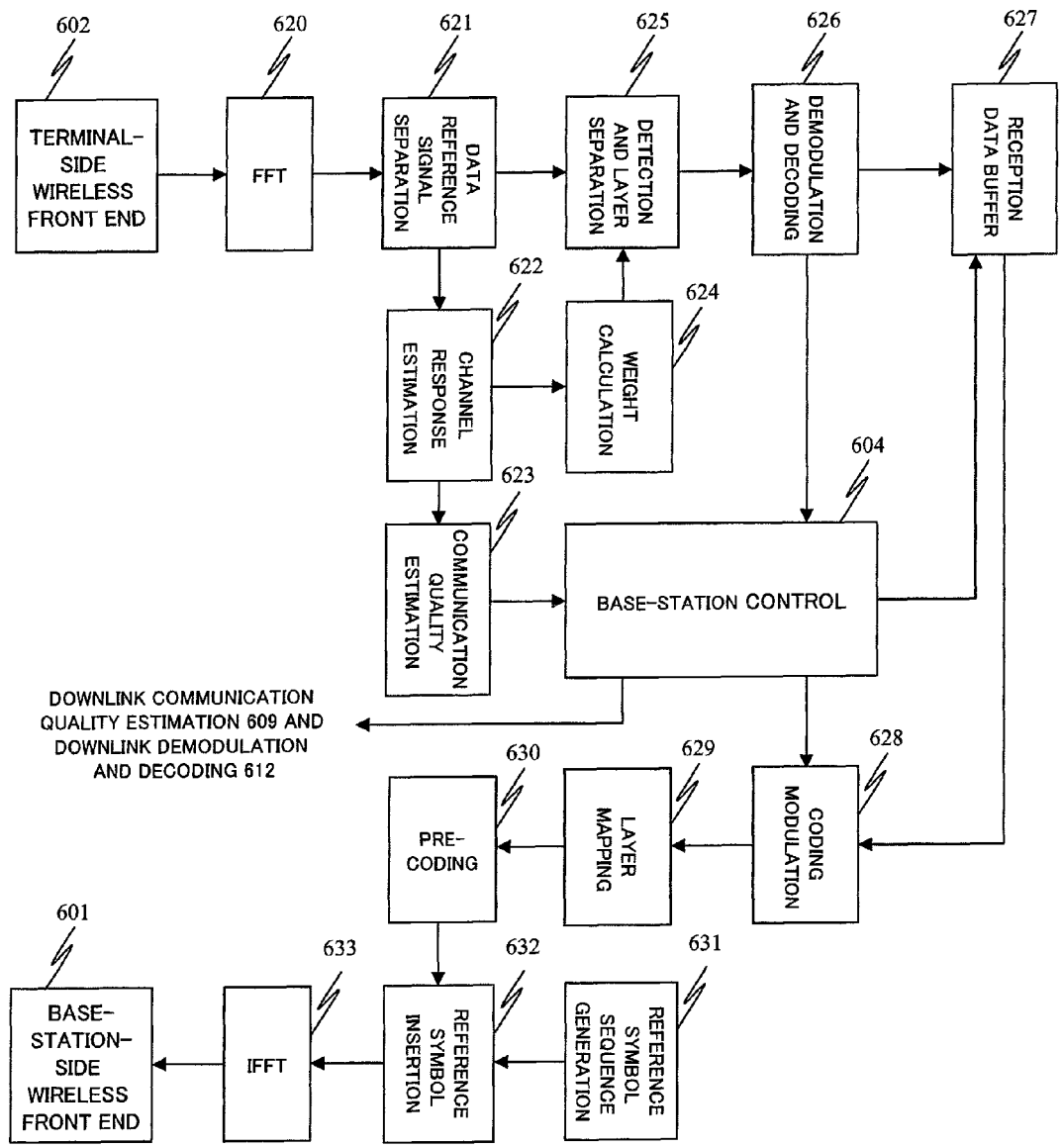
FIG. 16 is a diagram showing an example of functional block structure regarding uplink communication of the relay device.

FIG. 16 shows an embodiment of uplink communication of the relay device.

An uplink reception baseband signal inputted from 602 is subjected to an FFT process at 620, and separation into a data symbol and a reference signal symbol is performed at 621.

For the reference signal symbol obtained by separation at 621, response estimation of an uplink second wireless channel is performed at 622. As with 504, a known reference signal symbol is used on both of transmission and reception sides (the terminal and the relay device) for estimation of a channel response. When the reference signal symbol is not changed with time, a fixed and known reference signal symbol sequence is retained in a memory. When the reference signal symbol is changed with time, a reference signal symbol sequence is generated according to a reference signal symbol sequence rule shared between the transmission side and the reception side.

At 623, communication quality of an uplink second wireless channel is estimated based on the propagation path estimation result at 622. This process corresponds to 305 of FIG. 5. A specific communication quality estimating method is identical to that at 505. The estimation result obtained herein is inputted to the relay-device control block 604.

624 and 625 are similar to 506 and 507, respectively.

At 626, data symbols obtained by spatial layer separation at 625 are consolidated in a code word unit to find a log likelihood ratio for each bit, thereby performing Turbo decoding or Viterbi decoding. Among the decoded results, a data portion is stored in an uplink reception data buffer 627, and control information is inputted to the relay-device control block 604. Note that a distinction between data and control information complies with a wireless I/F protocol issued by a standardization organization which the wireless communication system conforms to.

As a process associated with uplink communication, the relay-device control block 604 performs a process of embedding the communication quality of the uplink second wireless channel inputted from 623 and the communication quality of the downlink third wireless channel estimated at 609 in an uplink control signal, as in the embodiments of FIGS. 8B and 8C. When the instruction of the feedback enabler inputted in 604 in downlink communication shown in FIG. 15 indicates feedback-disabled, the process is not performed. That is, the process of embedding in the uplink control signal is not performed.

Also, the relay-device control block 604 performs a process of making an instruction for coding and others only on a data sequence to be relayed to 628 according to the relay necessity/unnecessity determination result from the base station inputted from 612. In the latter process, according to the embodiment of FIG. 10, a distinction between relay execution/inexecution for each terminal found from the relay necessity/unnecessity determination result is matched with a terminal as a source of issuing control information added uniquely for each uplink data sequence, and control is performed so that only a data sequence addressed to the terminal performing relay is subjected to processes from re-coding onward. Note that the data sequence for which relay is not performed is cleared from the uplink reception data buffer 627. The process corresponds to 316, 317, and 318 of FIG. 5.

At 628, the data sequence from the uplink reception data buffer 627 is coded and modulated according to the control information unique to the data sequence. However, the data sequence to be subjected to this process is restricted to the one instructed by 604.

Layer mapping 629 performs a process similar to that of 514. Furthermore, a modulation symbol is arranged on the sub-carrier and the OFDM symbol indicated by the control information unique to the data sequence.

A pre-coding unit 630 is a process of handling a layer mapping output at 629 for a plurality of spatial layers as a vector and performing multiplication with a pre-coding matrix being taken as a transmission weight matrix. The pre-coding process unit 630 performs this process on all OFDM symbols and sub-carriers.

A reference symbol inserting unit 631 is a block of generating an uplink reference signal symbol sequence. The sequence may be the same as or different from the reference signal symbol sequence generated at 716 of FIG. 17. However, when the reference signal symbols are overlapped each other on the same OFDM symbol and the sub-carrier as those for the reference signal symbol sequence of the base station, another sequence with a cross-correlation as low as possible is used. A method of generating a reference signal symbol sequence is similar to that of 516.

632 denotes a process of inserting the reference signal symbol sequence generated at 631 in the portion as a blank symbol in pre-coding output at 630. The reference signal symbol sequence is inserted according to the embodiments of FIGS. 6A to 6D and FIGS. 7A to 7C. When this inserting process is completed, an IFFT process is performed at 633 for each OFDM symbol, and the result is outputted to the base-station-side wireless front-end 601.

The above-described portion except for 601 and 602 can be achieved by a logic circuit or a processor such as a DSP or an MPU.

Figure 28:
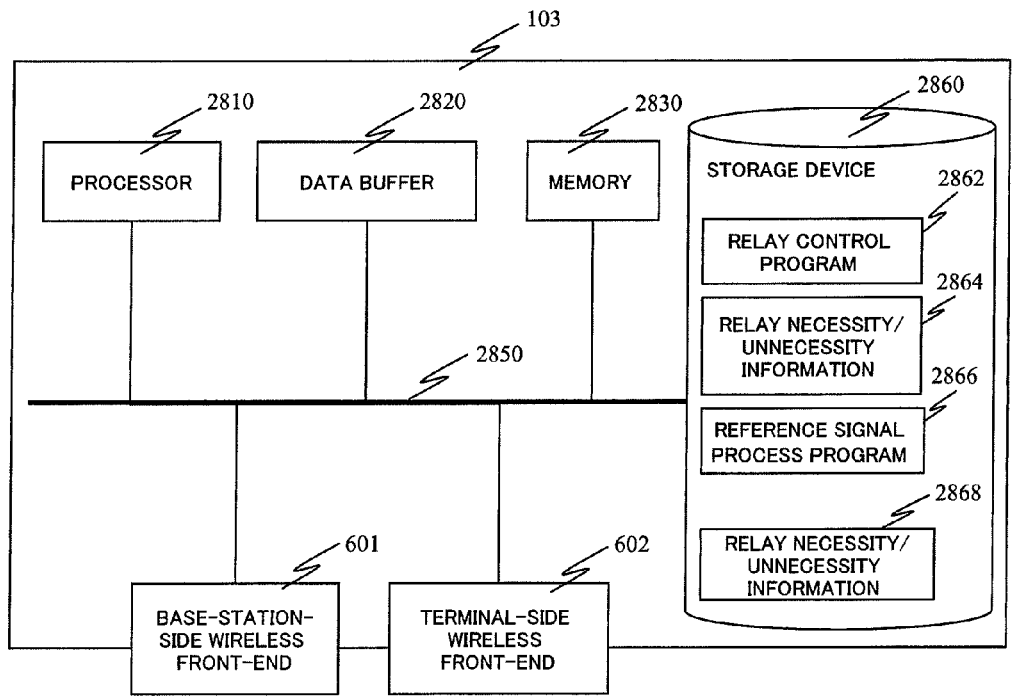
FIG. 28 is a diagram showing an example of device structure of the relay device.

FIG. 28 is an example of device structure of the relay device 103. The relay device 103 has a processor 2810, a data buffer 2820, and a memory 2830, which are each connected via an internal bus 2850. Furthermore, the relay device has a base-station wireless front-end 601 and a terminal-side wireless front-end 602 as a network I/F. Also, the relay device 103 has a storage device 2860 for storing a program and a table.

The storage device 2860 has stored therein a relay control program 2862, a channel quality estimation program 2864, a reference signal process program 2866, and relay necessity/unnecessity information 2868. Note that some not-illustrated programs corresponding to the processes at the relay device 103 disclosed in the present specification are also stored.

The relay control program 2862 is a program in which processes corresponding to 215, 216, and 217 of FIG. 4 and corresponding to 317, 318, and 319 of FIG. 5 are defined. Also, as the relay control program 2862 is read into the processor 2810, the program corresponds to the relay-device control block 604 of FIG. 15 and FIG. 16. The channel quality estimation program 2864 corresponds to 206 of FIGS. 4 and 305 of FIG. 5, and also corresponds to the communication quality estimating units 609 and 623 of FIGS. 15 and 16.

The reference signal process program 2866 corresponds to processes performed at the reference symbol sequence generating units 617 and 631 and the reference symbol inserting units 618 and 632 of FIGS. 15 and 16. Also, the reference signal process program 2866 corresponds to the process of sending a command at 202 of FIGS. 4 and 303 of FIG. 5.

In the relay necessity/unnecessity information 2868, necessity/unnecessity of relay by the relay device is managed regarding communication between the base station and the terminal as depicted in FIGS. 9 and 10.

The processor 2810 executes the programs stored in the storage device 2860. Also, the processor 2810 executes programs, performs a process corresponding to the relay-device control block 604 and others, refers to the relay necessity/unnecessity information 2868, and controls wireless communication.

The data buffer 2820 corresponds to 613 of FIGS. 15 and 627 of FIG. 16. In the memory 2830, the programs to be processed by the processor 2810 are expanded, and data required for the process is retained.

The wireless front-ends 601 and 602 are similar to those of FIG. 14, which are interfaces for performing transmission and reception of a wireless signal with the base station and the terminal device.

Figure 17:
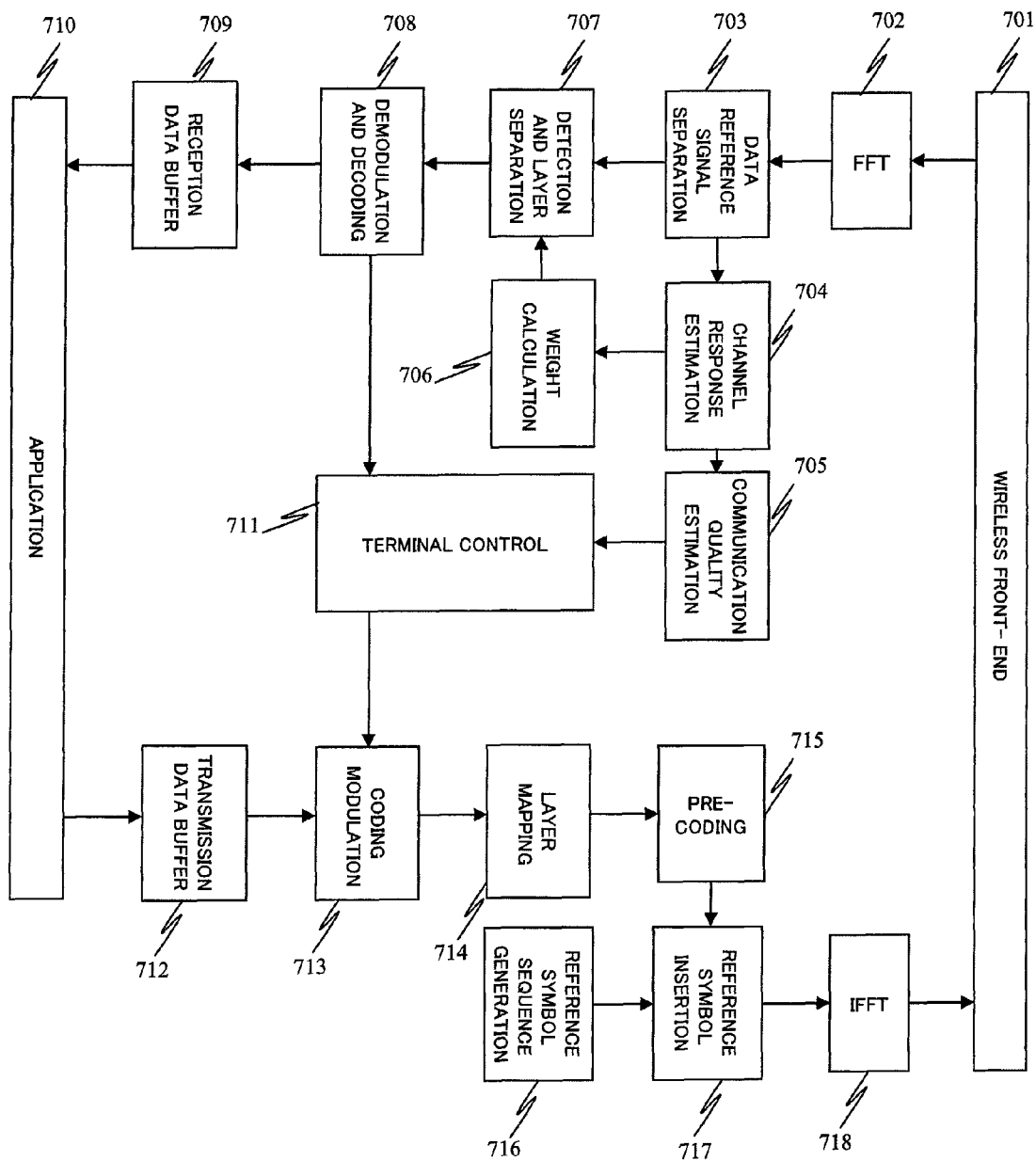
FIG. 17 is a diagram showing an embodiment of the terminal.

FIG. 17 shows an example of functional block structure at the terminal.

A wireless front-end 701 has components corresponding to the structure of 501.

A downlink reception baseband signal is subjected to an FFT process at 702, and a data reference signal separating unit 703 performs separation into a data symbol and a reference signal symbol.

For the reference signal symbol obtained by separation at the data reference signal separating unit 703, a channel response estimating unit 704 performs response estimation of a downlink first wireless channel and a downlink second wireless channel. For estimation of a channel response, a known reference signal symbol is used on both of transmission and reception sides (the terminal and the base station and the relay device and the terminal). When the reference signal symbol is not changed with time, a fixed and known reference signal symbol sequence is retained in a memory. When the reference signal symbol is changed with time, a reference signal symbol sequence is generated according to a reference signal symbol sequence rule shared between the transmission side and the reception side.

Also, when a plurality of reference signal symbol sequences with a low cross-correlation are multiplexed at the same time frequency, that is, when reference signal symbol sequences being different in the base station and the relay device are multiplexed at the same time frequency, as depicted in FIG. 18, the received reference signal symbol sequences are crammed into an intermediate-stage sift register 810 sequentially from a right side. Similarly, a known first reference signal symbol sequence complex-conjugated is crammed into an upper-stage register 801 sequentially from a right side. A known second reference signal symbol sequence complex-conjugated is crammed into a lower-stage register 820 sequentially from a right side.

In that state, as shown in the drawing, the adders 803 and multipliers 802 perform multiplication and addition, and therefore a channel response for the first reference signal symbol and a channel response for the second reference signal symbol can be obtained. Here, the received reference signal symbol sequence is inputted from the data reference signal separating unit 703, and the known first reference signal symbol and second reference signal symbol are from a memory (a memory 2930 of FIG. 29) for recording a fixed pattern in the channel response estimating unit 704 or, the result generated according to a reference signal symbol sequence rule shared between the transmission side and the reception side in the channel response estimating unit 704 is inputted.

A communication quality estimating unit 705 estimates communication quality based on the propagation path estimation result of the channel response estimating unit 704. The communication qualities of downlink first wireless channel and a downlink second wireless channel are each estimated. A communication quality estimating method is the same as that of 505. The unit corresponds to 204 and 205 of FIG. 4.

The communication qualities of the uplink downlink first wireless channel and the downlink second wireless channel estimated at the channel response estimating unit 705 are inputted to a terminal control block 711.

706 and 707 are similar to 506 and 507, respectively.

At 708, data symbols obtained by spatial layer separation at 707 are consolidated in a code word unit to find a log likelihood ratio for each bit, thereby performing Turbo decoding or Viterbi decoding. Among the decoded results, a data portion is stored in a reception data buffer 709, and control information is inputted to a base-station control block 711. As control information, a feedback enabler (FIG. 26) issued by the control block 511 at the base station is inputted to 711. Note that a distinction between data and control information complies with a wireless I/F protocol issued by a standardization organization which the wireless communication system conforms to.

An application 710 is a user interface for a processor, a screen, a keyboard, and others for causing web and mail applications for use at the terminal to be operated. Data inputted from the application is stored in a transmission data buffer 712, and is transmitted according to scheduling information generated by the base station.

The terminal control block 711 performs a process of driving coding and modulation 713 according to the communication quality estimation result obtained at 705 and uplink packet scheduling information obtained at 708, a process of inputting the communication quality estimation result inputted from 705 and the relay necessity/unnecessity determination result inputted from 708 as uplink control information to 713 and, furthermore, when an uplink data sequence is generated by the application 710 and data is present in the transmission data buffer 712, also inputs a scheduling request for requesting the base station to send uplink scheduling information into the coding and modulation 713 as control information. However, when the feedback enabler (2610 of FIG. 26) inputted from 708 indicates that feedback from the terminal is disabled, a process of inputting into 713 as uplink control information of the communication quality estimation result inputted from 705 is not performed.

The coding and modulation 713 performs coding and modulation on a data sequence from the transmission data buffer 712 and a control information sequence from the terminal control block 711. The coding method and the modulation method are similar to those of 513.

714 and 715 are similar to 514 and 515, respectively.

A reference symbol sequence generating unit 716 is a block of generating an uplink reference signal symbol sequence. A method of generating a reference signal symbol sequence is similar to that of 516.

A reference symbol inserting unit 717 performs a process of inserting the reference signal symbol sequence generated at 716 in the portion as a blank symbol in the pre-coding output at the pre-coding unit 715. The reference signal symbol sequence is inserted according to the embodiments shown in FIG. 6A to FIG. 6D. When this inserting process is completed, an IFFT process is performed at 718 for each OFDM symbol, and the result is outputted to the wireless front-end 701.

The above portion other than 701 and 710 can be achieved by a logic circuit or a processor such as a DSP or an MPU.

Figure 29:
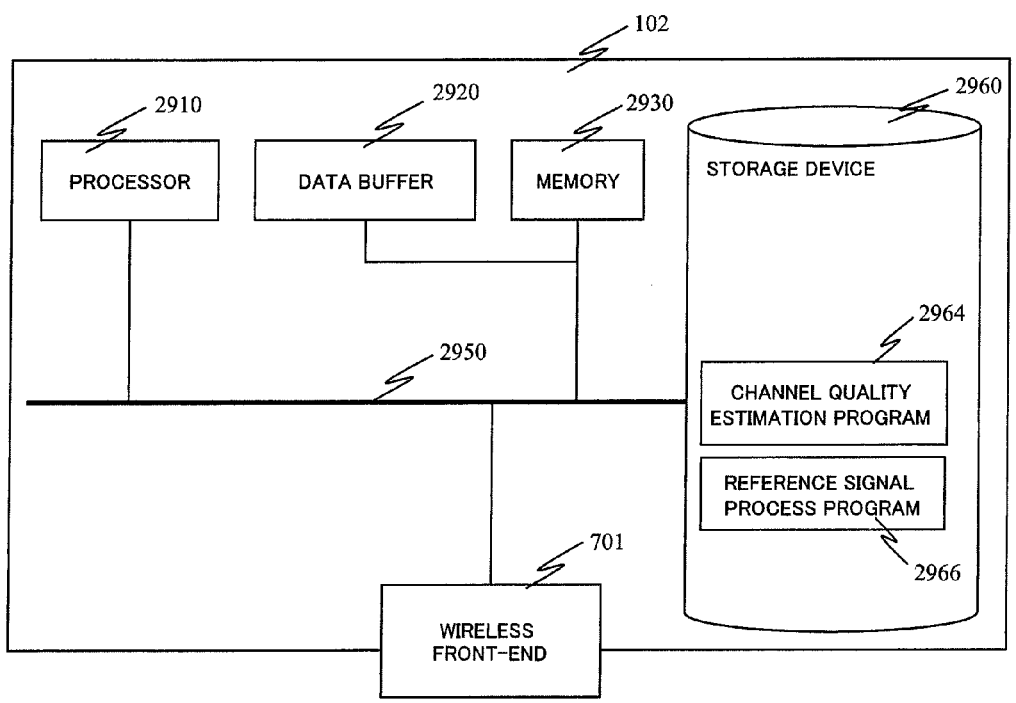
FIG. 29 is a diagram showing an example of device structure of the terminal.

FIG. 29 shows an example of device structure of the terminal 102.

The terminal 102 has a processor 2910, a data buffer 2920, and a memory 2930, which are each connected via an internal bus 2950. Furthermore, as a network I/F, the terminal 102 has the wireless front-end 701. Also, the terminal 102 has a storage device 2960 for storing a program and a table.

The storage device 2960 has stored therein a communication-path quality estimation program 2964 and a reference signal process program 2966. Also, the terminal 102 may store the received data in the storage device 2960 or the memory 2930 in the base-station signal receiving process 215 and the relay-device signal receiving process 219 of FIG. 4. Note that some not-illustrated programs corresponding to the processes at the terminal 102 disclosed in the present specification are also stored.

The communication-path quality estimation program 2964 corresponds to 204 and 205 of FIG. 4, and corresponds to the communication quality estimating unit 705 of FIG. 17.

The reference signal process program 2966 corresponds to processes performed at the reference symbol sequence generating unit 716 and the reference symbol inserting unit 717 of FIG. 17. Also, the reference signal process program 2966 corresponds to a process of sending a command at 301 and 302 of FIG. 5.

The processor 2910 executes the programs stored in the storage device 2960. Also, the processor 2910 executes programs, performs a process corresponding to the terminal control block 711, and controls wireless communication.

The data buffer 2920 corresponds to 627 and 709 and 712 of FIG. 17. In the memory 2930, the programs to be processed by the processor 2910 are expanded, and data required for the process is retained.

The wireless front-end 701 is similar to that of FIG. 14, which is an interface for performing transmission and reception of a wireless signal with the base station and the terminal device.

From the embodiments described above, a loss in performance of the entire system due to introduction of a relay device can be suppressed, and a gain in performance can be increased. For example, a cell average frequency use efficiency can be increased.

As a first modification example of the embodiment described above, the case is shown in which a plurality of relay devices are present for one base station.

Figure 30:
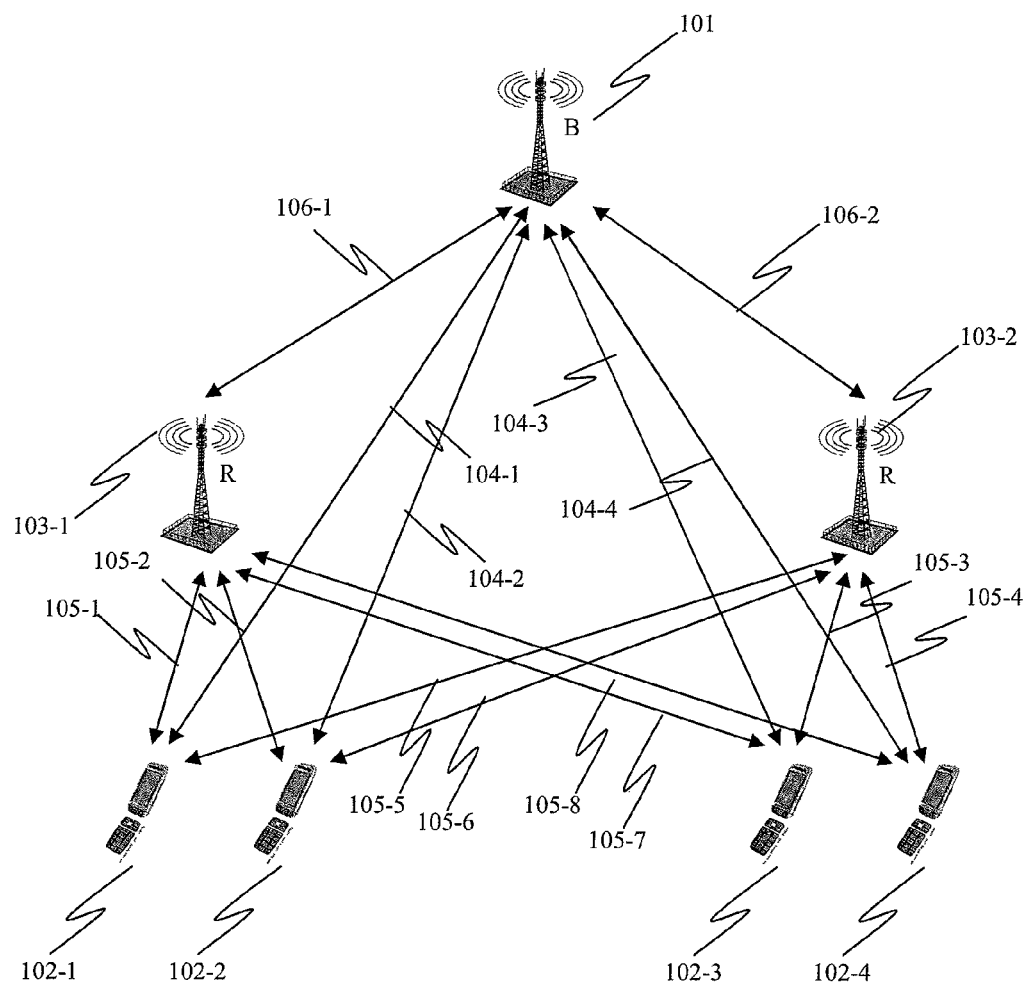
FIG. 30 is a diagram showing an embodiment in which a plurality of relay devices are present for one base station.

FIG. 30 shows an example of structure of a wireless communication system having one base station 101 and a plurality of relay devices 103-1 and 103-2. To the base station 101, the plurality of relay devices 103 are connected. Furthermore, a plurality of terminals 102 capable of communicating with each relay device 103 are present. Each terminal 102 can directly communicate with the base station 101. Here, while the first wireless channel 104 between the base station 101 and the terminal 102 is still present as is the case where the number of relay devices 103 is one, the second wireless channel 105 between the relay device 103 and the terminal 102 is defined for each individual relay device 103 with each terminal (102-1 to 102-4). Similarly, the third wireless channel 106 between the base station 101 and the relay device 103 is defined for each relay device 103. That is, as a wireless communication route between the base station 101 and each terminal 102, a direct route between the base station 101 and the terminal 102 and a relay route for each relay device 103 are present. If a plurality of relay devices 103 are present, a route is required to be selected from among three or more types of routes for each terminal 102.

In this wireless communication system in which a plurality of relay devices are present for one base station, there are two types of relay device operating method. In a first exemplary method, each relay device is individually controlled. In a second method, the plurality of relay devices are regarded logically as one relay device, thereby performing the same control over all of the relay devices. Details of the process of the present modification example are described below.

Figure 31:
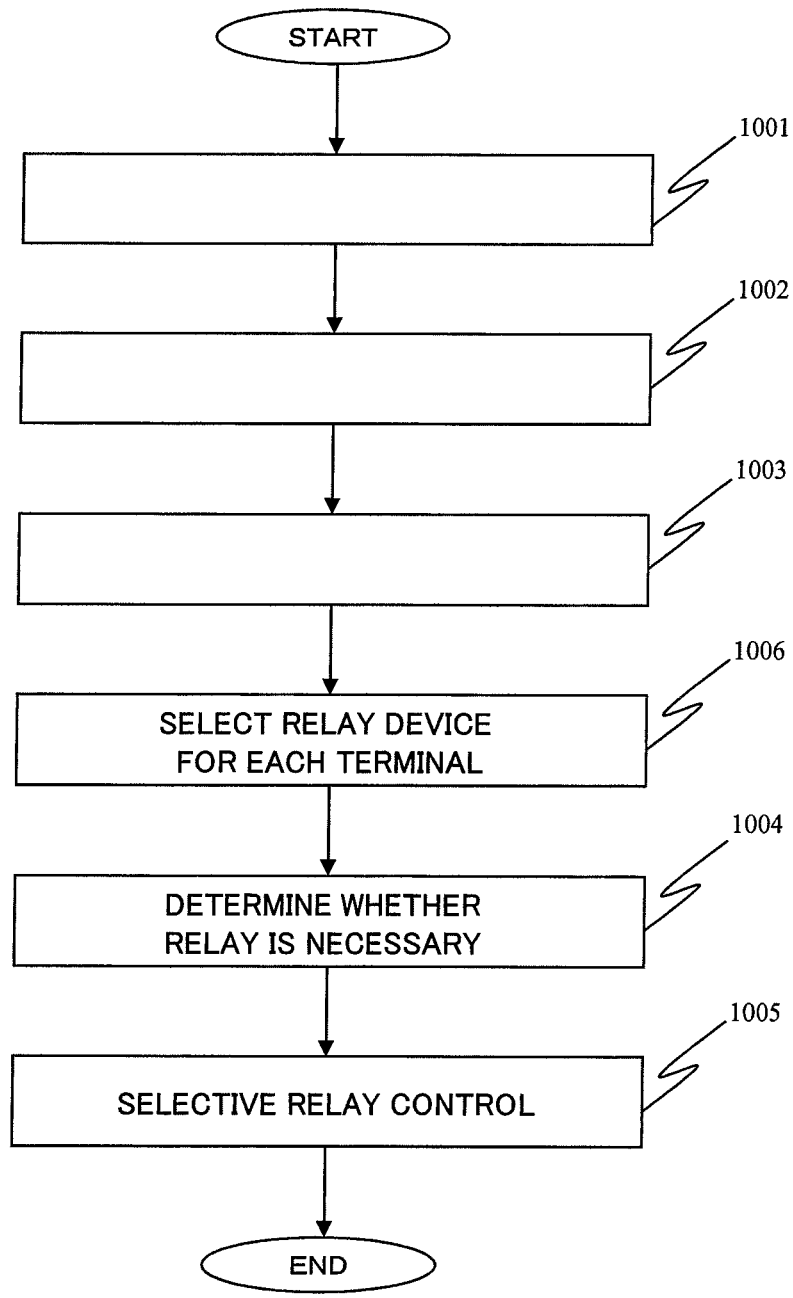
FIG. 31 is a chart showing a flow of operation of an entire system when a plurality of relay devices are introduced in the present invention.

FIG. 31 shows a process flow of the entire system when a plurality of relay devices are introduced. Since step 1001 to step 1005 are the same as the steps in the embodiment of FIG. 3, they are not described herein. Between step 1003 and step 1004, step 1006 of selecting a relay device for each terminal is inserted. At step 1005, it is determined for each terminal whether to perform relay communication using the relay device selected at step 1006 or to perform direct communication between the base station and the terminal. Details of a relay device determining method at step 1006 are described further below with reference to FIGS. 37 and 38.

Figure 32:
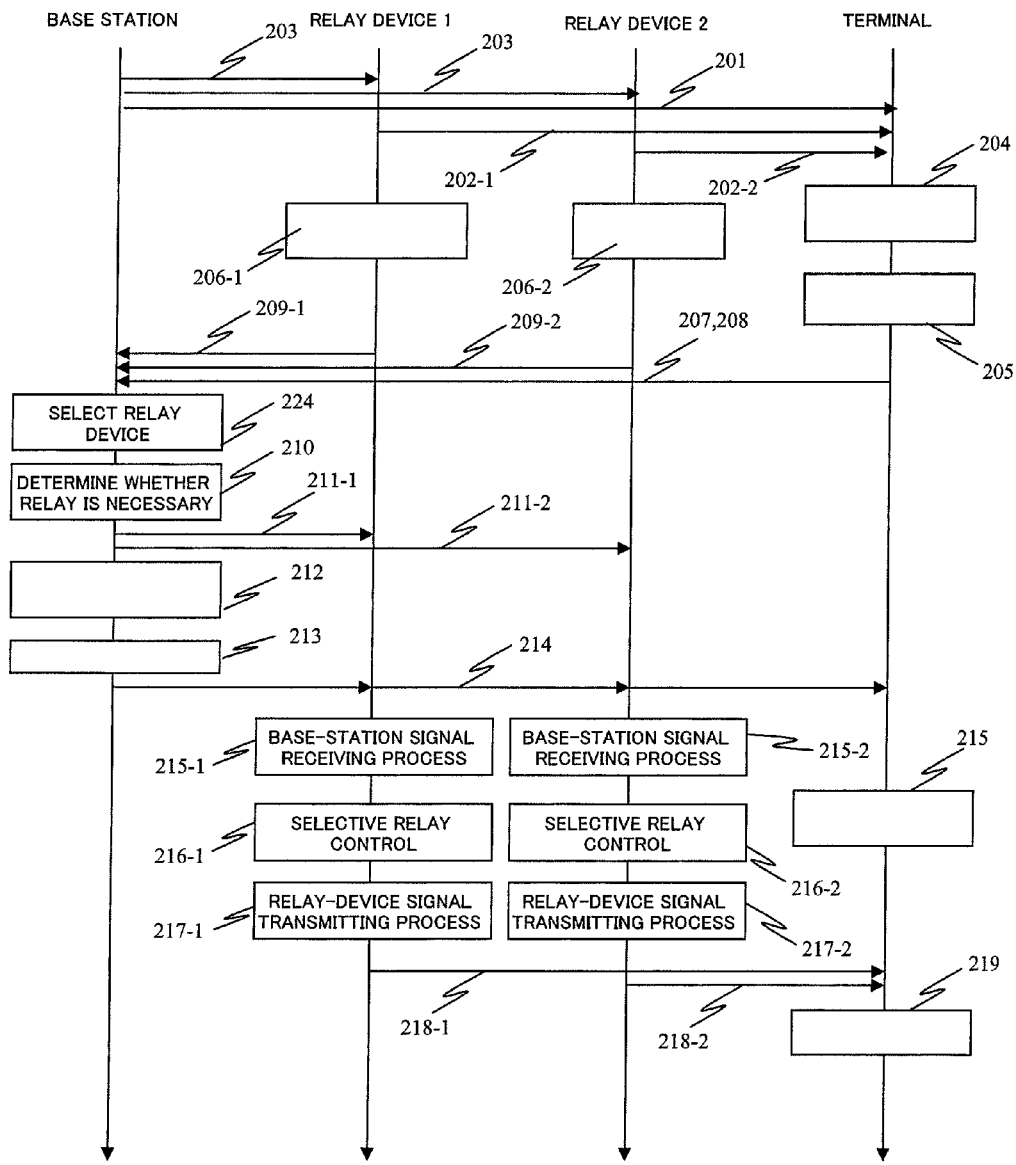
FIG. 32 is a diagram showing an embodiment of downlink communication of a wireless communication system in which a plurality of relay devices are present for one base station.

FIG. 32 shows an embodiment of downlink communication of a wireless communication system in which a plurality of relay devices are present for one base station.

First, the base station transmits to the terminal 102 the reference signal 201 for estimating communication quality of the first wireless channel (between the base station and the terminal) and to the relay device 103 the reference signal 203 for estimating communication channel quality of the third wireless channel (between the base station and the relay device). The reference signal 203 is a signal to be broadcasted by the base station 101, and is a reference signal that is common among the plurality of relay devices 103.

The relay devices 1 and 2 (103) perform quality estimation with communication quality estimation of the third wireless channel for each individual relay device by using the reference signal 203 (206), and feed back the estimation result to the base station (209). Here, in accordance with the feedback format depicted in FIG. 8B, for example, the estimation result including the value of the CQI 860 is transmitted from each relay device to the base station for feedback so that the relay device as a transmission source of the feedback can be identified. Also, the relay device 103 broadcasts the reference signal 203 for each individual relay device 103 toward the terminal 102 in order to estimate channel quality of the second wireless channel. As a method of generating a reference signal unique to the relay device, according to the embodiment shown in FIG. 7, the cell-specific identification number can be changed for each relay device. Also, as a method of arranging a reference signal, reference signals transmitted from the plurality of relay devices can be overlapped each other with the method depicted in FIG. 6D. However, it is not always necessarily required to overlap the reference signals transmitted from the respective relay devices as long as the process is defined as a protocol. Furthermore, in the non-overlapping state, it is not required to generate a different reference signal for each relay device, and the same reference signal may be used.

The terminal 102 receives the reference signal 201, and uses the reference signal 201 to perform channel quality estimation 204 of the first wireless channel. Furthermore, the terminal 102 receives from the relay devices 1 and 2 the reference signals 202-1 and 202-2, respectively unique thereto, and uses the reference signals 202 corresponding to the respective relay devices to perform channel quality estimation 205 of the second wireless channel for each relay device. The terminal 102 wirelessly feeds back the channel quality estimation results obtained from the channel quality estimations 204 and 206 to the base station 101 by the MAC layer. Here, what is fed back are a channel quality estimation result 207 of the first wireless channel and a channel quality estimation result 208 of the second wireless channel for each individual relay device.

By using the channel quality estimation result 207 of the first wireless channel, the communication channel quality estimation result 208 of the second wireless channel, and a communication channel quality estimation result 209 of the third wireless channel wirelessly fed back from the terminal 102 and the relay device 103, the base station 11 first selects a relay device for each terminal device 102 (224).

After selecting a relay device for each terminal, the base station 101 determines whether to perform relay communication by the relay device 103 for each terminal based on the selection result (210). A relay necessity/unnecessity determination result 211 is transferred via a wireless network to the relay device 103 by a MAC layer or an RRC layer. The operation subsequent thereto is similar to that of FIG. 4, and therefore is not described herein.

FIG. 33 shows a feedback format of the channel quality estimation result 207 of the first wireless channel and the channel quality estimation result 208 of the second first wireless channel. While the channel quality estimation result 207 of the first wireless channel is similar to that of FIG. 8A, the channel quality estimation result 208 of the second wireless channel is generated for each relay device, and therefore an ID of the relay device corresponding to the channel quality estimation result is added for each channel quality estimation result, thereby associating the channel quality estimation result and the relay device ID with each other.

The process of relay device selection 224 of FIG. 32 is described in detail. Specifically, a relay device "r" is selected so that an evaluation function shown in the following equation (Equation 12) is maximum.

$$F(k, r) = \frac{C_A(k, r)}{C_D(k)} - \frac{C_A(k, r)}{C_B(r)} - 1 \qquad \text{[Equation 12]}$$

"k" represents an index of the terminal, and "r" represents an index of the relay device. $C_A(k, r)$ represents a capacity of the second wireless channel between the terminal k and the relay device r, $C_D(k)$ represents a capacity of the first wireless channel between the base station and the terminal k, and $C_B(r)$ represents a capacity of the third wireless channel between the base station and the relay device r.

Figure 37:
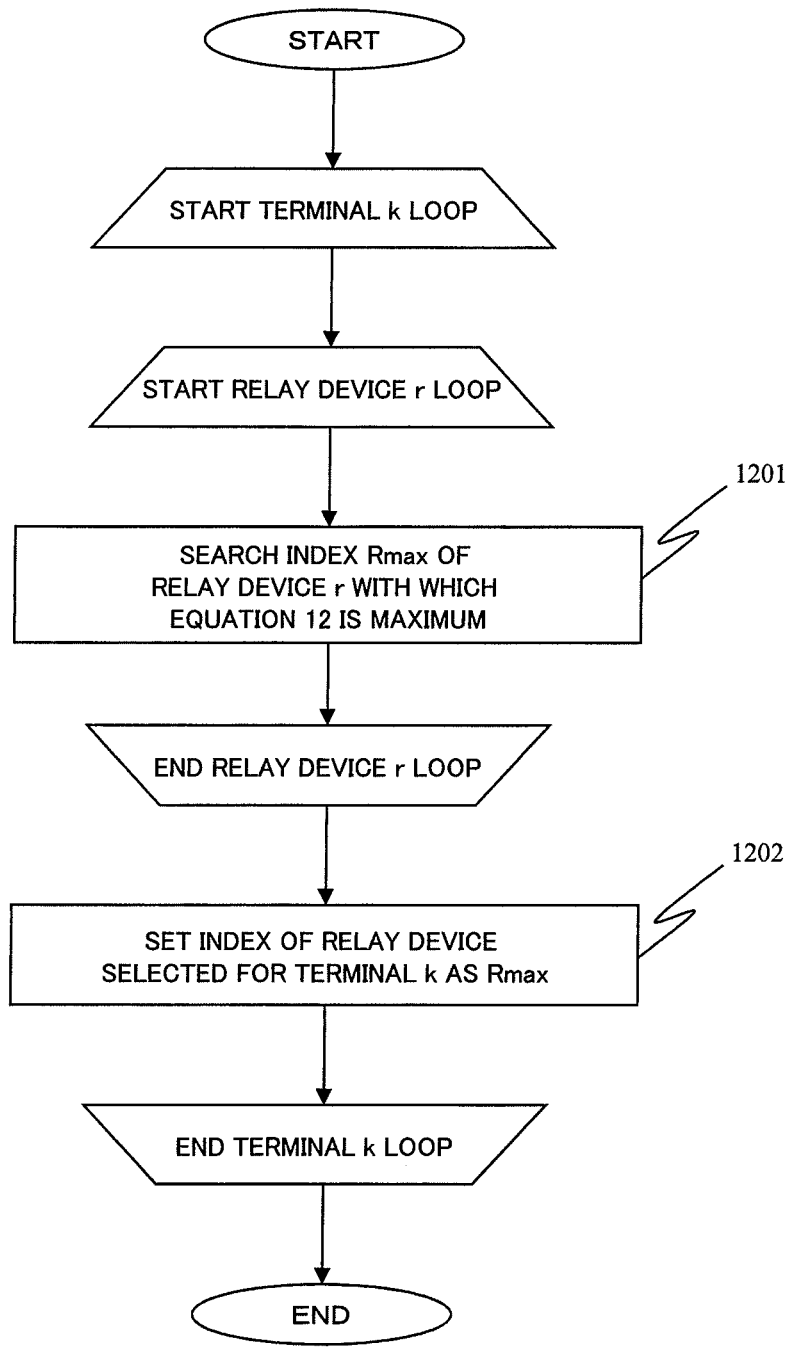
FIG. 37 is a chart showing a first embodiment of a flowchart for allocating one relay device from a plurality of relay devices to the terminal in the present invention.

Details of the relay device selection 224 are described with reference to FIG. 37 showing a first example of the method of selecting a relay device for each terminal. FIG. 37 is a flowchart showing details of the relay device selection 224 to be performed by the base station 101. At step 1201, a search is made for an index Rmax of a relay device in which Equation 12 is maximum. A relay device indicated by Rmax at the time of completion of a loop regarding the relay device is selected as a relay device for the terminal to use in relay communication (step 1202). When a relay necessity/unnecessity determination subsequent to a subsequent stage of relay device selection is performed, one of the first wireless channel quality, the second wireless channel quality, and the third wireless channel quality is referred to for each terminal, but the base station has the second wireless channel quality and the third wireless channel for each relay device. According to this relay device selection, a representative value of each of the second wireless channel quality and the third wireless channel quality for each terminal is taken as a value of each of the second wireless channel quality and the third wireless channel quality regarding the selected relay device.

Figure 38:
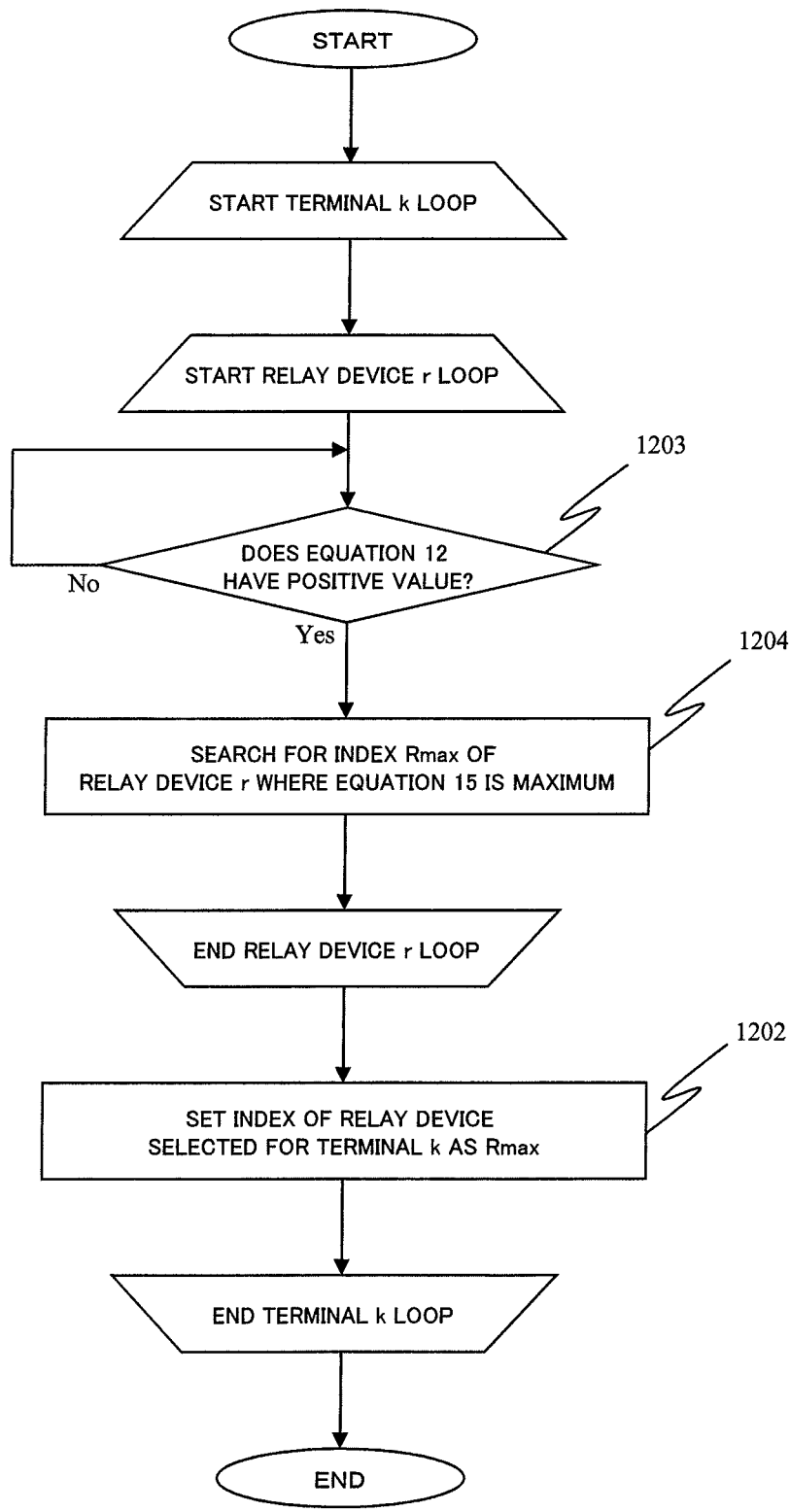
FIG. 38 is a chart showing a second embodiment of the flowchart for allocating one relay device from a plurality of relay devices to the terminal in the present invention.

Next, details of the relay device selection 224 performed by the base station 101 by using FIG. 38 showing a second example of the relay device selecting method performed by the base station 101 is described. At step 1203, it is determined whether the evaluation function in Equation 12 is positive. If the evaluation function value is 0 or negative, a similar determination is made as to the next relay device r. When the evaluation function value is positive, this corresponds to that, regarding the relay device r for the terminal k, a gain in system performance can be obtained more by performing communication via the relay device r rather than by directly communicating with the base station. From a group of relay devices in which the evaluation function value is positive at step 1203, a relay device Rmax for the terminal k is selected at step 1204. Rmax is a value r with which Equation 13 has a maximum value.

$$F(k, r) = \frac{C_A(k, r)}{N(r)} \qquad \text{[Equation 13]}$$

A denominator $N(r)$ in Equation 13 is a total number of terminals selecting the relay device r when it is assumed that the terminal k selects the relay device r. Similarly, a numerator $C_A(k, r)$ represents communication quality of the second wireless channel when the terminal k uses the relay device r. That is, the evaluation function in Equation 13 is such that the communication quality of the second wireless channel when the terminal k uses the relay device r is divided by the number of terminals expected to use the relay device r, and represents communication quality of the second wireless channel expected to be distributed to the terminal k. In other words, as the number of terminals using the relay device is larger, throughput expected per terminal is decreased. Thus, the evaluation function in Equation 13 represents throughput expected per terminal, and selecting a relay device with the throughput having a maximum value corresponds to selecting a relay device with which the terminal can ensure the throughput most easily.

Note that, when a plurality of relay devices are logically regarded as one relay device and the base station performs the same control over all of the relay devices, the following are different points from FIG. 32.

A first different point is that the relay-device-specific reference signals 202-1 and 202-2 become the same reference signal. When the terminal 102 estimates channel quality of the second wireless channel (205), channel quality estimation is performed for a superposing signal of the same reference signals 202-1 and 202-2 transmitted by the plurality of relay devices 103. The feedback 207 is thus performed as the second wireless channel quality feedback 208 from the terminal 102 is in accordance with the format of FIG. 8A together with the first wireless channel quality feedback 207.

A second different point is that the process of the relay device selection 224 is different. When the base station 101 performs the relay device selection 224, via which relay device the second wireless channel quality has been fed back from the terminal 102 is unknown. Therefore, unlike the case in which the third wireless channel quality fed back from the relay device 103 and Equation 12 can be connected together, such a connection cannot be made. Specifically, as for $C_A(k, r)$ in Equation 12, the value for each r is not fed back. Therefore, $C_A(k, r)/C_B(r)$, which is the second term of Equation 12, cannot be correctly calculated. Here, the evaluation function value corresponding to Equation 12 is as the following equation (Equation 14).

$$F(k, r) = \frac{C_A(k)}{C_D(k)} - \frac{C_A(k)}{C_B(r)} - 1 \qquad \text{[Equation 14]}$$

The second term of this equation is in the form of dividing $C_A(k)$, which is a capacity for each terminal, by $C_B(r)$, which is a capacity for each relay device. However, since it is not known that the terminal k performs communication with which relay device r, this term indicating a capacity ratio of the second wireless channel with respect to the third wireless channel, that is, how much wireless communication resources are excessively consumed in the third wireless channel when data communication is performed in the second data channel, cannot be correctly calculated. Therefore, in this case, it is assumed that channel quality of the third wireless channel ensured at minimum even if the terminal performs communication via any of the relay devices is referred to. Specifically, the following equation (Equation 15) is applied.

$$F(k) = \frac{C_A(k)}{C_D(k)} - \frac{C_A(k)}{\min\{C_B(r)\}} - 1 \qquad \text{[Equation 15]}$$

A denominator of the second term in this equation indicates a minimum value of the capacity of the third wireless channel regarding all of the relay devices connected to the base station. That is, the method of selecting a relay device for each terminal corresponds to selecting a relay device with the third wireless channel quality estimated for each relay device for all of the terminals having a minimum value. In practice, all relay devices perform relay communication regarding all terminals for which relay is determined by the relay necessity/unnecessity determination as required.

A third different point is that relay necessity/unnecessity determination results 211-1 and 211-2 are common to a plurality of relay devices. Accordingly, downlink signals 218-1 and 218-2 to be retransmitted by the respective relay devices are the same.

Figure 34:
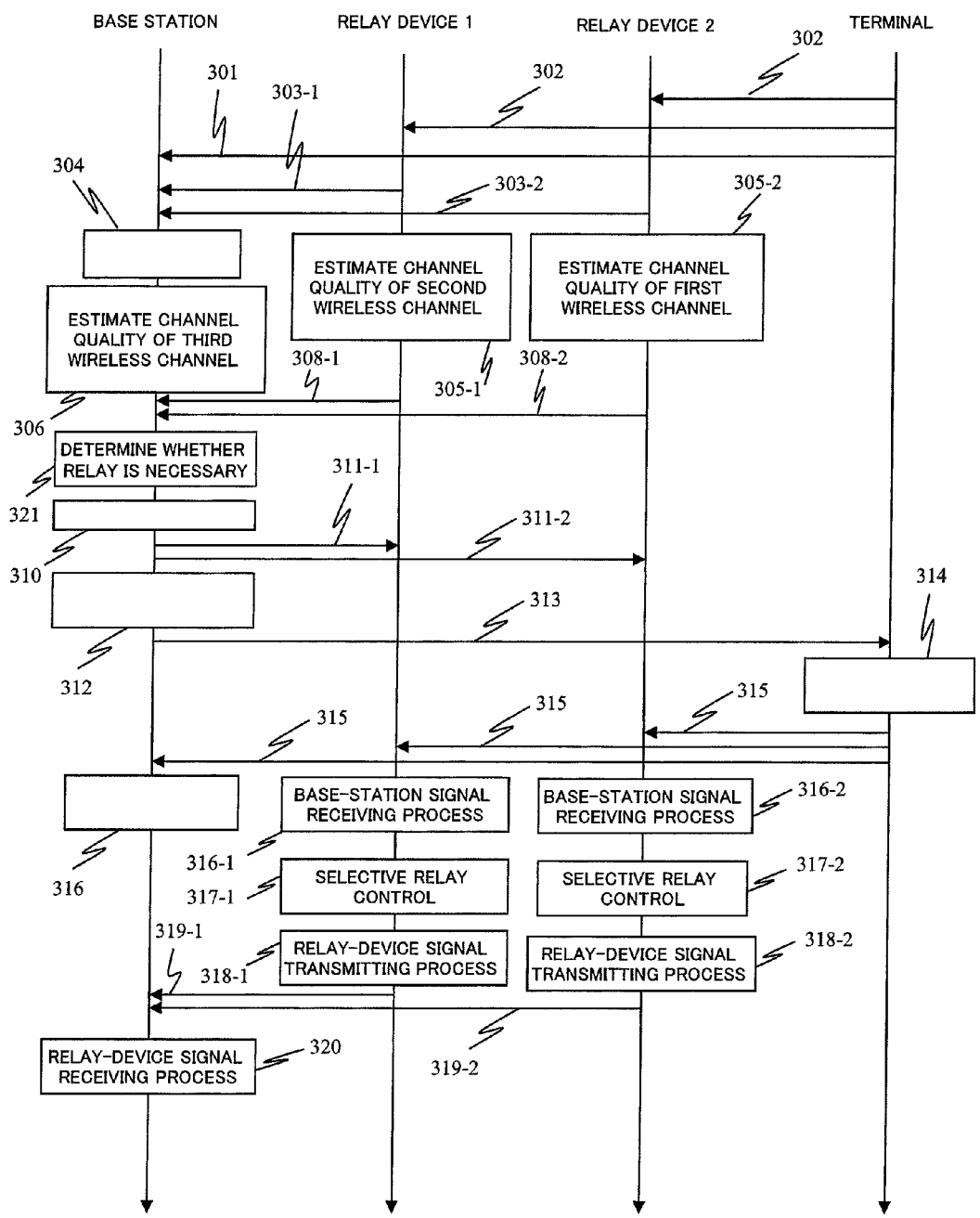
FIG. 34 is a diagram showing an embodiment of uplink communication of the wireless communication system in which a plurality of relay devices are present for one base station.

FIG. 34 shows an example of uplink communication of the wireless communication system in which a plurality of relay devices are present for one base station.

The terminal 102 transmits to the base station 101 a reference signal 301 for estimating channel quality of the first wireless channel, and transmits to the plurality of relay devices 103 the reference signal 302 for estimating channel quality of the second wireless channel. The terminal 102 may broadcast the reference signal 302 to the plurality of relay devices 103.

The relay devices 103 respectively transmit to the base station 101 reference signals 303-1 and 303-2 specific to the individual relay devices for estimating channel quality of the third wireless channel. The relay devices 103 each receives the reference signal 302 from the terminal 102, and uses the reference signal 302 to perform channel quality estimation 305-1 and 305-2 of the second wireless channel. Relay devices 1 and 2 (103) wirelessly feed back channel quality estimation results 308-1 and 308-2 of the second wireless channel, respectively, to the base station 101 by a MAC layer. When the relay devices 103 perform feedback, in order for the base station 101 to identify from which relay device the feedback comes, according to the feedback format as shown in FIG. 8C, the relay devices each transmit to the base station the estimation result added with the relay device ID 850.

The base station 101 receives the reference signal 301, and uses the reference signal 301 to perform channel quality estimation 304 of the first wireless channel. Also, the base station 101 receives the relay-device-specific reference signals 303-1 and 303-2 from the relay devices 1 and 2, respectively, and uses the respective reference signals 303-1 and 303-2 to perform channel quality estimation 306 of the third wireless channel for each relay device. Furthermore, the base station 101 receives the second wireless channel quality estimation results 308-1 and 308-2 fed back from the respective relay devices 103 via a wireless network.

Then, the base station 101 uses the channel quality of the first wireless channel and the channel quality of the third wireless channel estimated at 304 and 306 and the channel quality estimation results 308 of the second wireless channel to select a relay device for each terminal 102 (321). A relay device selecting method is as described in the embodiment of FIG. 32.

After selecting a relay device for each terminal, the base station 101 determines based on the selection result whether to perform relay communication with the relay device 103 for each terminal 102 (310). A relay necessity/unnecessity determination result 311 is transferred to the relay device 103 by a MAC layer or an RRC layer via a wireless network. The operation subsequent thereto is similar to that of FIG. 5, and therefore is not described herein.

Note that, in the embodiment depicted in FIG. 34, when the plurality of relay devices are regarded logically as one relay device and the same control is performed over all of the relay devices, the following points are different from the embodiment of FIG. 34.

A different point is that relay necessity/unnecessity determination results 311-1 and 311-2 are common to the plurality of relay devices. The base station 101 selects a relay device for each terminal at relay device selection 321, and makes a relay necessity/unnecessity determination for each terminal at 310, assuming that the selected relay device 102 is to be used. However, when wireless communication of a certain terminal is actually relayed, relay is performed at all of the relay devices to that terminal. This method can reduce overhead associated with notification of the relay necessity/unnecessity determination result, compared with the case in which relay control is performed for each individual relay device. Note that, with the relay necessity/unnecessity determination results 311-1 and 311-2 being common to all of the relay devices, uplink signals 319-1 and 319-2 retransmitted by the relay devices become the same signal if an ideal case is assumed that all uplink signals, which are from the terminals for which relay is to be performed by all relay devices, have been decoded. In practice, however, since a signal from a terminal failing to be decoded is present for each relay device, all relay devices do not necessarily output the same signal.

Figure 35:
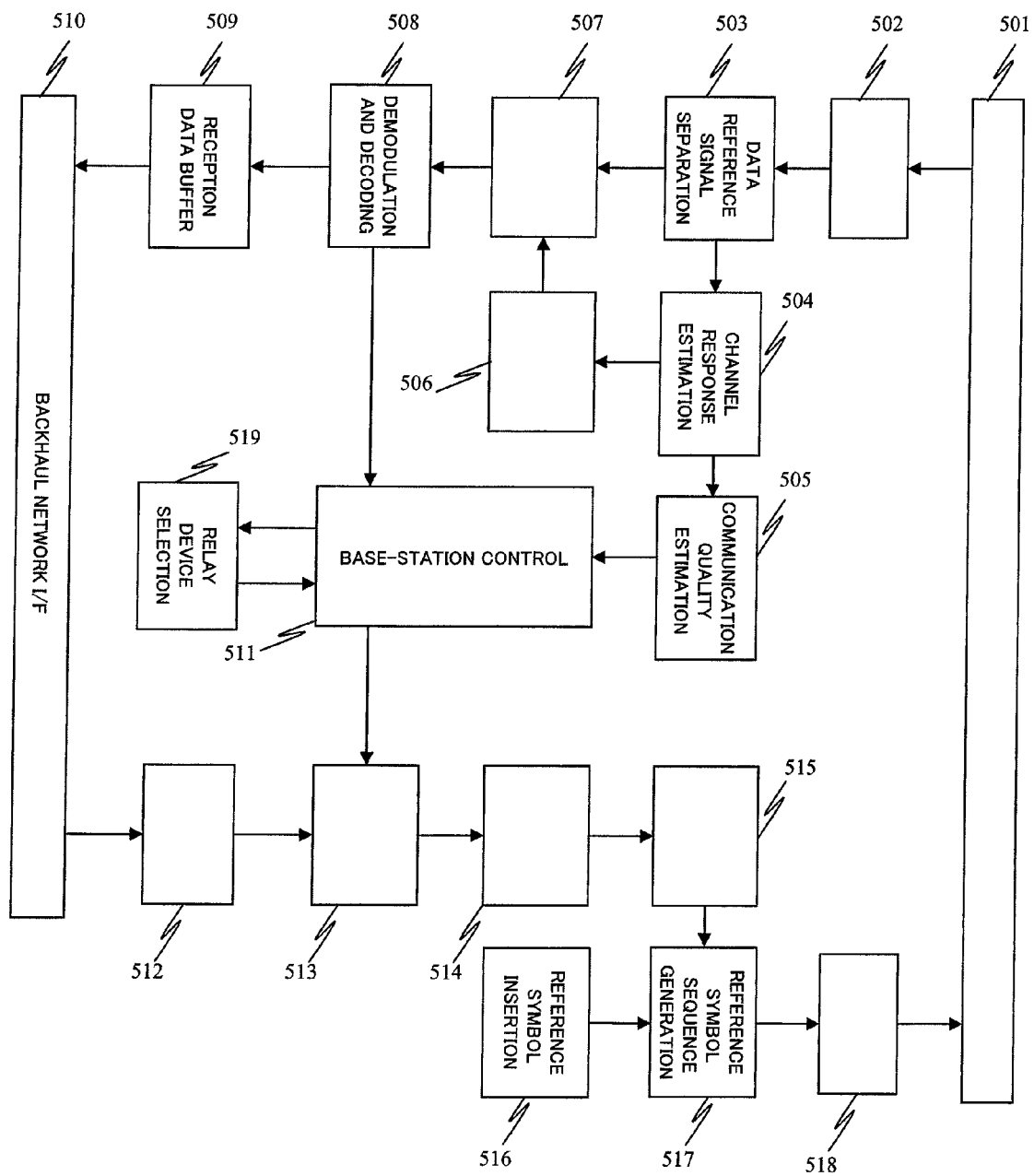
FIG. 35 is a diagram showing an example of structure of the base station when the presence of a plurality of relay devices is assumed in the present invention.

FIG. 35 shows an example of structure of the base station when a plurality of relay devices belong to one base station. Since this example shares most of the embodiment of FIG. 13 in common, only differences from FIG. 13 are described.

A channel response estimating unit 504 performs response estimations of an uplink first wireless channel and an uplink third wireless channel for the reference signal symbol obtained by separation at 503. As for the uplink third wireless channel, an estimation is performed for each relay device.

A communication quality estimating process unit 505 estimates communication quality based on the propagation path estimation result at 504. The unit corresponds to 304 and 306 of FIG. 11. The communication quality estimating process unit 505 estimates communication quality of each of the uplink first wireless channel and the uplink third wireless channel. Communication quality estimation of the uplink third wireless channel is performed for each individual relay device, and is inputted together with the communication quality of the uplink first wireless channel to the base-station control block 511.

A demodulation and decoding process unit 508 consolidates data symbols obtained by spatial layer separation at 507 in a code word unit to find a log likelihood ratio for each bit, thereby performing Turbo decoding or Viterbi decoding. Among the decoded results, a data portion is stored in a reception data buffer 509, and control information is inputted to the base-station control block 511. As control information, for example, there are the downlink first wireless channel quality fed back by the terminal, the downlink second wireless channel quality (FIG. 33) for each relay device and, from among the channel qualities for each individual relay device fed back by the relay devices, the downlink third wireless channel quality (FIG. 8B) and the uplink second wireless channel quality (FIG. 8C) for each relay device and for each terminal. These pieces of control information are inputted to the base-station control block 511.

Based on the communication quality estimation result obtained at 505 and the feedback information from the relay device and the terminal obtained at 508, the base-station control block 511 performs uplink packet scheduling and downlink packet scheduling, and makes a relay necessity/unnecessity determination corresponding to the flowchart of FIG. 11. However, as shown in FIG. 31, before a relay necessity/unnecessity determination is made, a relay device is selected for each terminal (519). The method of selecting a relay device for each terminal at 519 is described in the embodiment of FIG. 32. 519 can be achieved as firmware by a DSP, an MPU, or the like. The relay necessity/unnecessity determination result to be passed to 513 may be the result correspondingly to each relay device or may be the result common to the plurality of relay devices.

Figure 36:
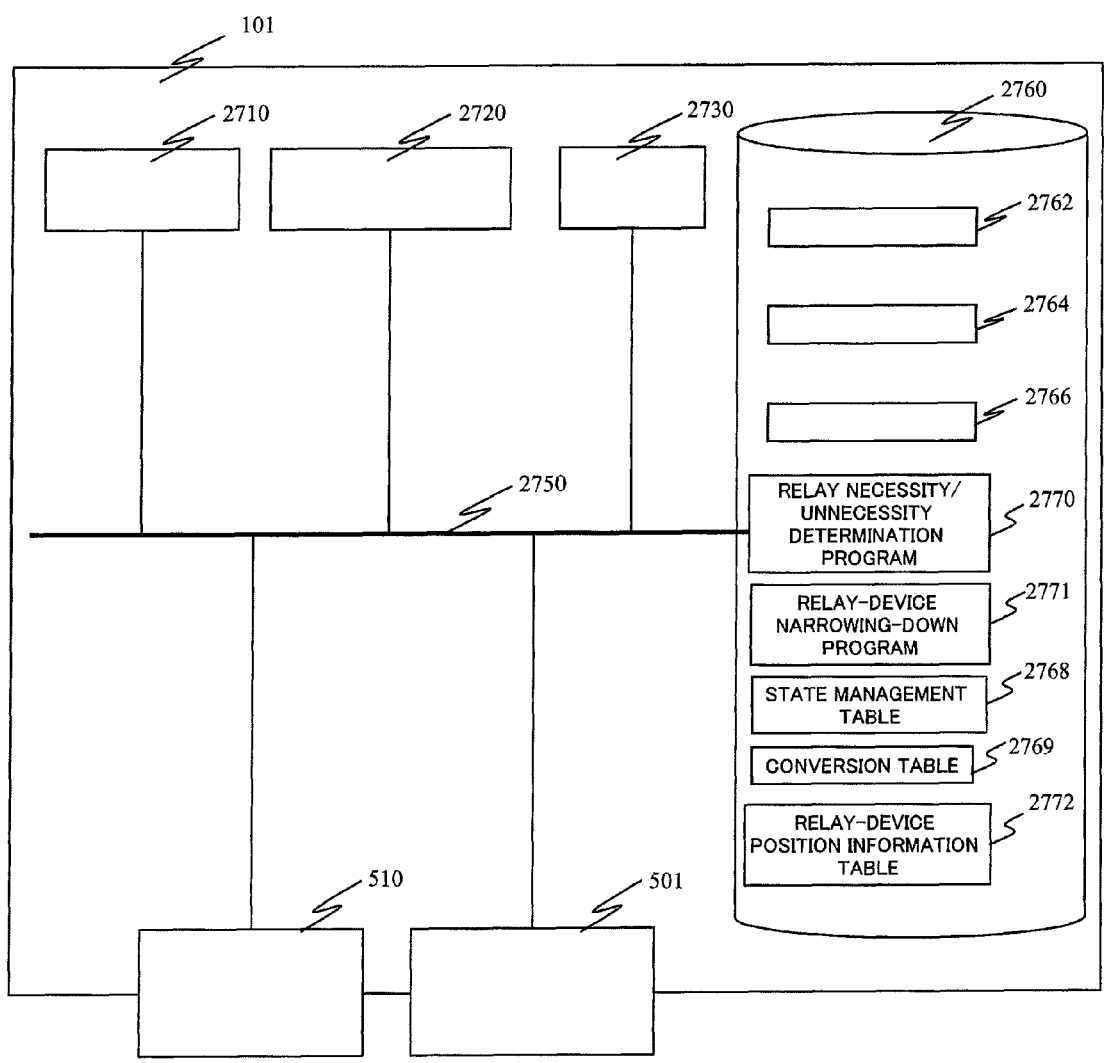
FIG. 36 is a diagram showing an example of structure of the base station when the presence of a plurality of relay devices is assumed in the present invention.

FIG. 36 shows an example of structure of the base station 101 when a plurality of relay devices belong to one base station in the wireless communication system according to the present invention. While this example shares most of the embodiment of FIG. 27 in common, the storage device 2760 has further stored therein a program 2770 for selecting any relay device from among the plurality of relay devices for each terminal, the program corresponding to the relay device selection 224 of FIG. 32 and the relay device selection 321 of FIG. 32.

The embodiments when a plurality of relay devices are present for one base station have been described above. In the following, embodiments are described in which relay devices are narrowed down before selecting a relay device for each terminal. By narrowing down the relay devices before relay device selection, an effect of reducing the amount of computation associated with relay device selection can be achieved.

Figure 39:
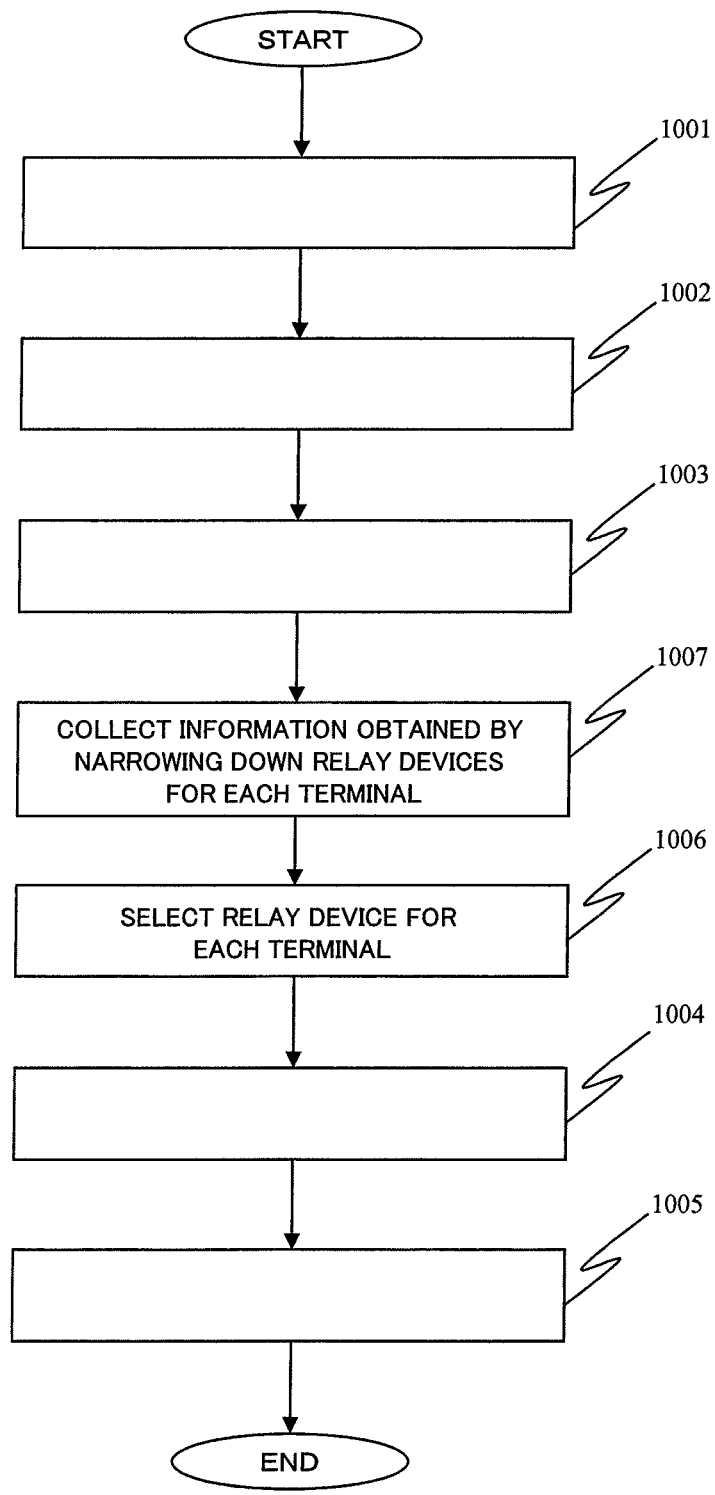
FIG. 39 is a chart showing a second example of the flow of operation of the entire system when a plurality of relay devices are introduced in the present invention.

FIG. 39 shows a flow of performing a process of narrowing down the relay devices before relay device selection. Since step 1001 to step 1006 are identical to the steps of the embodiments in FIG. 3 and FIG. 31, their description is omitted herein. Between step 1003 and step 1006, step 1007 is inserted for performing a process of narrowing down the relay devices to be selected for each terminal. Here, by using position information of each of the terminals and the relay devices or criteria pursuant to the position information, the relay device candidates to be selected for each terminal are narrowed down by threshold determination. At step 1006, for the relay devices left after narrowing down at step 1007 for each terminal, a relay device is selected for each terminal by using the method shown in FIG. 32, 37, or 38.

Figure 40:
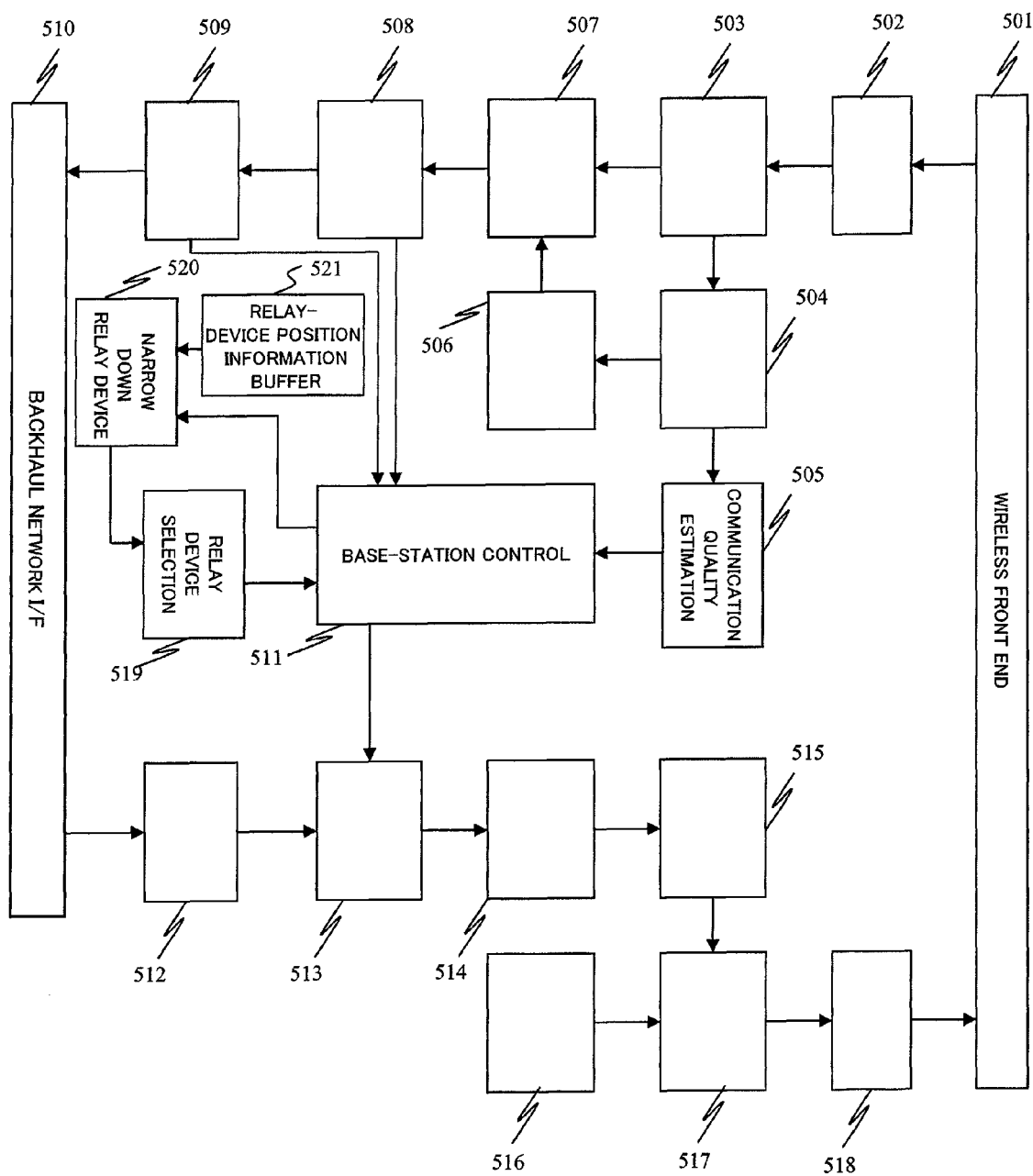
FIG. 40 is a diagram showing a second example of structure of the base station when the presence of a plurality of relay devices is assumed.

FIG. 40 shows an example of structure of the base station when a plurality of relay devices belong to one base station and the relay devices are narrowed down before relay device selection. Since this example shares most of the embodiments of FIGS. 13 and 35 in common, only differences from FIGS. 13 and 35 is described.

Different points are that a relay-device narrowing-down block 520 is inserted before the relay device selection 519 and that the relay-device narrowing-down block 520 adds a relay-device position information buffer 521 to be referred to. The relay-device narrowing-down block 520 can be achieved by two methods, that is, by narrowing down the relay devices based on position information of the terminal and the relay device and by narrowing down the relay devices based on the reception strength of the wireless signal transmitted by the terminal at the relay device. Therefore, each case is described below.

In narrowing down the relay devices based on position information of the terminal and the relay device, which is a first narrowing-down process achieving method, a geographical distance between the terminal and the relay device is calculated from the position information of the terminal and the position information of the relay device, and it is decided by threshold determination on that distance whether a relay device is left as a relay device candidate for selection. For example, the relay device is left as a candidate when the distance is below 200 m, and is excluded from the candidates when the distance is not below 200 m.

Figure 41:
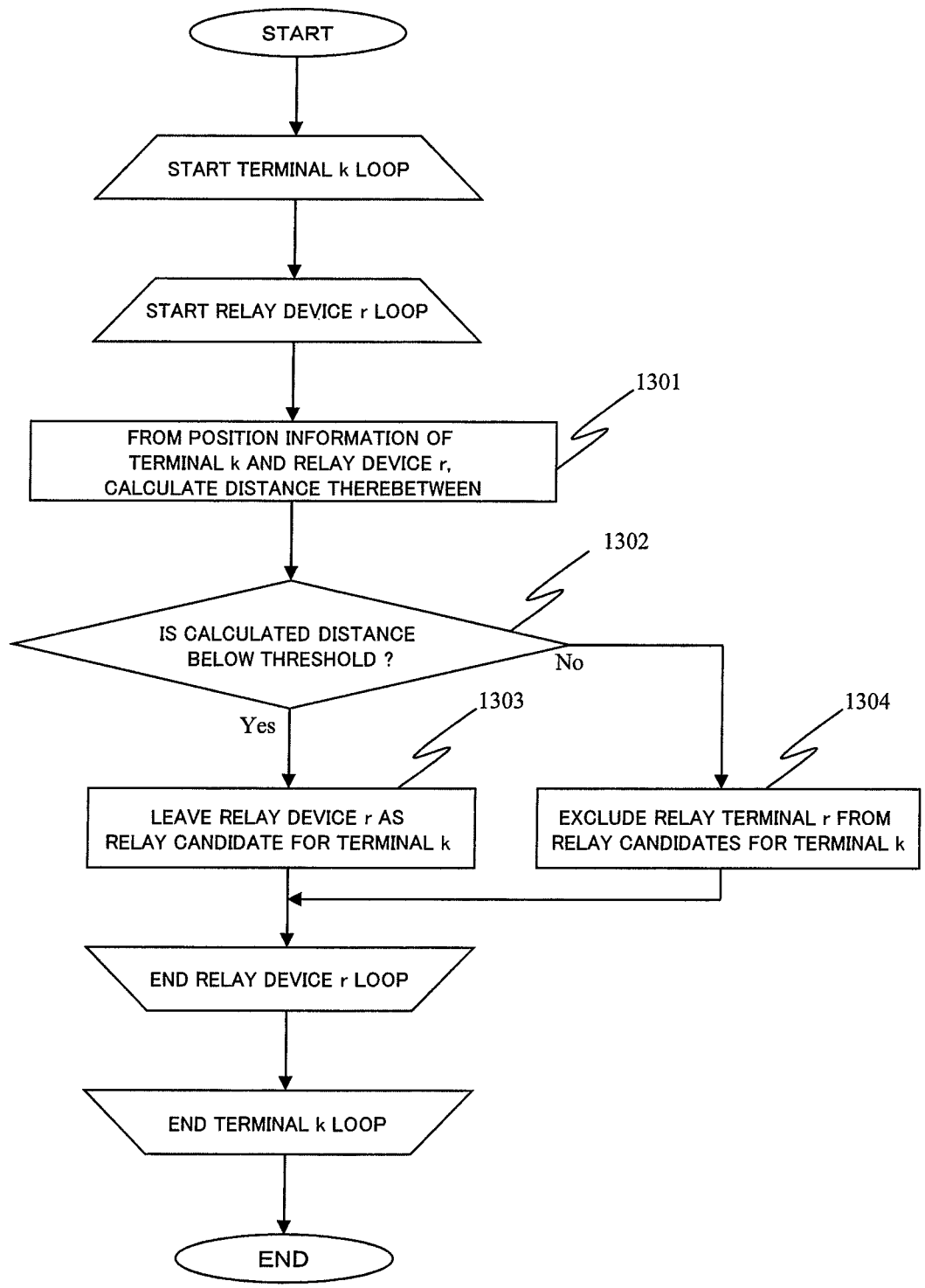
FIG. 41 is a chart showing a first embodiment of a flowchart for narrowing down a plurality of relay devices to a relay candidate for each terminal in the present invention.

Information required for this narrowing-down process is a threshold for determination, the position information of the terminal, and the position information of the relay device. Among them, the threshold for determination and the position information of the relay device are obtained from initial settings at the time of starting the base station. The position information of the relay device is stored in the relay-device position information buffer 521. The position information of the terminal is obtained by, for example, a GPS (Global Positioning System) mounted in the terminal, is reported to the base station together with the feedback information 207 or 208 from the terminal in FIG. 32 or the feedback information from the terminal in FIG. 34 as a data signal generated by the application 710 for position measurement in FIG. 17, and can be obtained by inputting the position information of the terminal included in an uplink data channel by the base-station control unit 511 from the reception data buffer 509 of FIG. 40 to the relay-device narrowing-down block 520. An embodiment of this narrowing-down method is shown in FIG. 41. At step 1301, a distance between the relay device and the terminal is calculated. At step 1302, a threshold determination is made with respect to the calculated distance. When the calculated distance is below the threshold, the relay device is left as a relay device candidate to be selected by the terminal (step 1303). When the distance is not below the threshold, the relay device is excluded from the relay device candidates to be selected by the terminal (step 1304).

Figure 42:
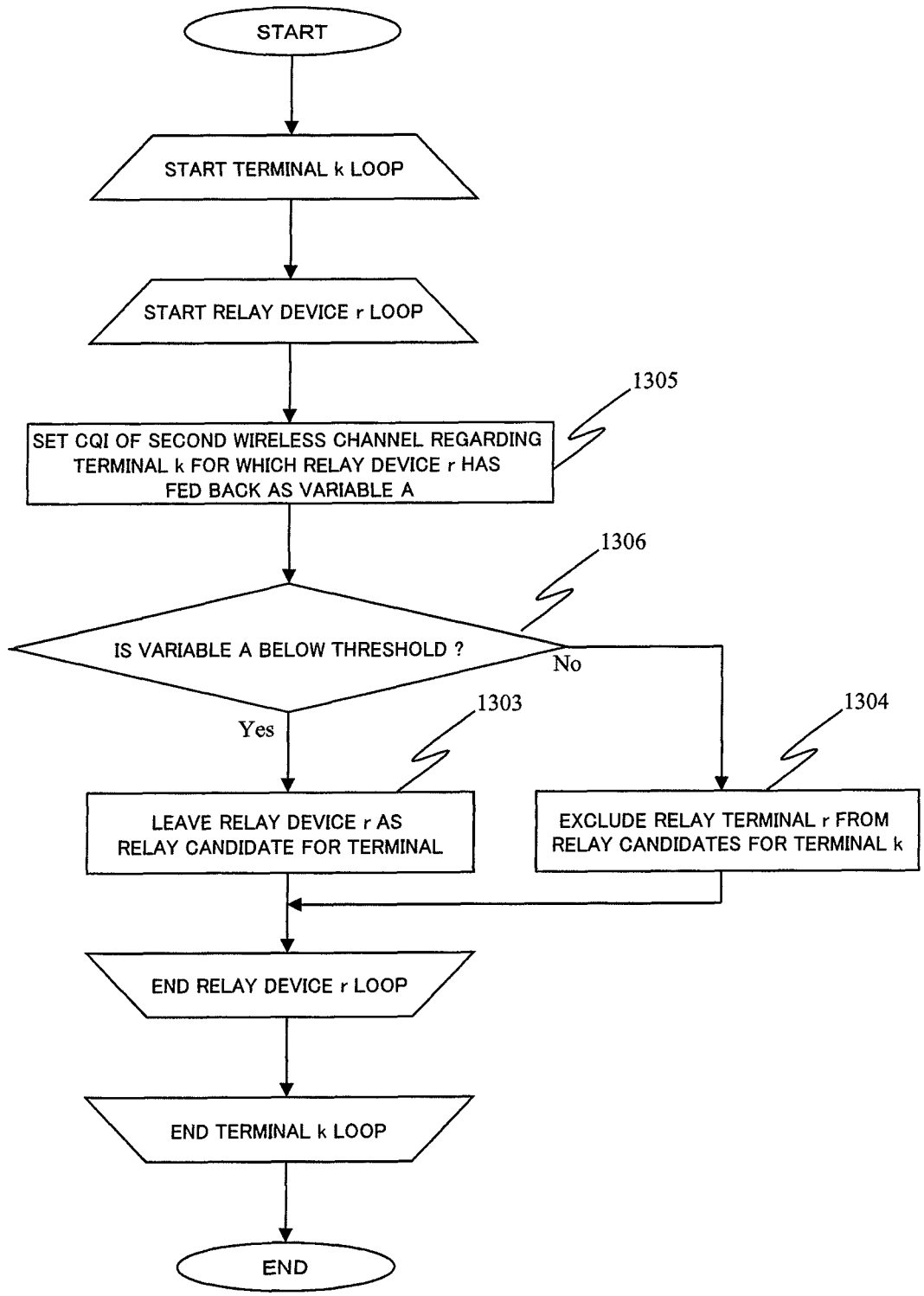
FIG. 42 is a chart showing a second embodiment of the flowchart for narrowing down a plurality of relay devices to a relay candidate for each terminal in the present invention.

Narrowing down the relay devices based on the reception strength of the wireless signal transmitted by the terminal at the relay device, which is a second narrowing-down process achieving method, can be achieved based on the second wireless channel quality 308 to be fed back from the relay device to the base station in FIG. 34. The substance of 308 is the CQI index 2110 shown in FIG. 21, and is mapped on the frequency use efficiency 2140 as shown in the drawing. The frequency use efficiency 2140 has a relation of a monotonic increase with respect to the reception strength of the wireless signal transmitted by the terminal at the relay device. Therefore, the aim can be achieved by making a threshold determination with respect to the CQI index. For example, if a CQI index of 6 is set as a threshold, the operation is such that the relay device is left as a selection candidate when the CQI index is equal to or larger than 6 and the relay device is excluded from the selection candidates when the CQI index is smaller than 6. The threshold obtaining method depends on initial settings upon starting the base station, like the position-information-based narrowing-down method described above. An embodiment of this narrowing-down method is shown in FIG. 42. At step 1305, a CQI index indicating wireless communication quality of an uplink second wireless channel regarding the terminal k fed back from the relay device r is defined as a variable A. At step 1306, a threshold determination is made with respect to the variable A. When the variable A is above the threshold, the relay device is left as a relay-device candidate to be selected for the terminal (step 1303). When the variable is not above the threshold, the relay device is excluded from the relay-device candidates to be selected for the terminal (step 1304).

Note that the storage device 2760 of FIG. 36 has stored therein a program 2771 for narrowing down the relay devices to be selected for each terminal and a position information table 2772 of the relay devices.

INDUSTRIAL APPLICABILITY

The present invention relates to a wireless communication system having a base station, a terminal, and a relay device and, in particular, can be used for a communication resource allocation technology for data communication between the base station and the terminal.

Description of Reference Numerals

| | |
|---|---|
| 101 | Base station |
| 102 | Terminal |
| 103 | Relay device |
| 104 | First wireless channel between the base station and the terminal |
| 105 | Second wireless channel between the relay device and the terminal |
| 106 | Third wireless channel between the base station and the relay device |
| 107 | Wireless communication resource allocated to the first wireless channel |
| 108 | Wireless communication resource allocated to the second wireless channel |
| 109 | Wireless communication resource allocated to the third wireless channel |
| 201 | Reference signal for measuring downlink communication quality of the first wireless channel |
| 202 | Reference signal for measuring downlink communication quality of the second wireless channel |
| 203 | Reference signal for measuring downlink communication quality of the third wireless channel |
| 401 | Reference signal symbol for estimating channel quality of the first wireless channel |
| 402 | Reference signal symbol for estimating channel quality of the second wireless channel |
| 403 | Reference signal symbol for estimating channel quality of the third wireless channel |
| 404 | Null symbol |
| 405 | Data symbol |
| 406 | Reference signal symbol for estimating channel quality for use in the first wireless channel and the third wireless channel |
| 407 | Symbol position where a reference signal symbol sequence multiplexed in a code domain is arranged |
| 408 | Reference signal symbol sequence after code domain multiplexing to be transmitted by the base station and the relay device |
| 409 | Specific example of the reference signal symbol sequence to be multiplexed in the code domain |
| 501 | Wireless front-end of the base station |
| 502 | Uplink FFT process of the base station |
| 503 | Separation into a data symbol and a reference signal symbol of the base station |
| 504 | Estimation of a channel response of the base station |
| 505 | Estimation of uplink communication quality of the base station |
| 506 | Reception weight calculation of the base station |
| 507 | Wave detection and layer separation of the base station |
| 508 | Uplink demodulation and decoding of the base station |
| 509 | Uplink reception data buffer of the base station |
| 510 | I/F of the base station to a wired backhaul network |
| 511 | Base-station control unit |
| 512 | Downlink transmission data buffer of the base station |
| 513 | Coding and modulation of the base station |
| 514 | Layer mapping of the base station |
| 515 | Pre-coding process of the base station |
| 516 | Generation of a downlink reference signal symbol sequence of the base station |
| 517 | Process of inserting downlink reference signal symbol of the base station |
| 518 | Downlink IFFT process of the base station |
| 519 | Relay-device selecting process by the base station for each terminal |
| 520 | Process of narrowing down relay-device selection candidates for each terminal by the base station |
| 521 | Buffer for relay-device position information retained by the base station |
| 601 | Base-station-side wireless front-end of the relay device |
| 602 | Terminal-side wireless front-end of the relay device |
| 603 | Downlink baseband signal process of the relay device |
| 604 | Relay-device control |
| 605 | Uplink baseband signal process of the relay device |
| 606 | Downlink FFT process of the relay device |
| 607 | Separation into a downlink data symbol and a reference signal symbol of the relay device |
| 608 | Estimation of a downlink channel response of the relay device |
| 609 | Estimation of downlink communication quality of the relay device |
| 610 | Calculation of a downlink reception weight of the relay device |
| 611 | Downlink wave detection and layer separation of the relay device |
| 612 | Downlink demodulation and decoding of the relay device |
| 613 | Downlink reception data buffer of the relay device |
| 614 | Downlink coding and modulation of the relay device |
| 615 | Downlink layer mapping of the relay device |
| 616 | Downlink pre-coding process of the relay device |
| 617 | Generation of a downlink reference signal symbol sequence of the relay device |
| 618 | Downlink reference signal symbol inserting process of the relay device |
| 619 | Downlink IFFT process of relay device |
| 620 | Uplink FFT process of the relay device |
| 621 | Separation into an uplink data symbol and a reference signal symbol of the relay device |
| 622 | Estimation of an uplink channel response of the relay device |
| 623 | Estimation of uplink communication quality of the relay device |
| 624 | Calculation of an uplink reception weight of the relay device |
| 625 | Uplink wave detection and layer separation of the relay device |
| 626 | Uplink demodulation and decoding of the relay device |
| 627 | Uplink reception data buffer of the relay device |
| 628 | Uplink coding and modulation of the relay device |
| 629 | Uplink layer mapping of the relay device |
| 630 | Uplink pre-coding process of the relay device |
| 631 | Generation of an uplink reference signal symbol sequence of the relay device |
| 632 | Uplink reference signal symbol inserting process of the relay device |
| 633 | Uplink IFFT process of the relay device |
| 701 | Wireless front-end of the terminal |
| 702 | Downlink FFT process of the terminal |
| 703 | Separation into a data symbol and a reference signal symbol of the terminal |
| 704 | Estimation of a channel response of the terminal |
| 705 | Estimation of downlink communication quality of the terminal |
| 706 | Reception weight calculation of the terminal |
| 707 | Wave detection and layer separation of the terminal |
| 708 | Downlink demodulation and decoding of the terminal |
| 709 | Downlink reception data buffer of the terminal |
| 710 | Device for operating an application in the terminal |

| | Description of Reference Numerals |
|---|---|
| 711 | Terminal control unit |
| 712 | Uplink transmission data buffer of the terminal |
| 713 | Coding and modulation of the terminal |
| 714 | Layer mapping of the terminal |
| 715 | Pre-coding process of the terminal |
| 716 | Generation of an uplink reference signal symbol sequence of the terminal |
| 717 | Uplink signal symbol inserting process of the terminal |
| 718 | Uplink IFFT process of the terminal |

The invention claimed is:

1. A wireless communication system comprising:
a base station;
a terminal communicating with the base station via a first channel; and
a relay device communicating with the terminal via a second channel and communicating with the base station via a third channel,
the base station comparing a communication quality of the first channel, a communication quality of the second channel, and a communication quality of the third channel and setting a channel for data communication between the terminal and the base station according to a comparison result,
the first channel, the second channel, and the third channel being allocated by a communication resource for the data communication from a communication resource group,
the base station includes a determining unit determining whether the relay device is to relay based on the comparison result, and
a notifying unit notifying the relay device of a determination result,
the relay device including a relay control unit, when receiving data addressed to the terminal from the base station according to the determination result in response to the determination result, the relay control unit determining whether to transmit the data to the terminal.

2. The wireless communication system according to claim 1, wherein
the base station further includes a first estimating unit estimating the communication quality of the first channel by using a first reference signal transmitted from the terminal and estimating the communication quality of the third channel by using a second reference signal transmitted from the relay device,
the relay device further includes a second estimating unit estimating the communication quality of the second channel by using a third reference signal transmitted from the terminal, and
a determining unit included in the base station device makes a relay necessity/unnecessity determination for the relay device in uplink communication from the terminal to the base station by referring to the estimated communication qualities of the channels.

3. The wireless communication system according to claim 1, wherein
the terminal further includes a third estimating unit estimating the communication quality of the first channel by using a fourth reference signal transmitted from the base station and estimating the communication quality of the second channel by using a fifth reference signal transmitted from the relay device,
the relay device further includes a fourth estimating unit estimating the communication quality of the third channel by using a sixth reference signal transmitted from the base station, and
a determining unit included in the base station device makes a relay necessity/unnecessity determination for the relay device in downlink communication from the base station to the terminal by referring to the estimated communication qualities of the channels.

4. The wireless communication system according to claim 1, wherein
the base station controls the terminal or the relay device to stop a process of transmitting the estimated communication qualities of the channels.

5. The wireless communication system according to claim 1, wherein
the base station or the terminal transmits a reference signal, and the communication qualities of the channels are estimated by the relay device receiving the reference signal and the base station or the terminal receiving the reference signal,
a reference signal transmitted by the base station and a reference signal transmitted by the relay device in downlink communication are multiplexed and transmitted at a same time and a same frequency, and
a reference signal transmitted by the terminal and a reference signal transmitted by the relay device in uplink communication are multiplexed and transmitted at a same time and a same frequency.

6. The wireless communication system according to claim 1, wherein
a communication performance loss and a communication performance gain when channels via the relay device are used are compared based on the communication quality of the first channel, the communication quality of the second channel, and the communication quality of the third channel, and a relay necessity/unnecessity determination is made based on a comparison result.

7. The wireless communication system according to claim 1, wherein
the one relay device for use in relay communication is selected for the each terminal by using an evaluation function with at least one of the communication quality of the first channel, the communication quality of the second channel, and the communication quality of the third channel being taken as a variable, and
the one relay device for use in relay communication is selected for the each terminal by using an evaluation function with at least one of the communication quality of the first channel, the communication quality of the second channel, and the communication quality of the third channel and a number of terminals selecting a relay device being taken as variables.

8. The wireless communication system according to claim 1, wherein
candidates for the relay device for communication with the terminal via the second channel are narrowed down by a threshold determination with respect to a distance between the terminal and the relay device or an index corresponding to the distance.

9. The wireless communication system according to claim 8, wherein
the index is decided based on position information of the relay device and position information of the terminal.

10. The wireless communication system according to claim 8, wherein
the index is decided based on reception strength of a wireless signal transmitted by the terminal at the relay device.

11. A base station comprising:
a comparing unit comparing
a communication quality of a first channel between the base station and a terminal,
a communication quality of second channel between a relay device and the terminal, and
a communication quality of a third channel between the base station and the relay device; and
a setting unit setting a channel for data communication between the terminal and the base station according to a comparison result,
the first channel, the second channel, and the third channel being allocated by a communication resource for the data communication from a communication resource group,
a determining unit determining whether the relay device is to relay based on the comparison result; and
a notifying unit notifying the relay device of the determination result,
the determining unit determining whether to relay with at least one relay device, and
the notifying unit notifying a plurality of relay devices of the determination result.

12. A wireless communicating method comprising the steps of:
transmitting a first reference signal from a base station to a terminal;
transmitting a second reference signal from a relay device to the terminal;
transmitting a third reference signal from the base station to the terminal;
obtaining, from the terminal, an estimation result of a communication quality of a first wireless channel between the base station and the terminal corresponding to the first reference signal;
obtaining, from the terminal device, an estimation result of a communication quality of a second wireless channel between the relay device and the terminal corresponding to the second reference signal;
obtaining, from the relay device, an estimation result of a communication quality of a third wireless channel between the base station and the relay device corresponding to the third reference signal; and
setting a wireless channel for downlink data communication from the base station to the terminal by using the estimation result of the communication quality of the first wireless channel, the estimation result of the communication quality of the second wireless channel, and the estimation result of the communication quality of the third wireless channel.

* * * * *